US011967202B2

(12) United States Patent
Cleveland et al.

(10) Patent No.: US 11,967,202 B2
(45) Date of Patent: *Apr. 23, 2024

(54) SYSTEMS AND METHODS FOR CONTROLLING ELECTRONIC GAMING MACHINE USAGE

(71) Applicant: Aristocrat Technologies, Inc., Las Vegas, NV (US)

(72) Inventors: Christopher Cleveland, Las Vegas, NV (US); Angelo Palmisano, Henderson, NV (US); Patrick Rufatt, Woy Woy (AU); Paul Barnes, Breakfast Point (AU); Andrew Wyllie, North Ryde (AU); Mary Clevidence, Las Vegas, NV (US); Sina Miri, Menlo Park, CA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,169

(22) Filed: Apr. 21, 2023

(65) Prior Publication Data

US 2023/0252847 A1 Aug. 10, 2023

Related U.S. Application Data

(63) Continuation of application No. 17/191,608, filed on Mar. 3, 2021.

(Continued)

(30) Foreign Application Priority Data

Apr. 24, 2020 (AU) ................................ 2020901297
Sep. 29, 2020 (AU) ................................ 2020244426

(51) Int. Cl.
*G07F 17/32* (2006.01)

(52) U.S. Cl.
CPC ...... *G07F 17/3227* (2013.01); *G07F 17/3223* (2013.01)

(58) Field of Classification Search
CPC ......................... G07F 17/3227; G07F 17/3223
See application file for complete search history.

(56) References Cited

U.S. PATENT DOCUMENTS

| | | | |
|---|---|---|---|
| 9,666,021 | B2 | 5/2017 | Nguyen |
| 11,158,168 | B1 | 10/2021 | Acres |

(Continued)

OTHER PUBLICATIONS

Office Action (Non-Final Rejection) dated Jul. 7, 2022 for U.S. Appl. No. 17/191,608 (pp. 1-10).

(Continued)

*Primary Examiner* — Kevin Y Kim
(74) *Attorney, Agent, or Firm* — Armstrong Teasdale LLP

(57) ABSTRACT

An electronic gaming system is described. The electronic gaming system includes a management server including a processor and a memory device storing computer-readable instructions. The instructions, when executed by the processor, cause the processor to receive player identification data and game data. The instructions also cause the processor to request and receive, based upon the player identification data and from a player tracking server, player data associated with the player account, cause display, on a host device associated with a casino host, of at least a portion of the player data and the game data, and determine that the EGM should be disabled for a predetermined amount of time. The instructions further cause the processor to cause display of a message indicating that the EGM will be disabled and disable the EGM for the predetermined amount of time.

20 Claims, 61 Drawing Sheets

Related U.S. Application Data

(60) Provisional application No. 63/020,968, filed on May 6, 2020, provisional application No. 62/985,649, filed on Mar. 5, 2020.

(56) References Cited

U.S. PATENT DOCUMENTS

| | | | |
|---|---|---|---|
| 2002/0152120 | A1 | 10/2002 | Howington |
| 2002/0177480 | A1 | 11/2002 | Rowe |
| 2004/0002386 | A1 | 1/2004 | Wolfe |
| 2006/0252530 | A1 | 11/2006 | Oberberger |
| 2007/0243928 | A1 | 10/2007 | Iddings |
| 2008/0268959 | A1 | 10/2008 | Bryson |
| 2009/0131151 | A1 | 5/2009 | Harris |
| 2009/0275402 | A1 | 11/2009 | Backover |
| 2009/0275405 | A1 | 11/2009 | McKay |
| 2011/0130197 | A1 | 6/2011 | Bytnar |
| 2011/0288665 | A1 | 11/2011 | Howington |
| 2012/0028718 | A1 | 2/2012 | Barclay |
| 2013/0260875 | A1 | 10/2013 | Bryson |
| 2013/0274008 | A1 | 10/2013 | Bryson |
| 2013/0274009 | A1 | 10/2013 | Bryson |
| 2016/0307400 | A1 | 10/2016 | Bryson |
| 2018/0286177 | A1 | 10/2018 | Bryson |
| 2018/0309816 | A1 | 10/2018 | Dalmia |
| 2021/0350662 | A1 | 11/2021 | Benchimol |

OTHER PUBLICATIONS

Office Action (Final Rejection) dated Oct. 24, 2022 for U.S. Appl. No. 17/191,608 (pp. 1-6).
Office Action (Notice of Allowance and Fees Due (PTOL-85)) dated Jan. 25, 2023 for U.S. Appl. No. 17/191,608 (pp. 1-8).

FIG. 46
Open Tasks
Service Request - Disinfectant Game
02-04-04 Zone2 Uncarded
Bill Acceptor tilt
01-22-02 Zone2 Classic
Service Request - Disinfectant Game
01-22-02 Zone2 Classic
Bill Acceptor tilt
03-28-06 Zone3 Classic
Bill Acceptor tilt
04-00-07 Zone4 Classic
Service Request - Disinfectant Game
01-22-02 Zone2 Classic
Bill Acceptor tilt
01-22-02 Zone2 Classic
Bill Acceptor tilt
01-22-02 Zone2 Classic
Bill Acceptor tilt
02-08-01 Zone2 Classic

4600

FIG. 47
4700
Service Request - Disinfectant Game
Created
03/02/20XX 5:15 PM
Zone
Section
17-20-02
Machine
20823
Severity
High
Close
Unassign
Comment
Photo
Memo
Map
Player
Additional Information

4800

SYSTEMS AND METHODS FOR CONTROLLING ELECTRONIC GAMING MACHINE USAGE

CROSS REFERENCE TO RELATED APPLICATIONS

This application is a continuation of and claims priority to U.S. patent application Ser. No. 17/191,608, filed Mar. 3, 2021, which claims priority to U.S. Provisional Patent Application No. 62/985,649, filed Mar. 5, 2020, U.S. Provisional Patent Application No. 63/020,968, filed May 6, 2020, and Australian Patent Application No. 2020244426, filed Sep. 29, 2020, which claims priority to Australian Patent Application No. 2020901297, filed Apr. 24, 2020, each of which is hereby incorporated herein by reference in its entirety.

TECHNICAL FIELD

The field of disclosure relates generally to electronic gaming, and more specifically to systems and methods for controlling electronic gaming machine (EGM) usage.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system is described. The electronic gaming system includes a management server including a processor and a memory device storing computer-readable instructions. The instructions, when executed by the processor, cause the processor to receive, from an electronic gaming machine (EGM), player identification data and game data, wherein the player identification data identifies a player account of a player at an EGM and the game data includes an indication of an electronic game being played at the EGM. The instructions also cause the processor to request and receive, based upon the player identification data and from a player tracking server, player data associated with the player account, the player data including prior game data associated with the player account, cause display, on a host device associated with a casino host, of at least a portion of the player data and the game data, and determine that the EGM should be disabled for a predetermined amount of time. The instructions further cause the processor to cause display, on at least one of the EGM and a player device associated with the player account, of a message indicating that the EGM will be disabled and disable the EGM for the predetermined amount of time.

In another aspect, a method for controlling electronic gaming machine (EGM) usage, the method being performed on a management server including a processor and a memory device storing computer-readable instructions, is described. The method includes receiving, from an electronic gaming machine (EGM), player identification data and game data, wherein the player identification data identifies a player account of a player at an EGM and the game data includes an indication of an electronic game being played at the EGM. The method also includes requesting and receiving, based upon the player identification data and from a player tracking server, player data associated with the player account, the player data including prior game data associated with the player account, causing display, on a host device associated with a casino host, of at least a portion of the player data and the game data, and determining that the EGM should be disabled for a predetermined amount of time. The method further includes causing display, on at least one of the EGM and a player device associated with the player account, of a message indicating that the EGM will be disabled and disabling the EGM for the predetermined amount of time.

In yet another aspect, a non-transitory, computer-readable storage medium having instructions stored thereon is described. In response to execution by a processor, the instructions cause the processor to receive, from an electronic gaming machine (EGM), player identification data and game data, wherein the player identification data identifies a player account of a player at an EGM and the game data includes an indication of an electronic game being played at the EGM. The instructions also cause the processor to request and receive, based upon the player identification data and from a player tracking server, player data associated with the player account, the player data including prior game data associated with the player account, cause display, on a host device associated with a casino host, of at least a portion of the player data and the game data, and determine that the EGM should be disabled for a predetermined amount of time. The instructions further cause the processor to cause display, on at least one of the EGM and a player device associated with the player account, of a message indicating that the EGM will be disabled and disable the EGM for the predetermined amount of time.

DETAILED DESCRIPTION

Figure 1:
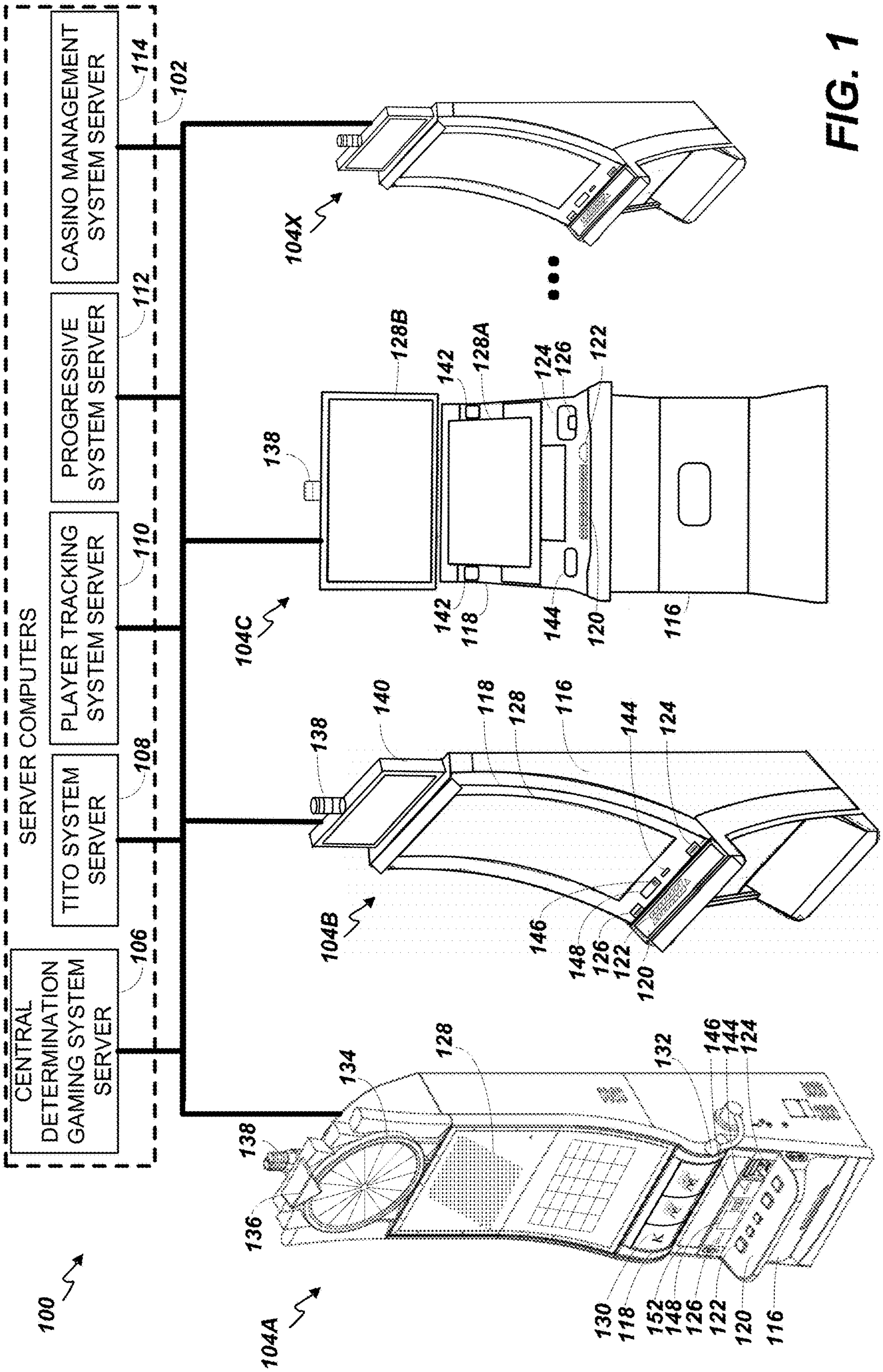
FIG. 1 is an exemplary diagram showing several EGMs networked with various gaming related servers.

The systems and methods described herein enable and facilitate a variety of advantages to players (both carded and non-carded) within a casino, as an example. More specifically, the systems and methods described herein include a product backend server (e.g., a casino management server) that receives a plurality of data related to a plurality of patrons that visit a casino and interact with the many services offered by the casino or third-parties associated with the casino including such services as game play, hotels services, restaurant services, spa, shopping and other services that may be offered by a casino.

This data may be analyzed to build and/or modify player profiles of each patron. In addition, the casino management server may collect data associated with the different games (electronic gaming machines (EGMs), tables games, sports betting, etc.) offered at the casino such that the server is able to identify games on a host device interface including the current status or scheduled status of each game, wherein the status includes if the game is currently active, or reserved for game play, or inactive for a variety of purposes. The casino management server is in communication with a variety of computer devices described herein that enable the casino management server to at least (i) designate an EGM as active and open for general game play; (ii) designate an EGM as inactive and closed to general game play; (iii) reserve an EGM in response to a request submitted thru an app on a mobile device associated with a player; (iv) cause display of messages on an EGM to indicate the status (active/inactive) of the EGM; and (v) cause display of messages on other signage on the casino floor to indicate the status of certain devices.

By way of additional examples, the casino management server taught by the present disclosure enable generation of a variety of player alerts, such as player alerts based upon player activity, including, for example, player wagering activity and other non-wagering activity. These alerts may be provided (e.g., via a tablet computing device) to casino personnel (e.g., agents or employees of the casino), such as one or more casino hosts, who may respond to player alerts substantially in real-time to increase player satisfaction and to personalize player experiences to meet individual player needs. In the example embodiment, the casino management server further automatically analyze casino-floor data and to generate alerts and/or respond thereto in real time. In some embodiments, alerts may also be generated for other customers of a casino, such as non-gaming patrons whose purchases are more focused on non-gaming casino services (e.g., dining, beauty and health, and the like). A variety of other benefits and technical improvements (e.g., enabling offline gameplay) are also achieved by the present disclosure and described in additional detail below.

In some embodiments, the casino management server is directed to implementing social distancing game play for both carded and un-carded patrons/players. After carded or cardless connection to a game (e.g., establishing an active EGM), the casino management server described herein may be configured to automatically take adjacent EGMs and/or EGMs that are within a certain distance of active EGM into an off-line or inactive mode. The casino management server allows for viewing of messaging on, as examples, the active EGM, a mobile device, and/or other displays (e.g., signage on a casino floor) as described herein. The casino management server also allows for communication/messaging (e.g., at a mobile device and within a casino loyalty app) such the casino management server communicates when a particular EGM was last sanitized. The casino management server also allows for patrons (e.g., of specific levels/tiers in a loyalty program) to locate specific game themes at certain EGMs and reserve those EGMs for individual and/or social play.

The server may also notify patrons that may play a particular EGM game on the casino floor that the particular EGM is being inactivated for service at a certain time, but that the same game or similar game is offered on another EGM on the casino floor and directs the patron to that other EGM during that certain time including when the patron is detected on the casino floor near the location of the EGM being inactivated.

Before live play at an EGM by a patron, the casino management server described herein may control messaging that is displayed at the EGM and notifies the patron that a casino employee is on the way to sanitize the EGM. A task can be created by the casino management server for floor service staff (e.g., at a host device) for a specified role that handles the sanitizing process. After the floor service staff services the EGM and/or casino-floor space, the patron and/or casino worker can select (e.g., at a mobile device and within a casino loyalty app) a button on an interface to enable the EGM back into live gaming. A selection option can be made by the patron at the mobile device to request having the game sanitized again. The casino management server may then be configured to create a task/alert that is transmitted to a device associated with floor service staff (e.g., a host device). For example, a dashboard may be generated by the casino management server that is viewable at a host device in a floor service that shows casino management games/EGMS currently in social distancing play and games/EGMs within a social distance radius (e.g., at least 6 feet in all directions) that are off-line. In some embodiments certain patrons may be “linked” to other patrons (e.g., within a casino loyalty app). Linked patrons (e.g., patrons in each other’s social distancing “bubble” such as family members and/or close friends) will allow for the linked patron to join the EGM next to the EGM where the other linked player is playing that is in active session play.

As another example, the casino management server may provide for enabling casino personnel to automatically enable and/or disable certain EGMs for gameplay at any particular time. Currently, to disable EGMs, casino personnel have to manually rope off a certain area of a casino floor including a number of EGMs and then manually disable the EGMs after telling players at those EGMs that they need to exit the area. The casino management server allows for casino personnel to automatically disable/enable EGMs (e.g., for cleaning purposes, for reservations (e.g., VIPs, or certain qualified players), for tournament play, for maintenance, etc.) at a host device and via the casino management server. In response to casino personnel disabling an EGM, the server causes the disabled EGM to display a message indicating the EGM is not enabled for play. In response to casino personnel enabling an EGM, the server causes the enabled EGM to display a messaged indicating the EGM is enabled for play.

Further, the server may monitor the status of each EGM/device on a casino floor in real-time to determine which machines are enabled for play and which machines are disabled for play. The server may also enable casino personnel to schedule when certain EGMs should be enabled/disabled (e.g., online/offline). For example, casino personnel may know a tournament will take place at a certain number of EGMs for a one hour time block. Accordingly, casino personnel may provide inputs to the casino management server (e.g., at a host and/or configuration device) to indicate those EGMs should be disabled for regular play for the hour block during which the tournament will take place, so that the tournament may take place on the EGMs. Further, the server may cause display of messages on the EGMs indicating, for example, an amount of time players may play at the EGMs before they are disabled in order to allow for tournament play. In some embodiments, the server may cause display of a message on the EGMs indicating the location of other similar EGMs on the casino floor (e.g., where the player can play the same and/or similar games to the one being disabled). It should be noted that EGMs and/or devices may be enabled and/or disabled by the casino management server for any purpose, and are not limited to enabling/disabling for cleaning and/or tournament purposes.

Accordingly, the casino management server may automatically generate and dynamically modify at least one schedule corresponding to a plurality of devices on a casino floor and the times the devices may be enabled and/or disabled (e.g., for cleaning, maintenance, and/or tournament purposes). The at least one schedule may be configured for a provided to a host such that the host may know which devices need to be cleaned and when (e.g., devices may need to be cleaned at a certain frequency). In some embodiments, the at least one schedule may be provided to a player (e.g., via a player app at a mobile device) so that the player knows when certain devices will be enabled and/or disabled.

In the example embodiment, the casino management server is configured to provide data to mobile devices of players, as well as to host and/or configuration devices as described herein. For example, the casino management server may provide a variety of functionalities in response to received inputs from a player app (e.g., on a mobile device of a player). As an example, a player may wish to reserve a particular EGM (e.g., an EGM with their favorite game) for a period of time. In some embodiments, depending on a player status (e.g., the player being a high roller and/or in a certain tier of a rewards program), the casino management server may reserve the particular EGM for the player for a certain time period (e.g., as indicated by the player).

In some embodiments, the casino management server may be configured to provide alerts to players at their mobile devices (e.g., depending on player data stored in a database). For example, a player may have a particular favorite game on a casino floor. Accordingly, in some embodiments, casino management server is configured to provide alerts/notifications to a mobile device of the player corresponding to EGMs where the favorite game is played. In other words, if EGMs where the favorite game can be played will be disabled for a certain amount of time, a notification may be sent to a mobile device of the player indicating when the EGMs will be disabled. In some embodiments, players may input preferences regarding when they would like to receive alerts/inputs (e.g., and the casino management server would store that data and transmit alerts/inputs at the times/upon the occurrence of events defined by the player). Alerts/notifications may be transmitted at a variety of predefined intervals (e.g., an amount of time before the EGMs are disabled, when the EGMs are disabled, and when the EGMs are enabled). In some embodiments, the casino management server may transmit notifications to mobile devices of players within a predefined range of EGMs that will be enabled/disabled (e.g., via NFC, Bluetooth, Wi-Fi, etc. to players within a predefined proximity of the EGMs) so that nearby players know when certain EGMs will be enabled/disabled. Accordingly, communication to players is proactively managed instead of casino personnel having to manually walk over to the EGMs and tell players the EGMs will be taken offline/online.

Accordingly, the casino management server also may generate and provide at least one schedule for each player. For example, a player may reserve a number of EGMs for play throughout the day, a dinner reservation at the casino, and/or any other events. Thus, the casino management server manages the player schedule (e.g., according to player inputs at a mobile device and/or known player preferences) to reserve the EGMs at player-requested times and/or make other reservations at or away from the casino (e.g., at restaurants).

In some embodiments, when an EGM is disabled, the casino management server may cause display of a message on the EGM and/or other signage on the casino floor indicating that the EGM is disabled and providing details regarding, as examples, when the EGM will be enabled and where EGMs are located that are currently enabled. Further, a player may view which EGMs are enabled/disabled on a mobile app controlled by the casino management server. Accordingly, the player experience is improved because the player has certainty as to where EGMs are located that are available for play and when those EGMs will be enabled and disabled for play.

In some embodiments, the casino management server may control EGMs that need to be disabled to automatically card players out (e.g., end a play session) when the EGMs need to be disabled (e.g., as determined by a schedule as described herein). In some embodiments, the casino management server may control the EGMs to not automatically card players out if they are of a certain status (e.g., a high-roller status, a certain tier in a rewards program, etc.) so that those players may continue play. In addition to carding players out, the casino management server may control the EGM to display a message to a player indicating where different enabled EGMs are where the player may continue play. In some embodiments, the casino management server may control similar messages (e.g., where other enabled EGMs are) to mobile devices of players within a certain range of the disabled EGMs. In some embodiments, the casino management server may control similar messages to be displayed upon other electronic signage on the casino floor.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
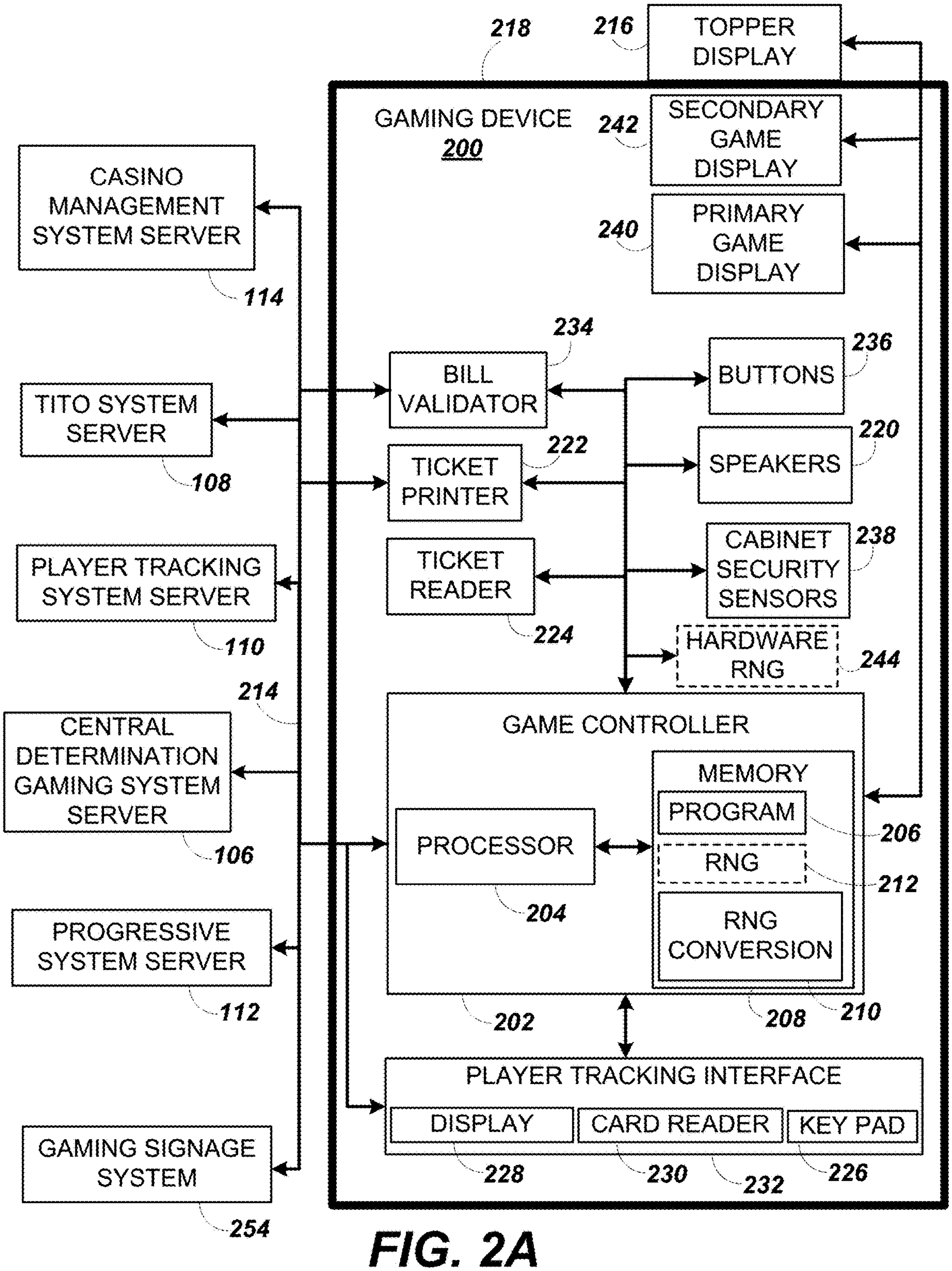
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
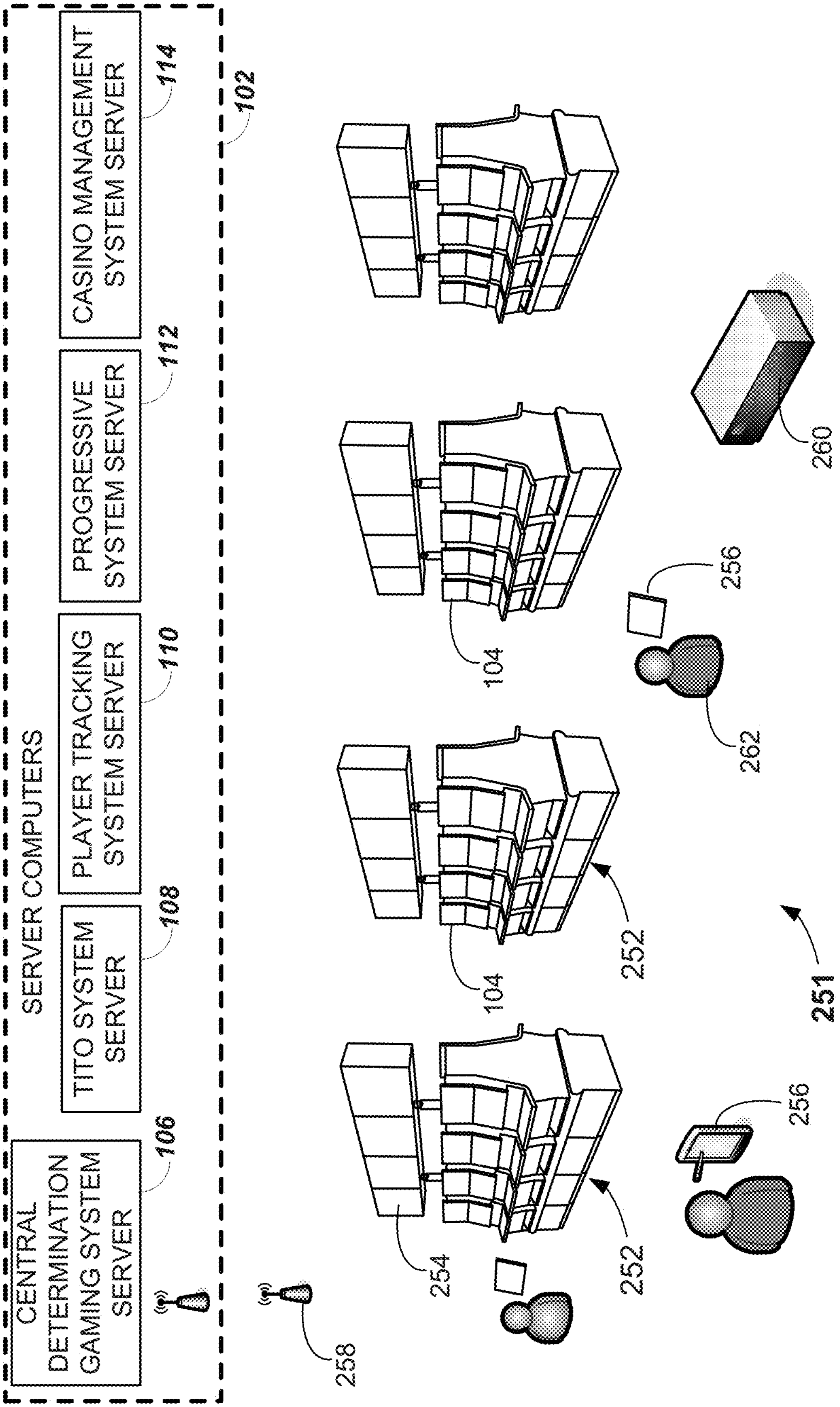
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
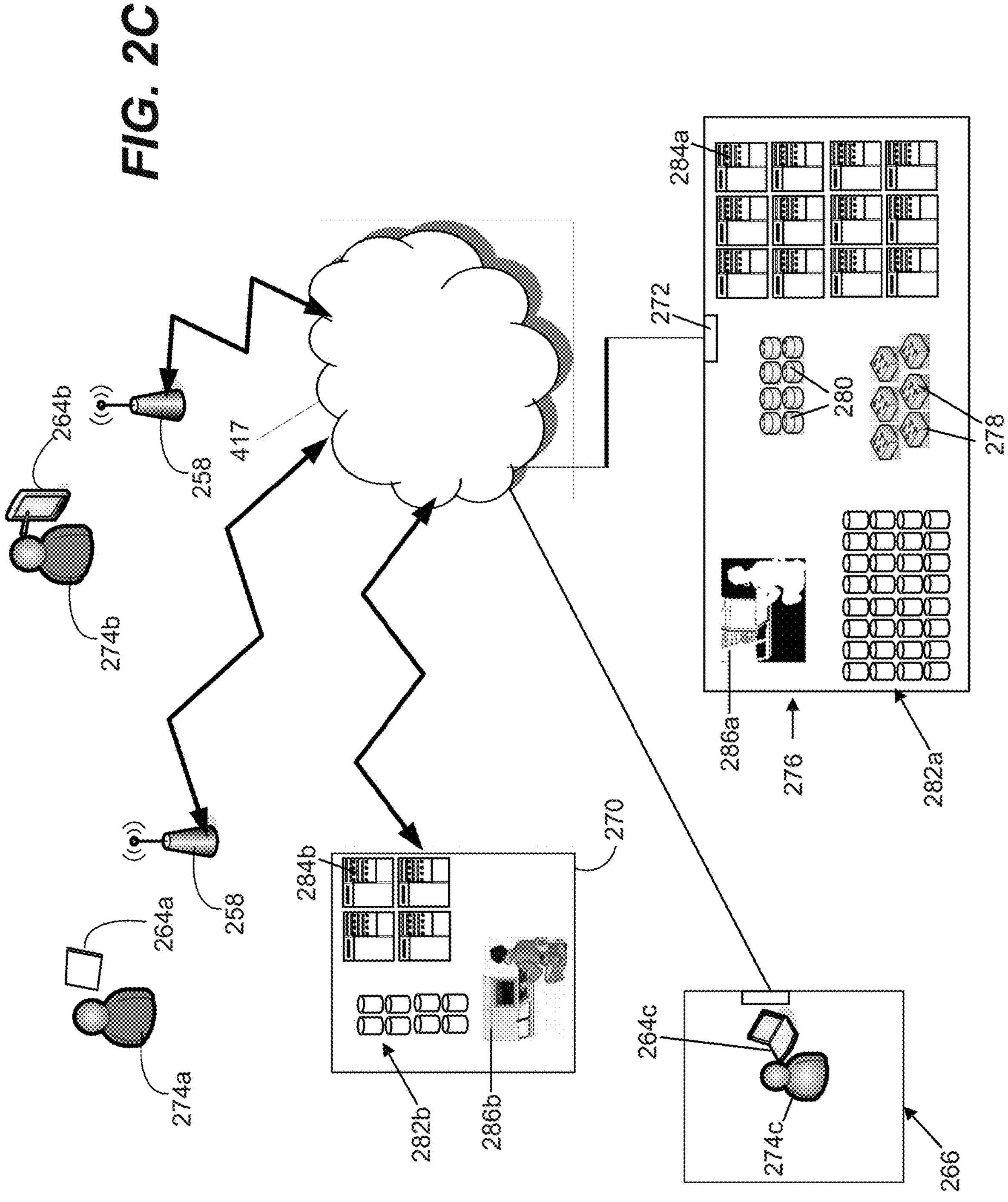
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
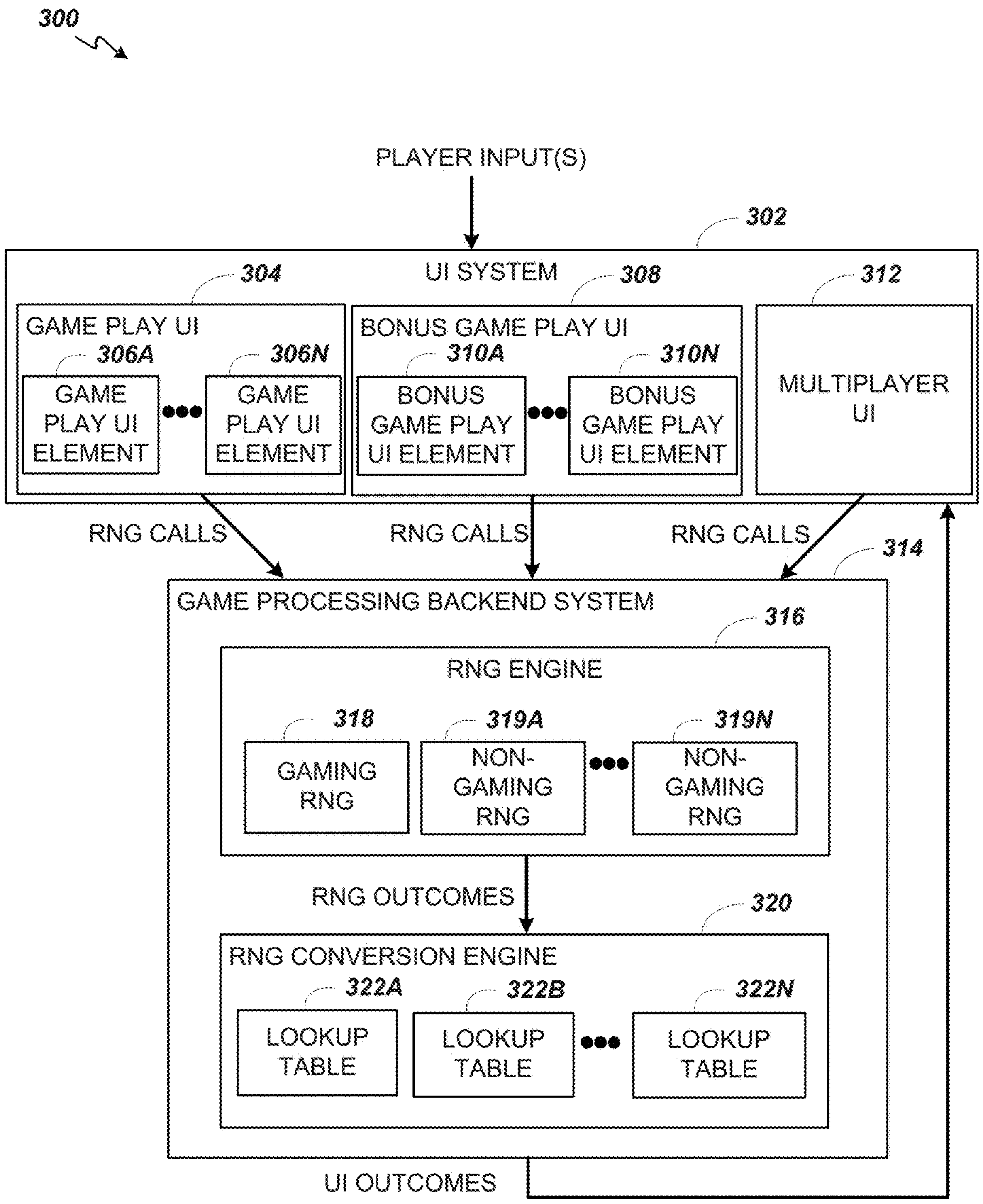
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-

306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Exemplary Host System

Figure 4A:
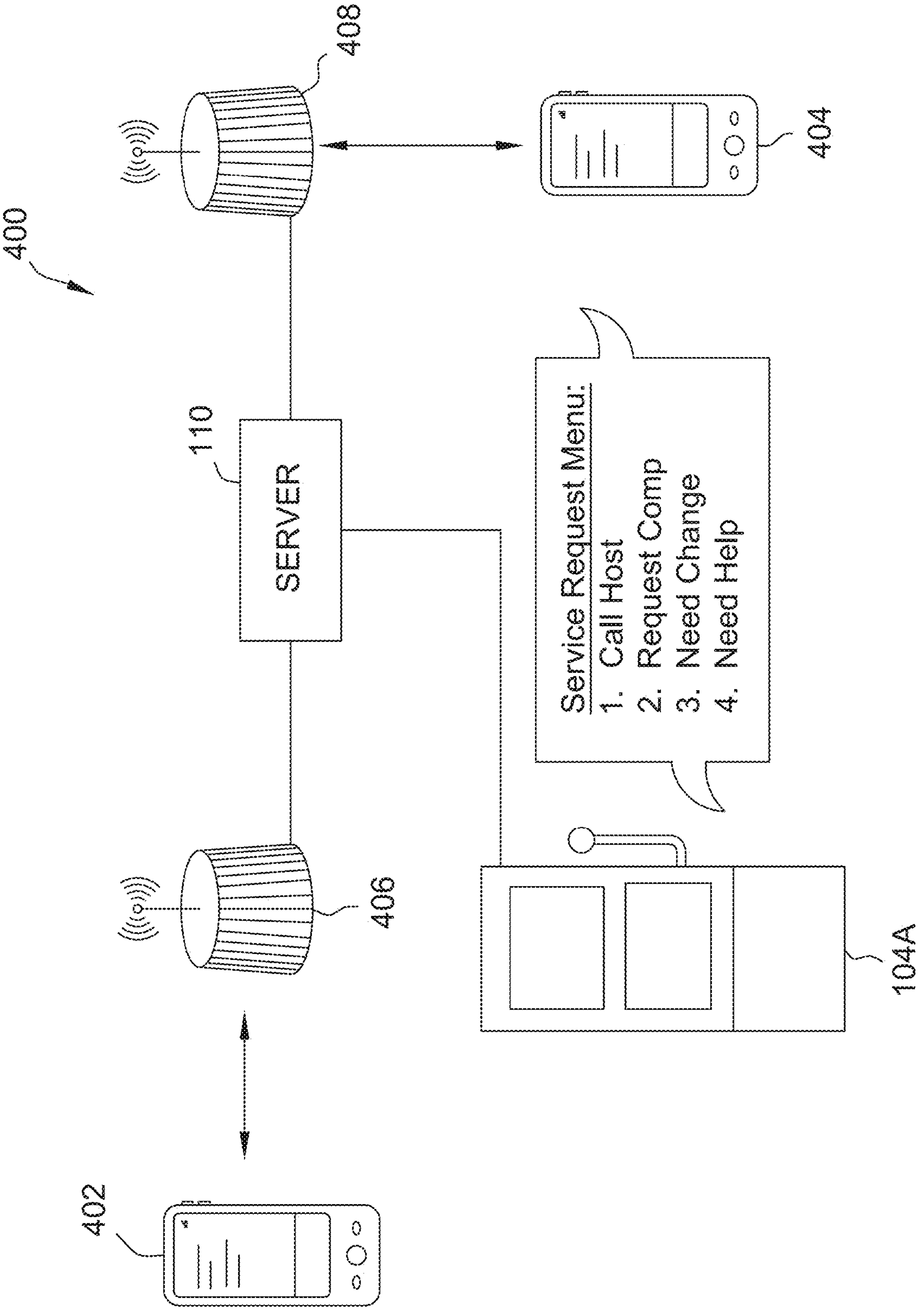
FIG. 4A-FIG. 4C are block diagrams showing example systems for generating and automatically responding to casino-floor and/or player activity data.

FIG. 4A is an exemplary block diagram showing an example system 400 for generating and automatically responding to player and/or casino-floor related events. In at least some embodiments, system 400 includes at least one EGM, such as EGM 104A, a host device 402, a player device 404, and one or more wireless transceivers, such as a first wireless transceiver 406 and a second wireless transceiver 408. System 400 may also include one or more server systems, such as, for example, player tracking system server 110, casino management system server 114, and/or any other suitable server system.

In various embodiments, wireless transceivers 406 and 408 are WIFI and/or BLUETOOTH enabled. Other suitable communication protocols are also contemplated by and within the scope of the present disclosure. In at least some example embodiments, host device 402 and player device 404 may include any suitable wireless communication device, such as any tablet computing device, any smartphone, any laptop computing device, and/or any other computing device capable of wirelessly communicating. Further, in some embodiments, player device 404 may include EGM 104A. In some embodiments, host device 402 and/or player device 404 may also include augmented reality devices, such as augmented reality glasses.

In the example embodiment, EGM 104A may be connected to server 110 by way of a communication network (e.g., a casino wide-area-network) and/or any other suitable (wired and/or wireless network), as described herein. Server 110 may connect to and communicate with one or both of host device 402 and player device 404 by way of wireless transceivers 406 and 408. For instance, wireless transceivers 406 and 408 may form at least a portion of a local-area and/or wide-area network (LAN or WAN) within a casino, and server 110 may communicate with devices 402 and 404 using on the LAN or WAN, such as by providing data to one or both devices 402 and 404 wirelessly over the network. In the example embodiment, server 110 is configured to store player information such as, game data (e.g., from games previously (prior game data)/currently played by a player, wager amounts, win amounts, loss amounts, amount of time played, etc. with this data sorted by at least game played, machine/device played, location played, etc.).

In some embodiments, a player's proximity to a wireless transceiver, such as transceivers 406 and 408, may be used to determine a position of a player within a casino. For example, transceiver 406 may define a first geofence, and transceiver 408 may define a second geofence. As used herein, the term "geofence" may refer to an area within a casino that includes or is otherwise defined by at least one wireless transceiver. More generally, a casino floor may be subdivided in a plurality of geofences (or sections) to identify a generalized location of a player based upon the player's proximity to one or more wireless transceivers on the casino floor, such as transceivers 406 and 408.

System 400 may enable and facilitate generation of a variety of player alerts and other casino-floor related tracking data. These alerts and casino-floor related tracking data, as well as potentially a variety of other desirable and/or requested data, may be displayed for casino personnel by way of a host device 402 provided to the casino personnel. Specifically, the host device 402 may display a graphical user interface (GUI) or "host dashboard," which may include (e.g., display, summarize, etc.) any of a variety of data, such as one or more player alerts, as described herein. In some embodiments, host device 402 may determine and automatically implement, as an example, player alerts without displaying and/or otherwise communicating that alert to casino personnel.

Figure 4B:
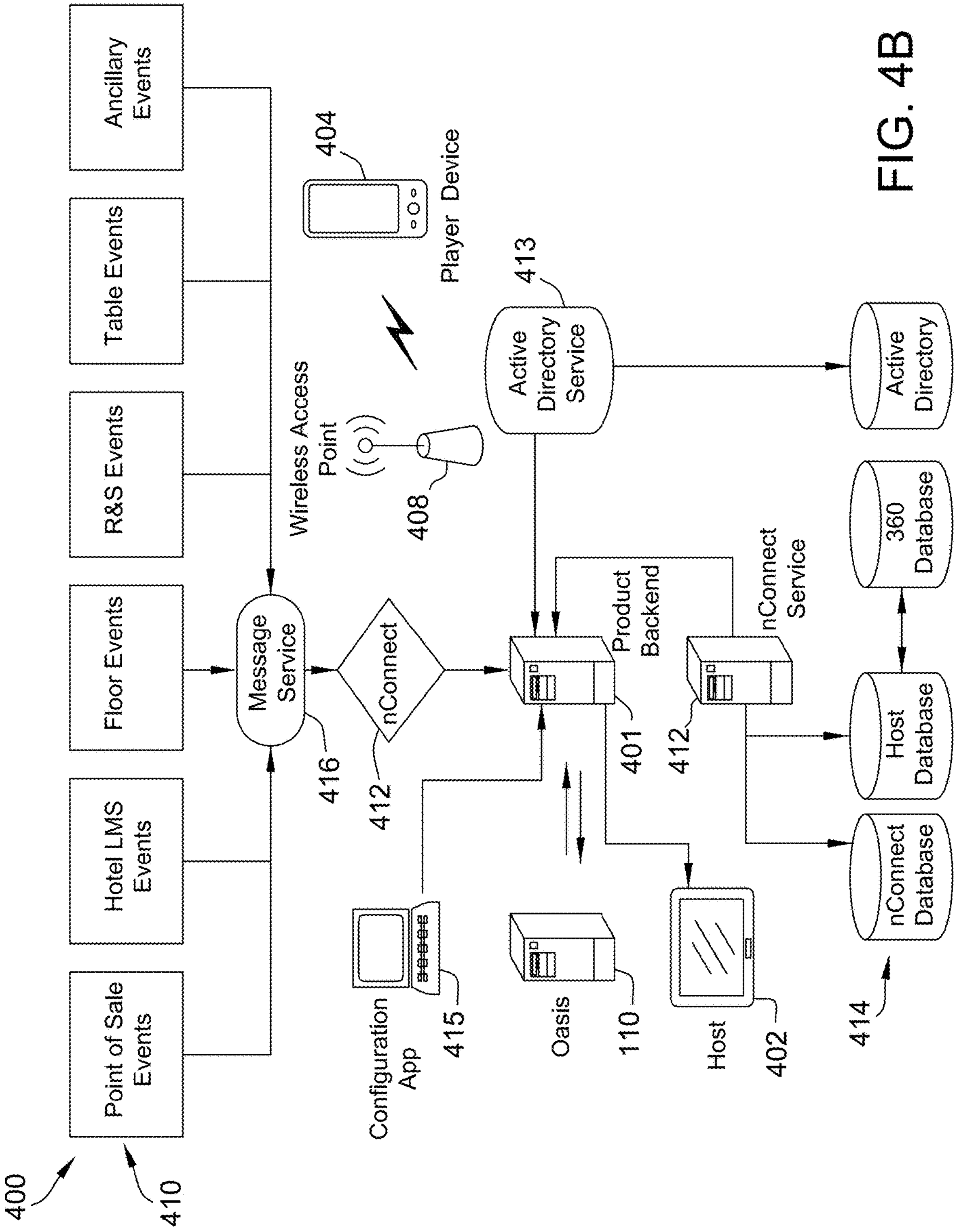

FIG. 4B is another exemplary block diagram showing a more detailed example system 400 for generating and automatically responding to player and/or casino-floor related events. In the example embodiment shown in FIG. 4B, system 400 includes at least one casino device and/or database 410 (e.g., an EGM 104A-X, a point of sale (POS) device, a hotel lodging management system (LMS), a device tracking events on the casino floor (e.g., including an EGM), a device tracking risk and safety (R&S) events, a device tracking table events (e.g., at a gaming table where at least one table game is played), and a device tracking any other ancillary activities relevant to operation of a casino (e.g., transmitting data from third party gaming machines)). In some embodiments, devices 410 may include databases, as indicated above (e.g., in some embodiments devices 410 may include databases that are in communication with and receive data from the exemplary devices described above).

Further, system 400 may include host device 402 and player device 404 (e.g., connected to system 400 via transceiver 408 such as a wireless access point) as described herein. System 400 may also include one or more server systems, such as, for example, player tracking system server 110, a product backend server 401 (e.g., casino management server 401), a representational state transfer (REST) based service server 412 configured to configure and transfer data (e.g., functioning as a secure gateway) between devices, servers, and/or databases 414, as examples, shown in system 400, and/or any other suitable server system.

In the example embodiment, system 400 further includes a configuration device 415 including a configuration app. In the example embodiment, the configuration app is configured to allow authorized personnel (e.g., an IT specialist, a casino manager, etc.) to specify a variety of configurations for server 401 and/or actions to be taken by server 401. For example, although many embodiments herein are described as automatically being implemented/acted upon by server 401 based on received data from a device 410, in some embodiments, server 401 may control a device 410 based upon data received from configuration device 415 (e.g., when a user at device 415 indicates a device 410 should be turned off for a certain amount of time). In some embodiments, server 401 may automatically determine to disable a device 410 for an amount of time based upon a determination by server 401 of a reason why device 410 is being disabled.

As examples, server 401 may automatically disable a device 410 for a first predetermined amount of time if device 410 is being disabled for cleaning, a second predetermined amount of time if device 410 is being disabled for maintenance, a third predetermined amount of time if device 410 is being disabled for a tournament (e.g., in some embodiments server 401 may receive from device 402 an amount of time device 410 needs to be shut down for a tournament), and a fourth predetermined amount of time if device 410 is being disabled because the player wants to take a break (e.g., the player may enter, at device 410 and/or player device 404 an amount of time device 410 should be disabled while they leave device 410 for any purpose (e.g., use the restroom, eat a meal, attend an event, etc.). Further, the amounts of time may be modified by any personnel as described herein (e.g., a host may define an amount of time device 410 should be disabled, a player may request server 401 disable device 410 for a different period/amount of time than previously defined if, as an example, a meal is taking longer than expected).

In the example embodiment, devices 410 are connected to server 401 via a message service 416 and/or server 412. Server 401 is configured to receive data from devices 410 and facilitate the analysis and transmission of data from devices 410 in order to generate and automatically respond to player and/or casino-floor related events as described herein. For example, server 401 may transmit data to server 412, host device 402, server 110, and/or one or more databases 414. In some embodiments, databases 414 may include a database configured to store user security information (e.g., usernames and passwords for a player account, verified by an active directory service device 413), a database configured to store data regarding a mobile application (e.g., implemented at device 404), a database configured to store rules and/or thresholds, as examples, for server 401, and/or a database configured to store regulatory system configuration data. Further, in the example embodiment, server 401 may act as a rules engine (e.g., based upon rules generated by server 401 and/or received from device 415) in order to analyze received/generated data and automatically generate real-time responses thereto (e.g., generating and transmitting a response/alert to player device 404 and/or EGMs 104A-104X). Various example functions performed by server 401 are provided below in greater detail.

Figure 4C:
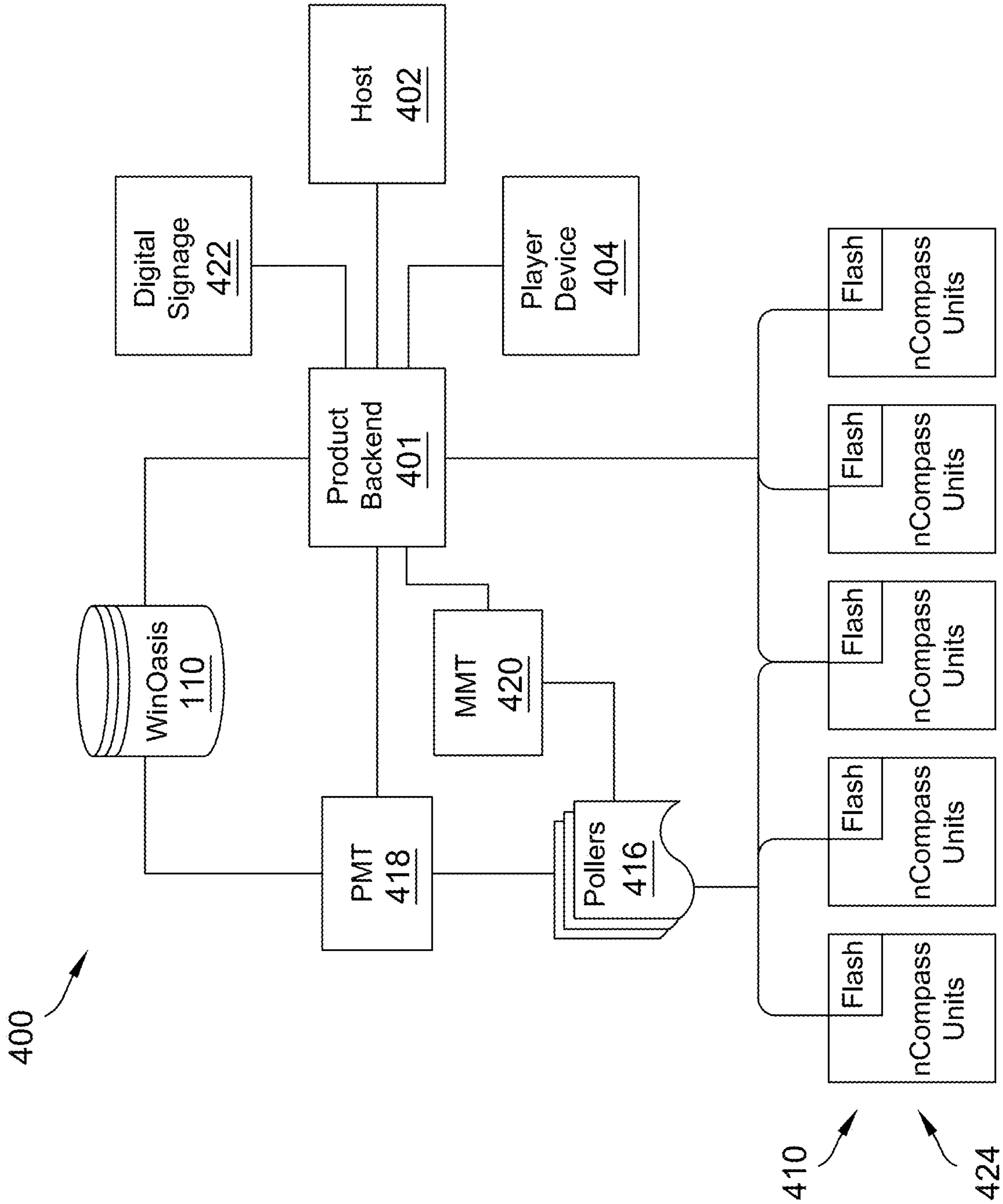

FIG. 4C is exemplary block diagram showing another more detailed example system 400 for generating and automatically responding to player and/or casino-floor related events. In the example embodiment shown in FIG. 4C, system 400 includes at least one casino device 410 (e.g., an EGM 104A-X, a POS device, a hotel lodging management system (LMS), a device tracking events on the casino floor, a device tracking risk and safety (R&S) events, a device tracking table events (e.g., at a gaming table), and a device tracking any other ancillary activities relevant to operation of the casino (e.g., transmitting data from third party gaming machines)), in some embodiments including an nCompass device (e.g., configured to connect to a device (e.g., player device 404) to allow a user to connect to the device including the nCompass device (e.g., allowing a player to play a game at an EGM including the nCompass device on their mobile device) and a flash device configured to configure/translate data for display on device 410. In the example shown in FIG. 4C, at least one casino floor device 410 includes at least one EGM 424, wherein EGMs 424 may include an nCompass device and a flash device as described herein. System 400 also includes digital signage 422 (e.g., digital signage in a casino) that may be controlled by server 401 to display messages regarding functions being performed by server 401 (e.g., that certain EGMs are on and/or off, when certain EGMs will be turned on and/or off, when/where tournaments are being displayed, etc.).

In the example embodiment, system 400 includes server 401 configured to receive data from devices 410. Further, data may be gathered via message service 416 (e.g., one or more pollers configured to periodically request data from devices 410) and transmitted to server 110 via a poller mid tier (PMT) server 418 (e.g., gathering data other than meter data from devices 410) and transmitted to server 401 via a meter mid tier (MMT) device 420 (e.g., gathering meter data from devices 410).

In the example embodiment, server 401 stores all and/or a portion of configuration data related to devices 410 for a given floor space (e.g., on a casino floor). When a player cards-in at device 410, a card-in message (e.g., including player identification data such as a player name identifier, tier status, and/or other account information) is transmitted from device 410 (e.g., via server 412) to message service 416. The card-in message is managed by service 416, which acts as a communication service that manages the card-in message and other messages. PMT server 418 and/or MMT device 420 (e.g., for meter data) may act as a floor service to initiate a gaming session at device 410 and obtain player information based on the card-in message. Afterwards, PMT server 418 and/or MMT device 420 transmits the card-in message or a session start/new session message, which could include EGM location, player identification data (e.g., a player name identifier, tier status, and/or other account information) to server 401 to start the social distancing process. The server 401 provides the information to server 110 to determine relevant configuration information. After receiving configuration information from server 110, the server 401 communicates with PMT server 418 and/or MMT device 420 to control display of an appropriate UI with tasks/dashboards (e.g., at a host device such as host device 402). Server 401 also transmits the instructions to an appropriate device 410 to disable devices 410 adjacent to the active/logged in device 410.

When a communication module of at least one of devices 410 sends out a card-out message, server 401 receives the card-out message or session end message, and server 401 may disable the carded-out device 410 and surrounding devices 410 for cleaning purposes. The card-out message may be generated for a variety reasons, such as: i) player selects a cash out button and removes player card from the device 410; ii) player accidentally abandons/leaves the player card in device 410 (e.g., this may be time-based determination made by server 401 after a player selects the cash out button; and/or iii) device 410 is idle for a threshold amount of time (e.g., as determined/stored at server 401) while credits are on a meter of device 410.

As another example, server 401 provides for enabling casino personnel to automatically enable and/or disable certain EGMs (e.g., 410) for gameplay at any particular time. Currently, to disable EGMs, casino personnel have to manually rope off a certain area of a casino floor including a number of EGMs and then manually disable the EGMs after telling players at those EGMs that they need to exit the area. Server 401 allows for casino personnel to automatically disable/enable EGMs (e.g., for cleaning purposes, for reservations (e.g., by high rollers), for tournament play, for maintenance, etc.) at a host device (e.g., 402, 415) and via server 401. In response to casino personnel disabling an EGM, server 401 causes the disabled EGM to display a message indicating the EGM is not enabled for play. In response to casino personnel enabling an EGM, server 401 causes the enabled EGM to display a messaged indicating the EGM is enabled for play.

Further, server 401 may monitor the status of each EGM/device on a casino floor in real-time to determine which machines are enabled for play and which machines are disabled for play. More specifically, server 401 receives a plurality of data related to a plurality of patrons that visit a casino and interact with the many services (e.g., at devices 410) offered by the casino or third-parties associated with the casino including such services as game play, hotels services, restaurant services, spa, shopping and other services that may be offered by a casino. This data may be analyzed to build and/or modify player profiles (e.g., at server 110) of each patron. In addition, server 401 may collect data associated with the different games (electronic gaming machines (EGMs), tables games, sports betting, etc.) offered at the casino such that server 401 is able to identify games on a host device (e.g., device 402) interface including the current status or scheduled status of each game, wherein the status includes if the game is currently active, or reserved for game play, or inactive for a variety of purposes. Server 401 is in communication with a variety of computer devices described herein that enable server 401 to at least (i) designate an EGM as active and open for general game play; (ii) designate an EGM as inactive and closed to general game play; (iii) reserve an EGM in response to a request submitted thru an app on a mobile device (e.g., device 404) associated with a player; (iv) cause display of messages on an EGM to indicate the status (active/inactive) of the EGM; and (v) cause display of messages on other signage on the casino floor to indicate the status of certain devices.

Server 401 may also enable casino personnel to schedule when certain EGMs should be enabled/disabled (e.g., online/offline). For example, casino personnel may know a tournament will take place at a certain number of EGMs for a one hour time block. Accordingly, casino personnel may provide inputs to server 401 (e.g., at a host and/or configuration device) to indicate those EGMs should be disabled for regular play for the hour block during which the tournament will take place, so that the tournament may take place on the EGMs. Further, server 401 may cause display of messages on the EGMs indicating, for example, an amount of time players may play at the EGMs before they are disabled in order to allow for tournament play. In some embodiments, server 401 may cause display of a message on the EGMs indicating the location of other similar EGMs on the casino floor (e.g., where the player can play the same and/or similar games to the one being disabled). It should be noted that EGMs and/or devices may be enabled and/or disabled by server 401 for any purpose, and are not limited to enabling/disabling for cleaning and/or tournament purposes.

Accordingly, server 401 may automatically generate and dynamically modify at least one schedule corresponding to a plurality of devices on a casino floor and the times the devices may be enabled and/or disabled (e.g., for cleaning, maintenance, and/or tournament purposes). The at least one schedule may be configured for a provided to a host such that the host may know which devices need to be cleaned and when (e.g., devices may need to be cleaned at a certain frequency). In some embodiments, the at least one schedule may be provided to a player (e.g., via a player app at a mobile device) so that the player knows when certain devices will be enabled and/or disabled.

In the example embodiment, server 401 is configured to provide data to mobile devices of players, as well as to host and/or configuration devices as described herein. For example, server 401 may provide a variety of functionalities in response to received inputs from a player app (e.g., on a mobile device of a player). As an example, a player may wish to reserve a particular EGM (e.g., an EGM with their favorite game) for a period of time. In some embodiments, depending on a player status (e.g., the player being a high roller and/or in a certain tier of a rewards program), server 401 may reserve the particular EGM for the player for a certain time period (e.g., as indicated by the player).

In some embodiments, server 401 may be configured to provide alerts to players at their mobile devices (e.g., depending on player data stored in a database). For example, a player may have a particular favorite game on a casino floor. Accordingly, in some embodiments, server 401 is configured to provide alerts/notifications to a mobile device of the player corresponding to EGMs where the favorite game is played. In other words, if EGMs where the favorite game can be played will be disabled for a certain amount of time, a notification may be sent to a mobile device of the player indicating when the EGMs will be disabled. In some embodiments, players may input preferences regarding when they would like to receive alerts/inputs (e.g., and server 401 would store that data and transmit alerts/inputs at the times/upon the occurrence of events defined by the player). Alerts/notifications may be transmitted at a variety of predefined intervals (e.g., an amount of time before the EGMs are disabled, when the EGMs are disabled, and when the EGMs are enabled). In some embodiments, server 401 may transmit notifications to mobile devices of players within a predefined range of EGMs that will be enabled/disabled (e.g., via NFC, Bluetooth, Wi-Fi, etc. to players within a predefined proximity of the EGMs) so that nearby players know when certain EGMs will be enabled/disabled. Accordingly, communication to players is proactively managed instead of casino personnel having to manually walk over to the EGMs and tell players the EGMs will be taken offline/online.

Accordingly, server 401 may also generate and provide at least one schedule for each player. For example, a player may reserve a number of EGMs for play throughout the day, a dinner reservation at the casino, and/or any other events. Thus, server 401 manages the player schedule (e.g., according to player inputs at a mobile device and/or known player preferences) to reserve the EGMs at player-requested times and/or make other reservations at or away from the casino (e.g., at restaurants).

In some embodiments, when an EGM is disabled, server 401 may cause display of a message on the EGM and/or other signage on the casino floor indicating that the EGM is disabled and providing details regarding, as examples, when the EGM will be enabled and where EGMs are located that are currently enabled. Further, a player may view which EGMs are enabled/disabled on a mobile app (e.g., at device 404) controlled by server 401. Accordingly, the player experience is improved because the player has certainty as to where EGMs are located that are available for play and when those EGMs will be enabled and disabled for play.

In some embodiments, server 401 may control EGMs that need to be disabled to automatically card players out (e.g., end a play session) when the EGMs need to be disabled (e.g., as determined by a schedule as described herein). In some embodiments, server 401 may control the EGMs to not automatically card players out if they are of a certain status (e.g., a high-roller status, a certain tier in a rewards program, etc.) so that those players may continue play. In addition to carding players out, server 401 may control the EGM to display a message to a player indicating where different enabled EGMs are where the player may continue play. In some embodiments, server 401 may control similar messages (e.g., where other enabled EGMs are) to mobile devices of players within a certain range of the disabled EGMs. In some embodiments, server 401 may control similar messages to be displayed upon other electronic signage on the casino floor.

In some embodiments, server 401 is configured to provide a variety of functions from guest communication, to staff liaison, to managing the business (e.g., by generating and transmitting alerts to devices 402, 404, 410, etc.). Server 401 provides feature functionality that allows a casino host (e.g., a casino worker) to know activities and behaviors of their players, and provides additional features that allow them to grow their book.

In some embodiments, server 401 is configured to manage player enrollment (e.g., in a loyalty program) at, as examples, devices 410 and/or player device 404. For example, server 401 may detect that a player not associated with a player account is at a device 404, 410, and facilitate player enrollment (e.g., creation of a player account). In other words, server 401 may manage player enrollment (e.g., by providing prompts and storing data in a database 414) at devices not previously capable of allowing a player to create a player account (e.g., previously players had to leave a device 410 (e.g., an EGM) to create a player account). In some embodiments, when a player is logged in to a player account at a device 410, server 401 may be configured to provide awards to the player to be stored in the player account associated with the player and/or provided at the device 410 (e.g., players previously had to leave game play to go claim an award).

For example, server 401 may now allow for patrons that are unknown, and have opted-into an award (e.g., are eligible to receive an award) to choose how they want to claim their award with either indicating at a device 410 they will visit a club booth, or request a casino representative be sent to the device's location. If the patron selects to have someone sent, an alert and task will be generated by server 401 and transmitted to device 402 and/or device 404 to complete club enrollment and bonus to the player.

In some embodiments, server 401 is configured to generate notifications and tasks, and transmit the notifications/tasks to at least host device 402. Upon receipt of data from server 401, device 402 may then inform a user of host device 402 about their players (e.g., players at an EGM managed by the user and/or a company associated with the user), and gives them the ability to prospect new players.

For example, server 401 may control generating and transmitting alerts to device 402 at a predetermined and/or otherwise defined frequency (e.g., when a hosted player cards in to a device 410). Further, server 401 may generate alerts/tasks when a player at a device 410 exceeds a certain threshold of an amount (e.g., credit, wager, etc.) played, of a predefined number of thresholds (e.g., any number of thresholds may be defined corresponding to levels of players, such as high-roller, and/or players wagering less than a high roller) and/or a certain threshold amount of time played. Server 401 may also generate an alert when a player at an EGM (e.g., with or without a player account) wins a jackpot (e.g., an alert may be generated by server 401 and transmitted to device 402 indicating that casino personnel need to go to the player to, for example, address tax requirements). Server 401 may also generate an alert/task when a player selects a service button and/or call my host button at a device 410. In some embodiments, server 401 may further generate an alert to when a player selects a service button and/or comp request button at a device 410 (e.g., comps being complimentary items and services to encourage players) to indicate the player and/or device 410 where the request was made.

In some embodiments, server 401 may also be configured to determine, based upon a threshold amount of time a player has spent on a device 410 and/or a threshold amount of coin-in by game type (slots, video poker, multi-game/multi-denomination) to generate an alert and transmit the alert to device 410 and/or device 402. Further, server 401 may be configured to generate and transmit, an alert when a player that has opted in to a bonusing event (e.g., at a device 410). Server 401 may further be configured to generate and transmit an alert when a player wants to take a device 410 offline (e.g., to take a break) and when a player wants to bring a game back online (e.g., after the break). Server 401 may also be configured to generate and transmit an alert based upon player data (e.g., a birthday/anniversary stored in a database 414).

As explained above, server 401 may also generate and transmit alerts based upon data received from one or more gaming tables (e.g., and/or other devices 410). As examples, server 401 may generate and transmit an alert when: a player buys into a table game; a player meets a threshold win amount; a loss meets a threshold loss amount and/or ends a play session; a player averages a certain threshold of an average bet within an active session; a player has met a threshold of session minutes played; a hosted player (e.g., high roller) starts a rated session; every certain predefined amount of minutes is played and/or a play session ends, server 401 causes display of players stats at device 402; a player that is not hosted buys into a table game with a certain amount; and/or a player spends a certain amount at a specific device 410/outlet that meets/satisfies a threshold rule.

As explained herein, server 401, may also generate and transmit alerts based upon inputs received at a device 410 (e.g., an EGM and/or table). As examples, server 401 may generate and transmit alerts based upon inputs at a device 410 including: an input to call a host; an input that a player will be going to a particular game location to field a request for a comp; and any other administrator-defined rules (e.g., at device 415) that can define other reasons that are enabled by tier and/or hosted players that cause display of buttons to the player in the example of needing change, card reprint, reset PIN, etc.

Further, server 401 may control requests from a player for their favorite games to be taken out of live play prior to their arrival, and/or while playing to off-line game while they go to dinner, as examples. Casinos are more than willing to take these games out of revenue mode because of the amount of coin-in/input these players will cycle through within a gaming session. The following features may be provided and/or managed by server 401 to handle requests from players: ability for an admin user (e.g., at device 415) to enable based on tier or group a set of timer buttons that when selected by the player will off-line the game; ability for an admin to create a group that will see their timer buttons be greater that could off-line the game over a period of days; once player enters their PIN and/or other information at a device, server 401 causes display of button selectors and, for example, if they select "20 minutes", server 401 controls the device 410 to power off the game for 20 minutes and controls a screen of device 410 to display messaging indicating the game is offline and a timer (e.g., a countdown from 20 minutes); once player inserts their card back into the device 410, as an example, they may be prompted to enter a PIN and/or other information and if successful (e.g., verified by server 401), the game will be controlled by server 401 to go back online; if a player needs more time away from the device 410, server 401 may cause display of buttons (e.g., X number of additional minutes) to extend off-line time. As explained herein, whenever and alert and/or task is generated, server 401 transmits at least a portion of the alert and/or task to device 402 for display to casino personnel.

In some embodiments, server 401 generates and causes display of a dashboard at device 402 such that casino personnel can view certain actions and statuses regarding carded/un-carded patrons events. By generating the dashboard, the users at device(s) 402 have full visibility to high-worth and/or other players on the floor and the actions noted by their hosts. Specifically, server 401 may generate and transmit/cause display of the following: a map image that shows where hosted players are on the casino floor; on this map, the ability to filter to see un-carded play once a threshold has been met, and location where these players are; the ability to view alerts in real-time and their different stages of service (e.g., service requested, in progress, completed, etc.); filter the view to bring a headcount graph viewing into the app; manager ability (e.g., at device 402) to use workflows to assign, close, un-assign tasks; manager (e.g., at device 402) to view notes and other inputted information made by a host that serviced the task; filter viewing that allows the manager to view and print tagged prospects (e.g., players spending a certain amount and/or playing for a certain amount of time; located and edit patron profiles; view player offers; and/or view table games credit balances and transaction history.

Figure 4D:
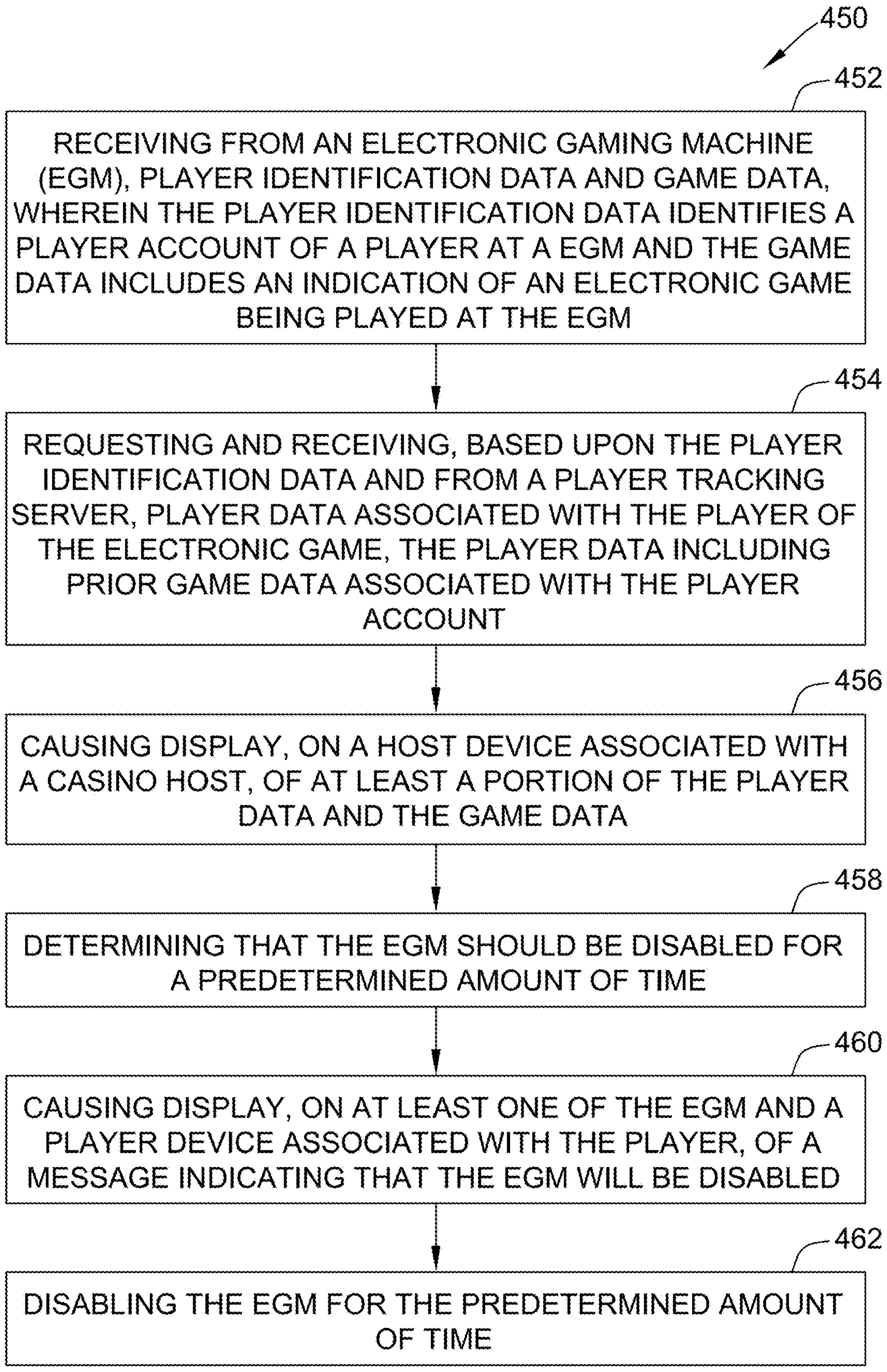
FIG. 4D illustrates an example method for controlling EGM usage in accordance with the present disclosure.
Figure 5:
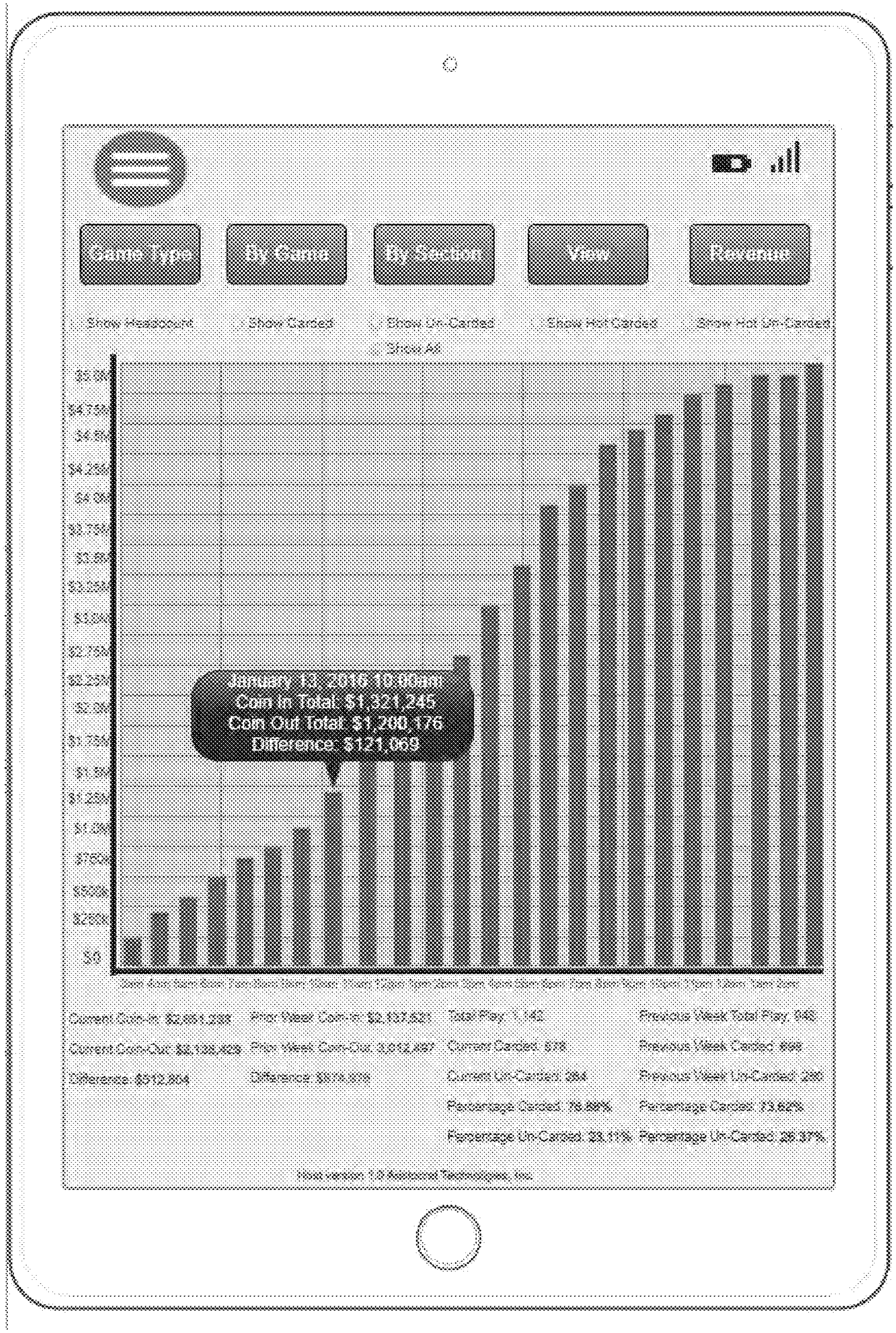
FIG. 5-FIG. 36 are example illustrations of a host dashboard, which may be provided to casino personnel, such as a casino host, and which may summarize a variety of player and other data.
Figure 6:
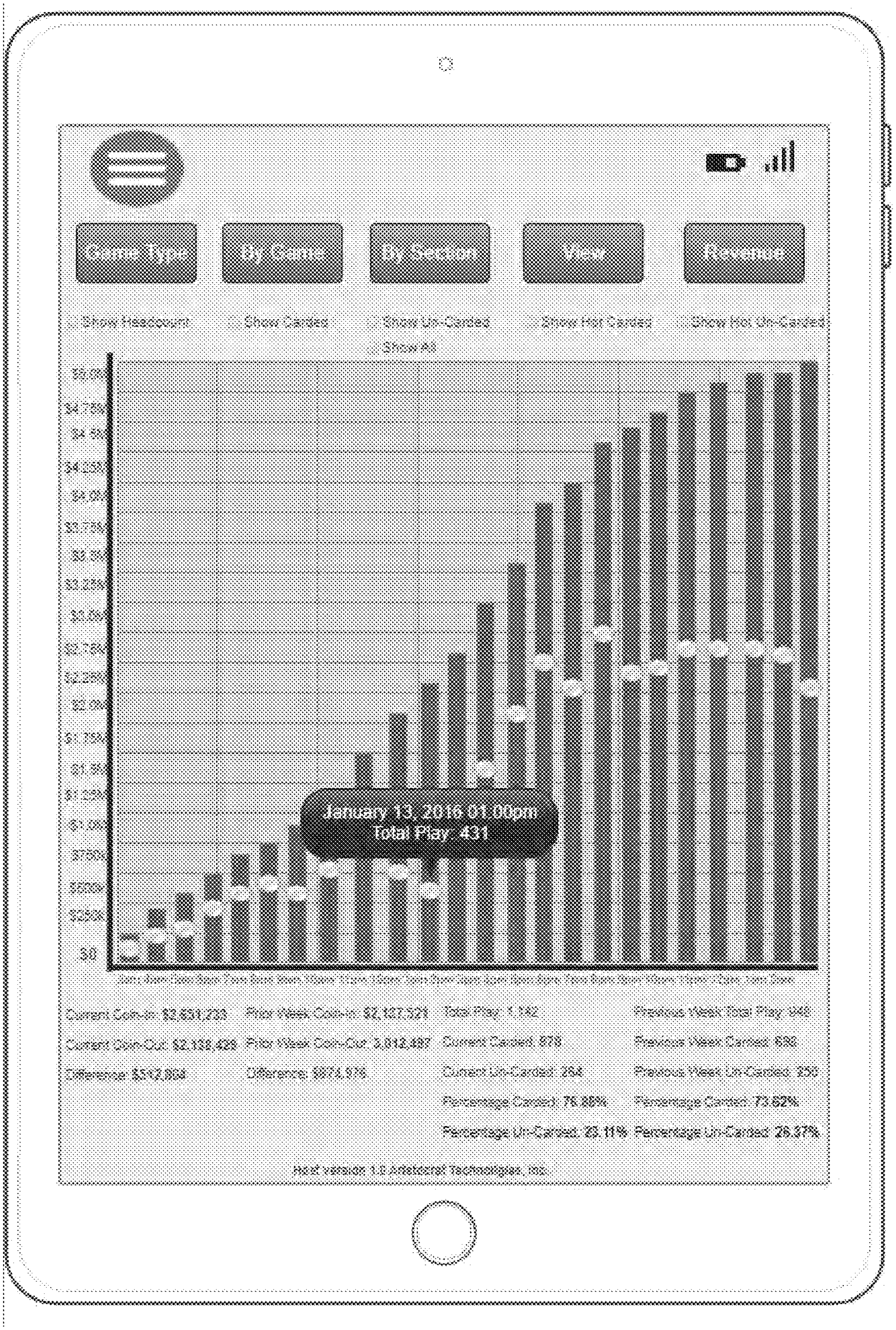
Figure 7:
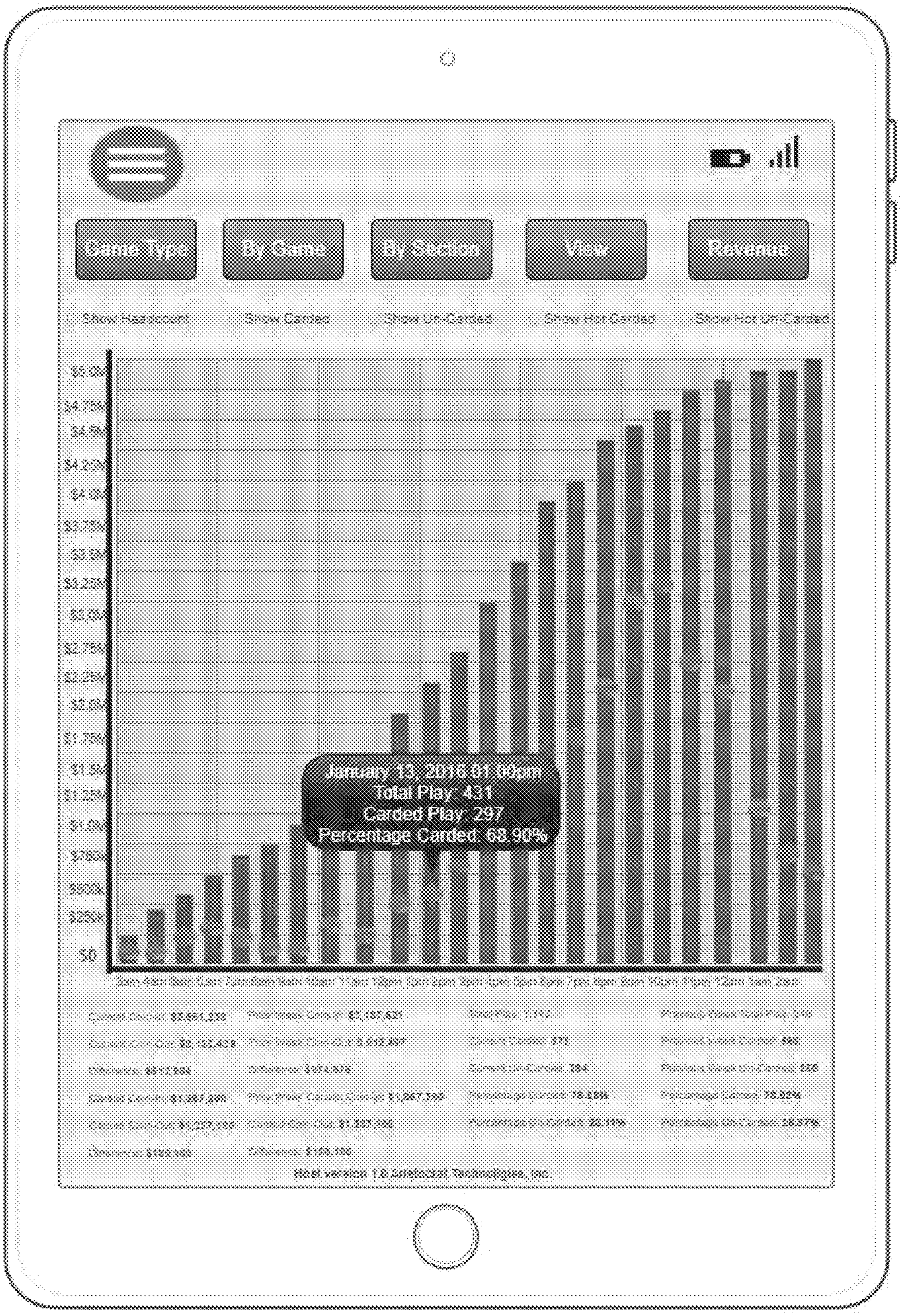
Figure 8:
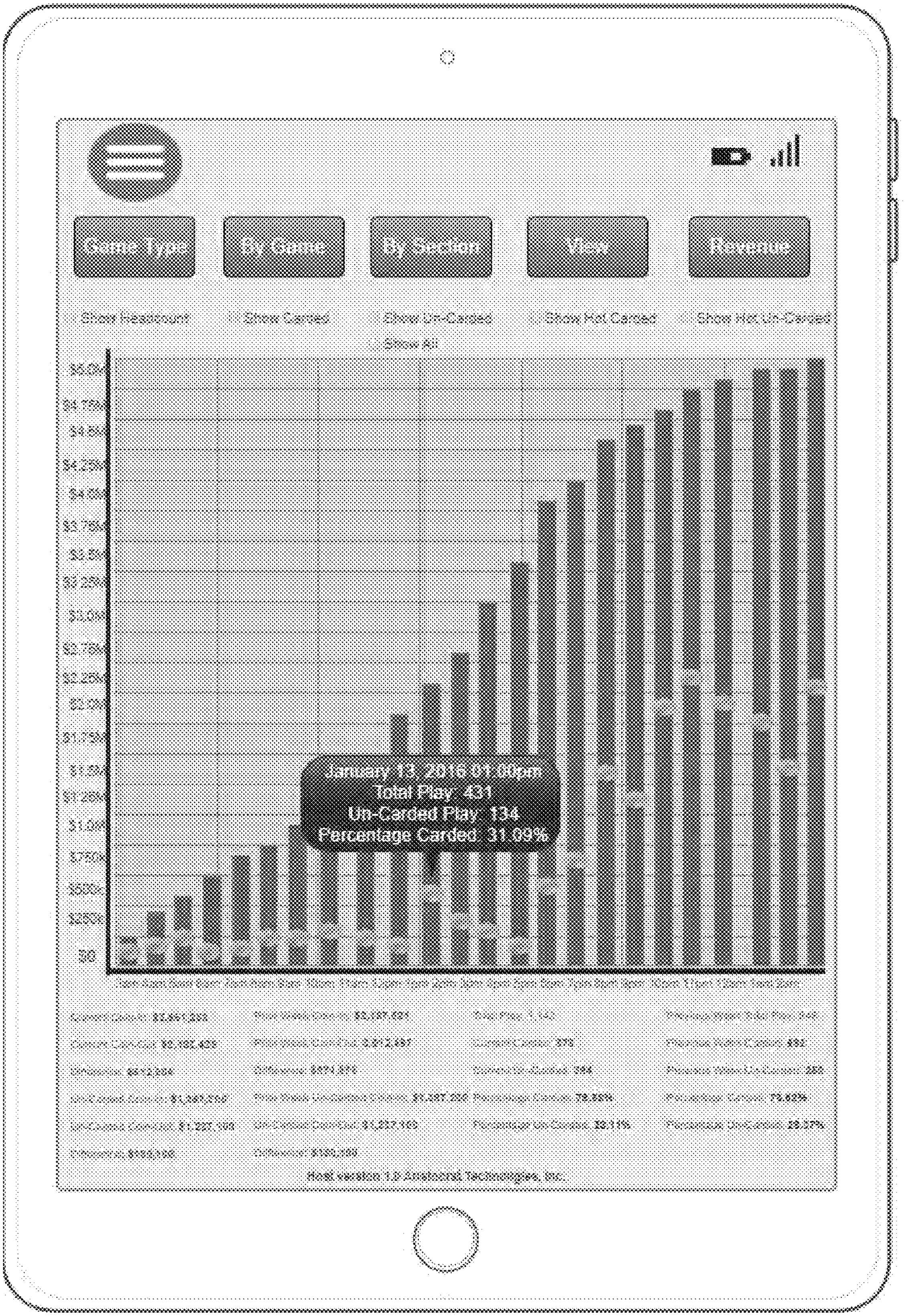
Figure 9:
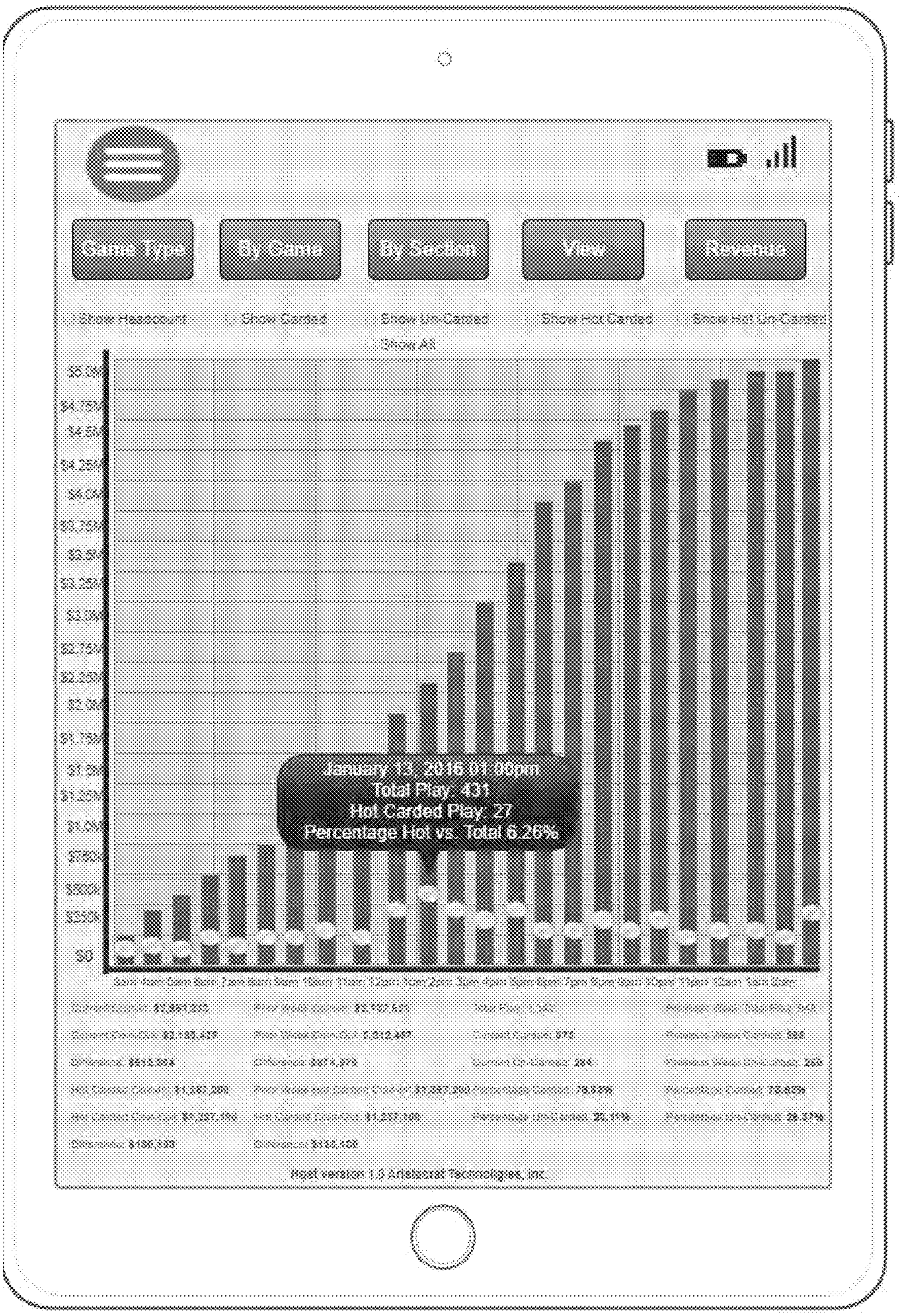
Figure 10:
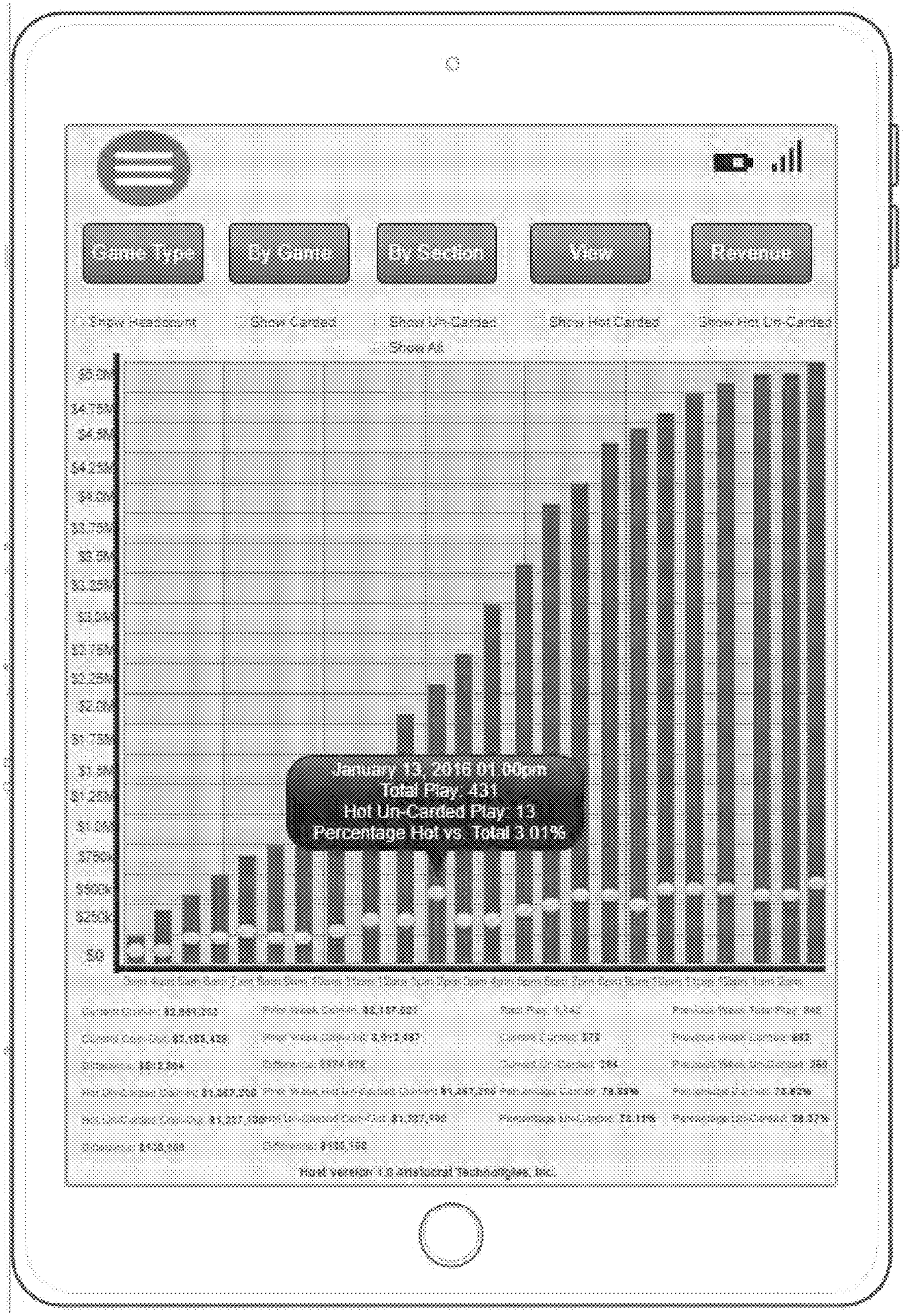
Figure 11:
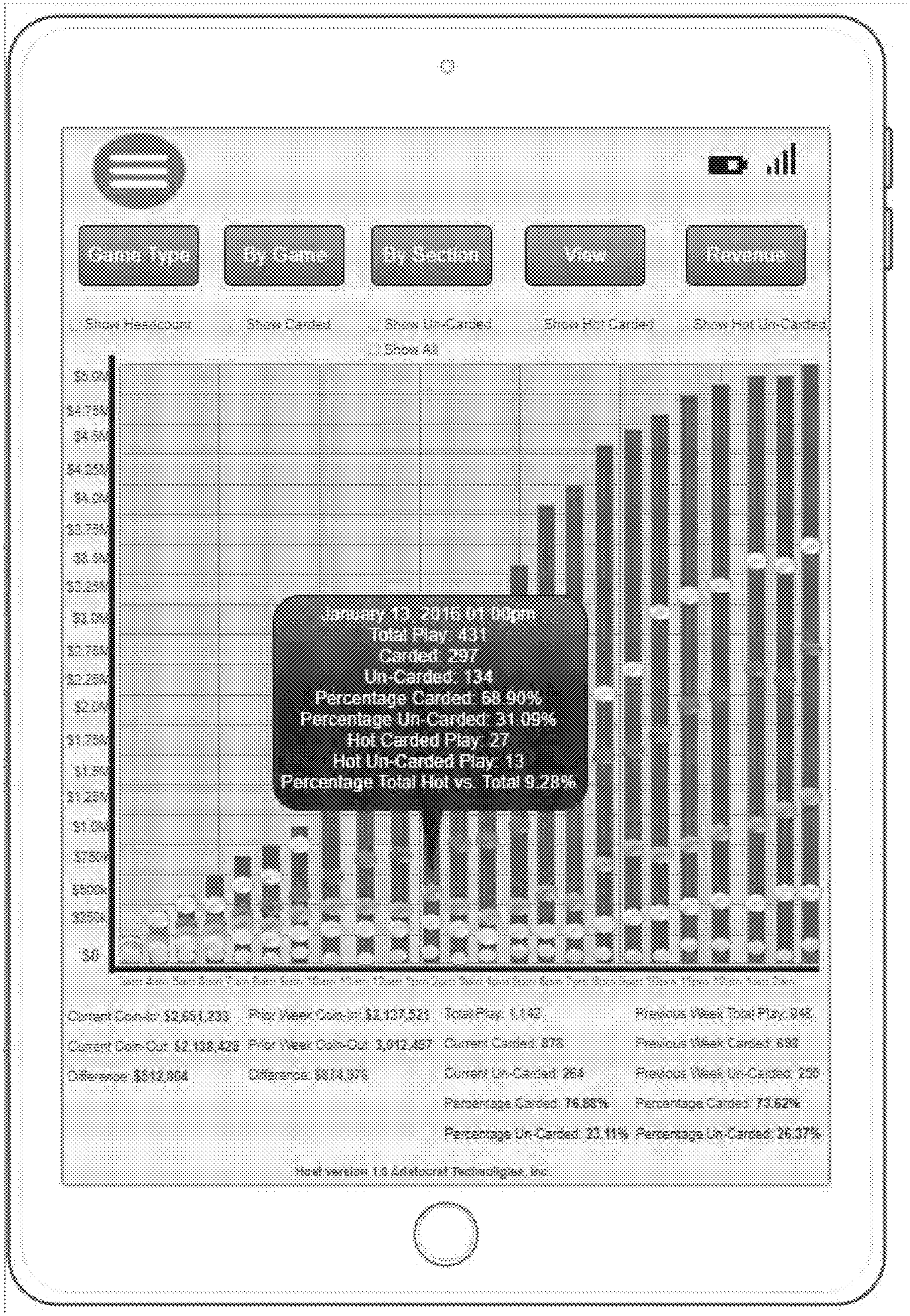
Figure 12:
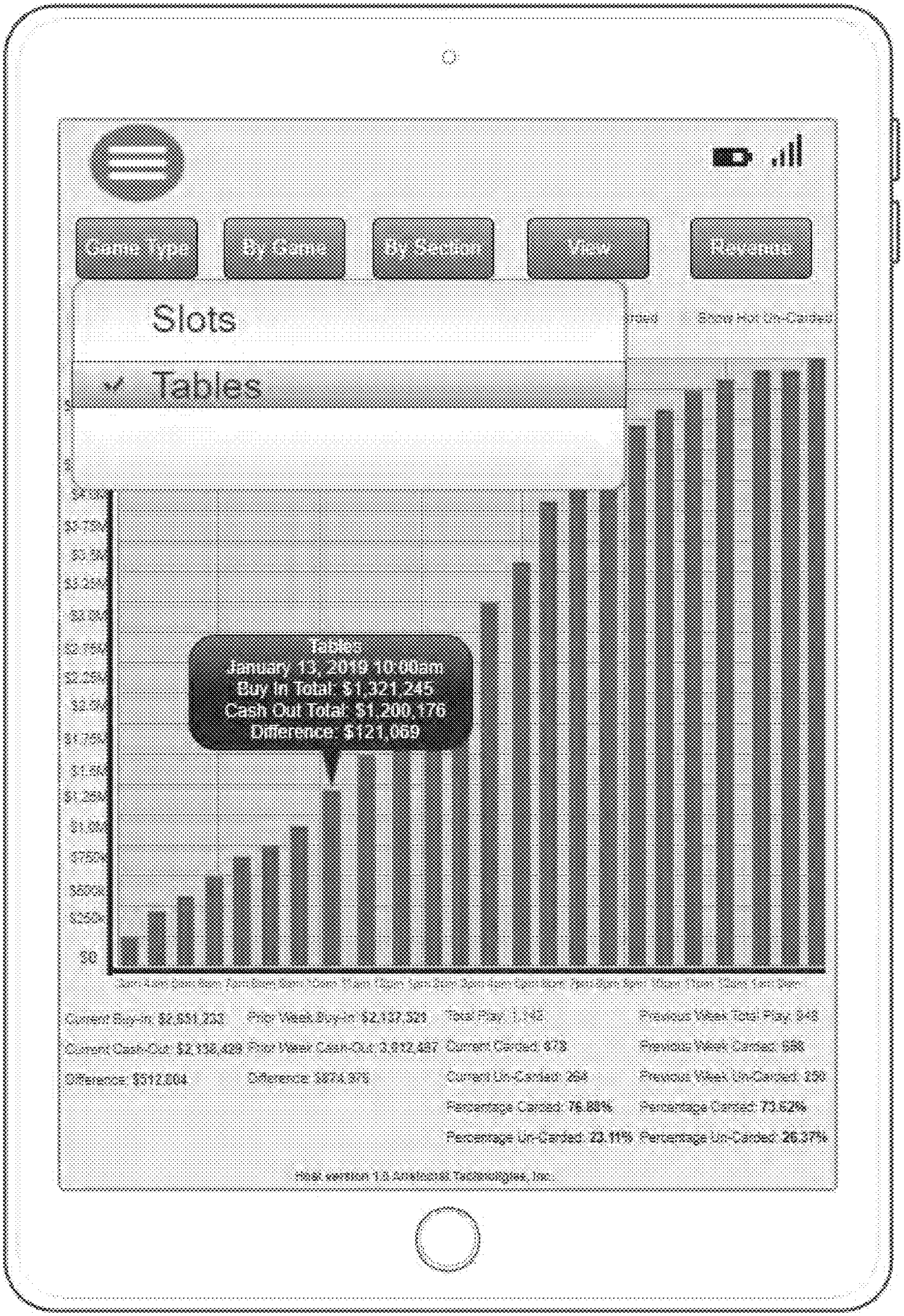
Figure 13:
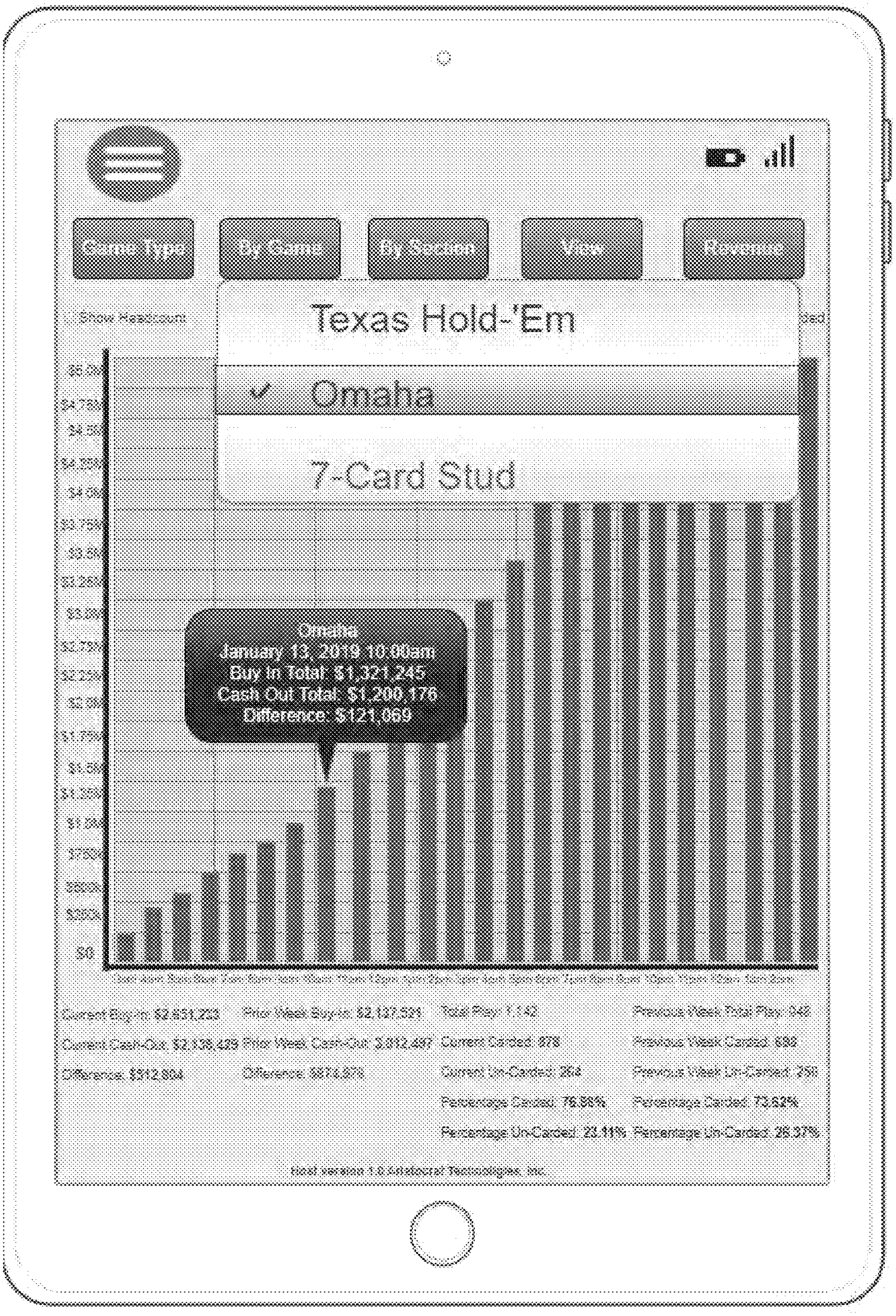
Figure 14:
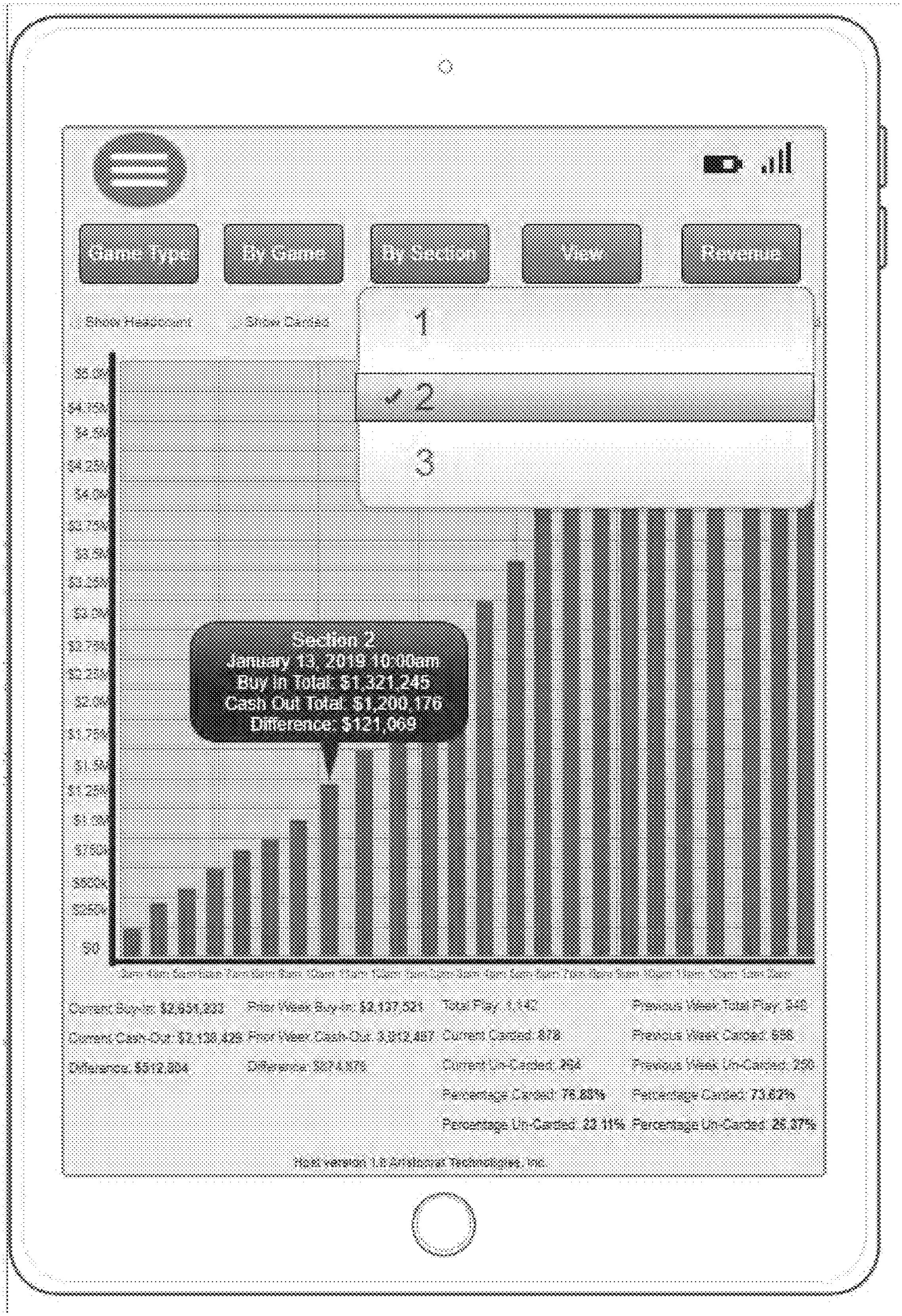
Figure 15:
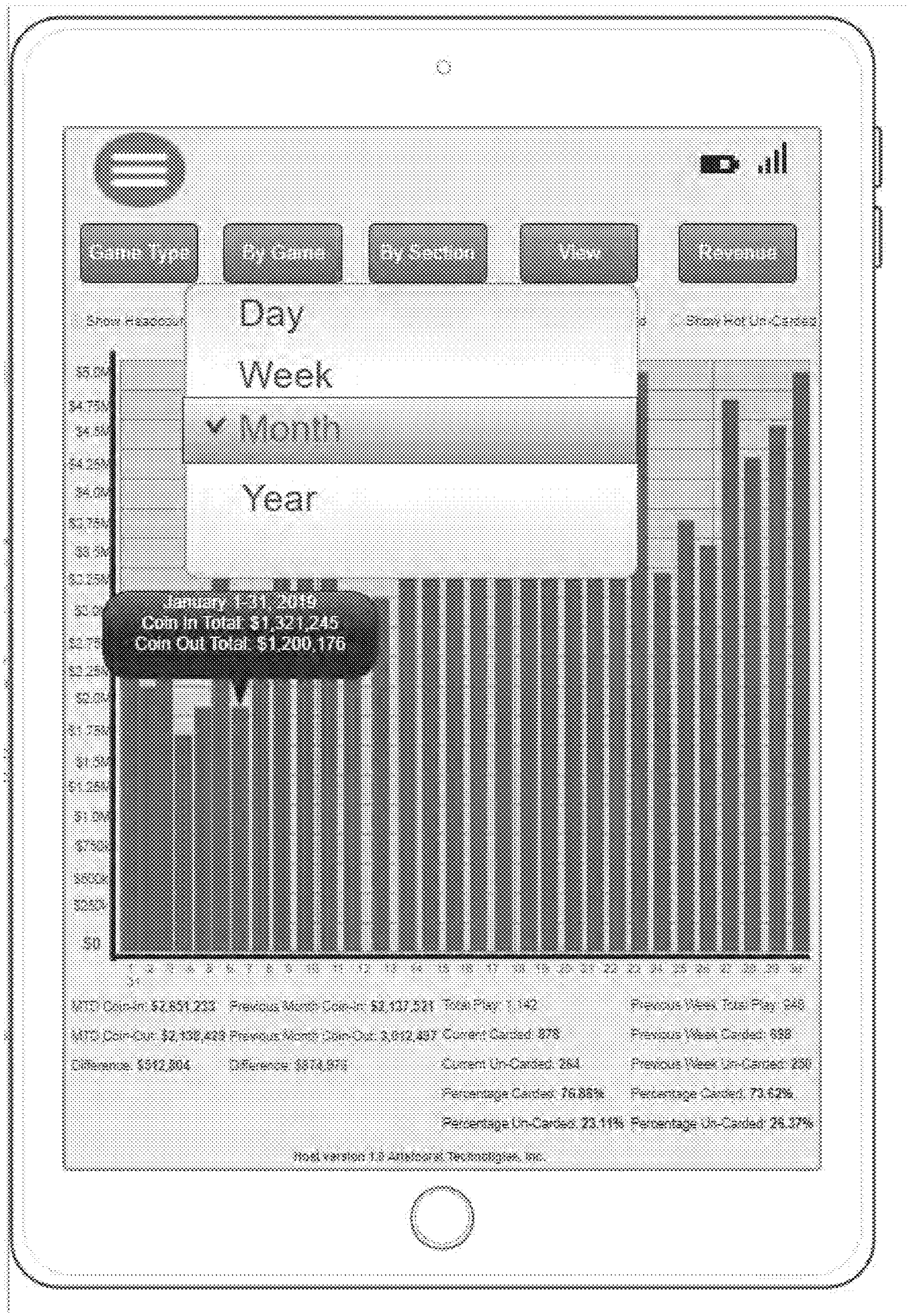
Figure 16:
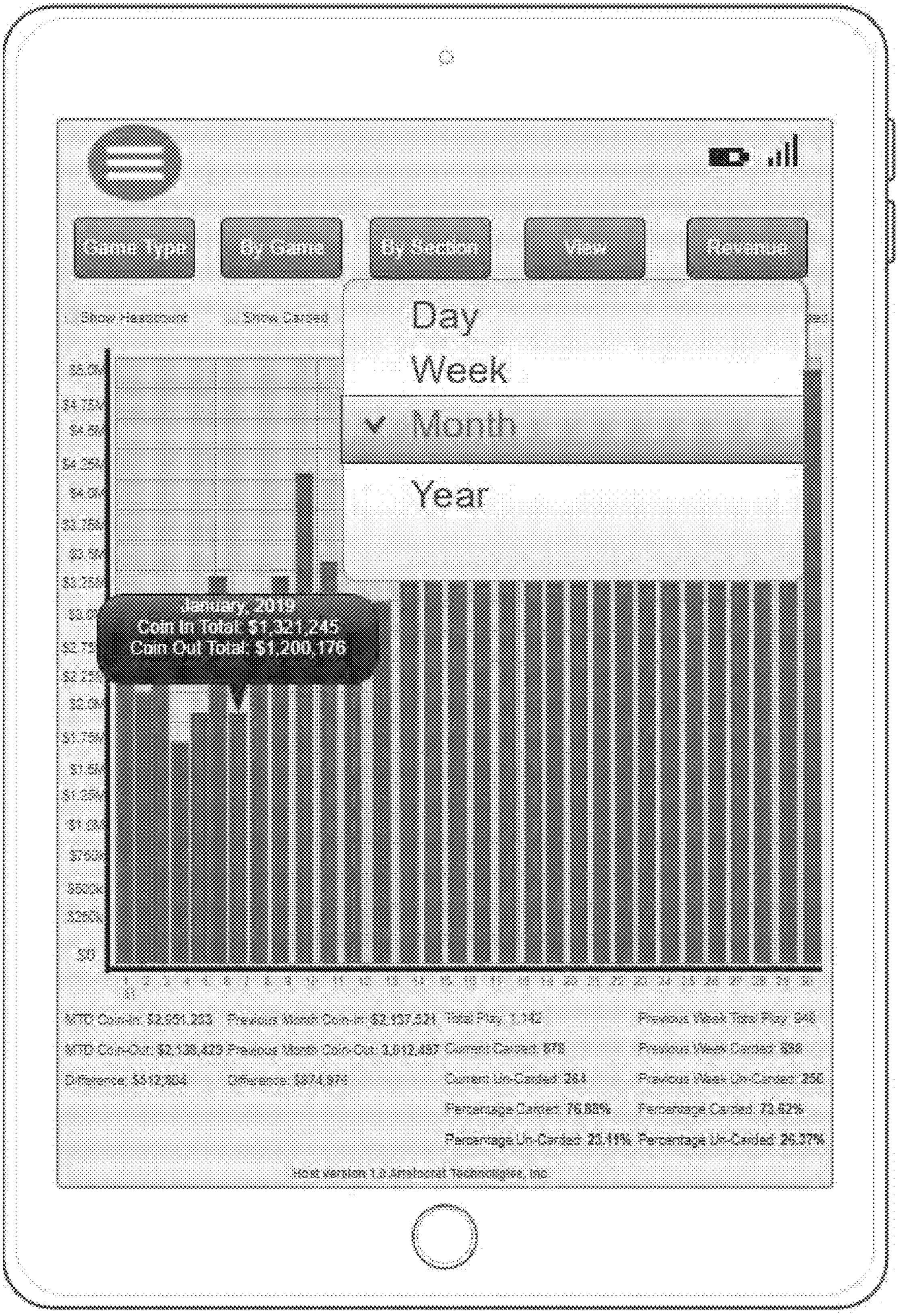
Figure 17:
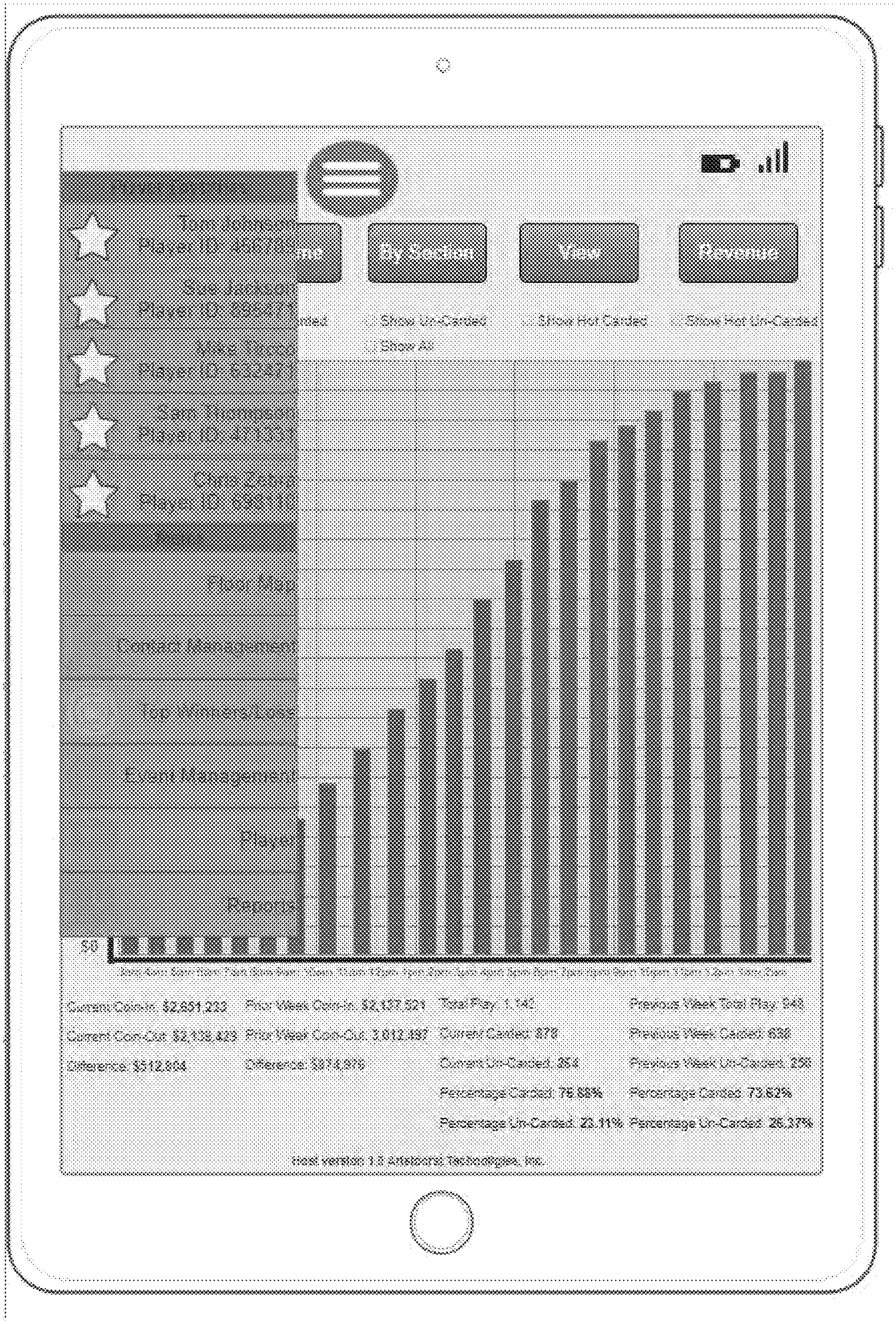
Figure 18:
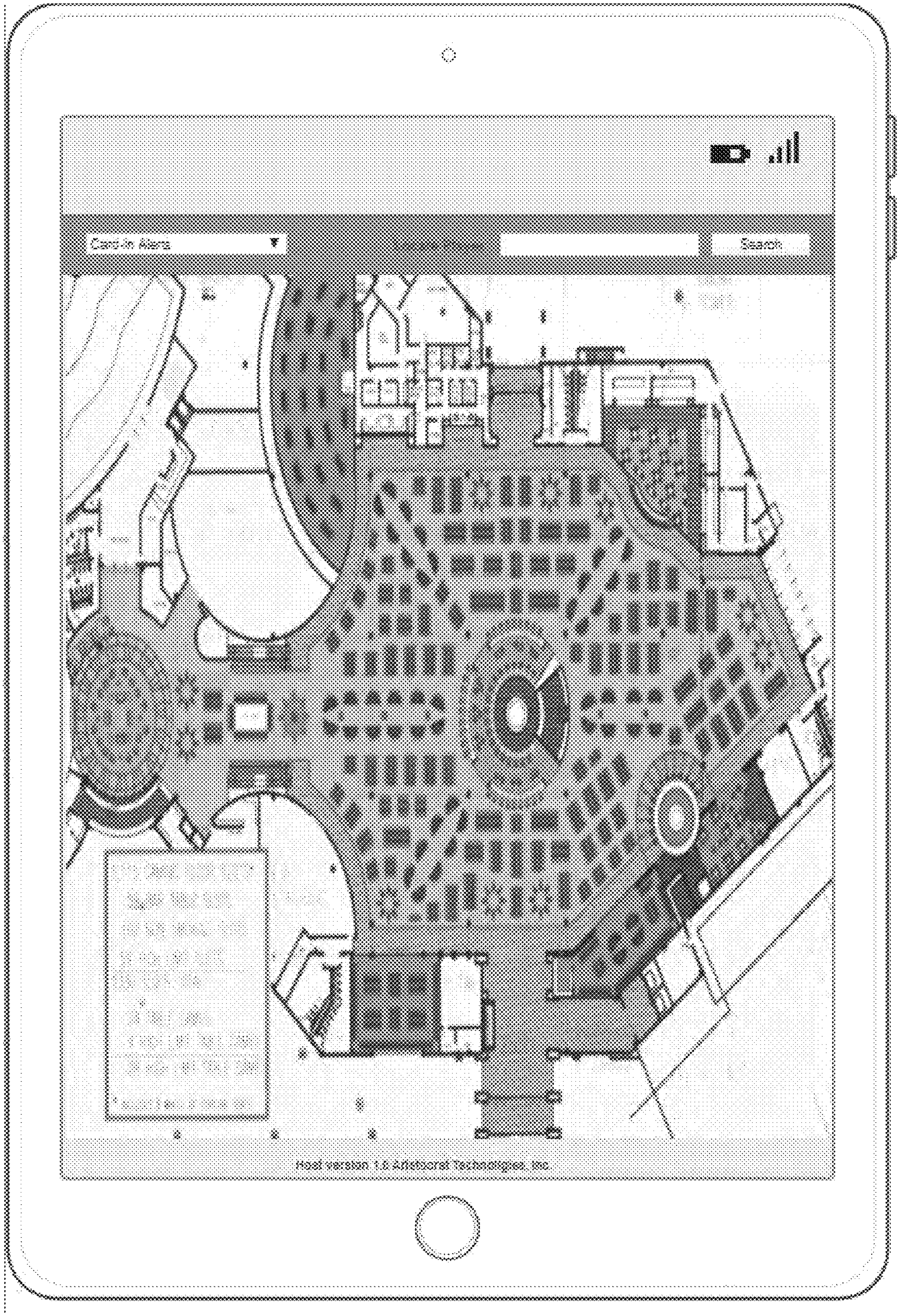
Figure 19:
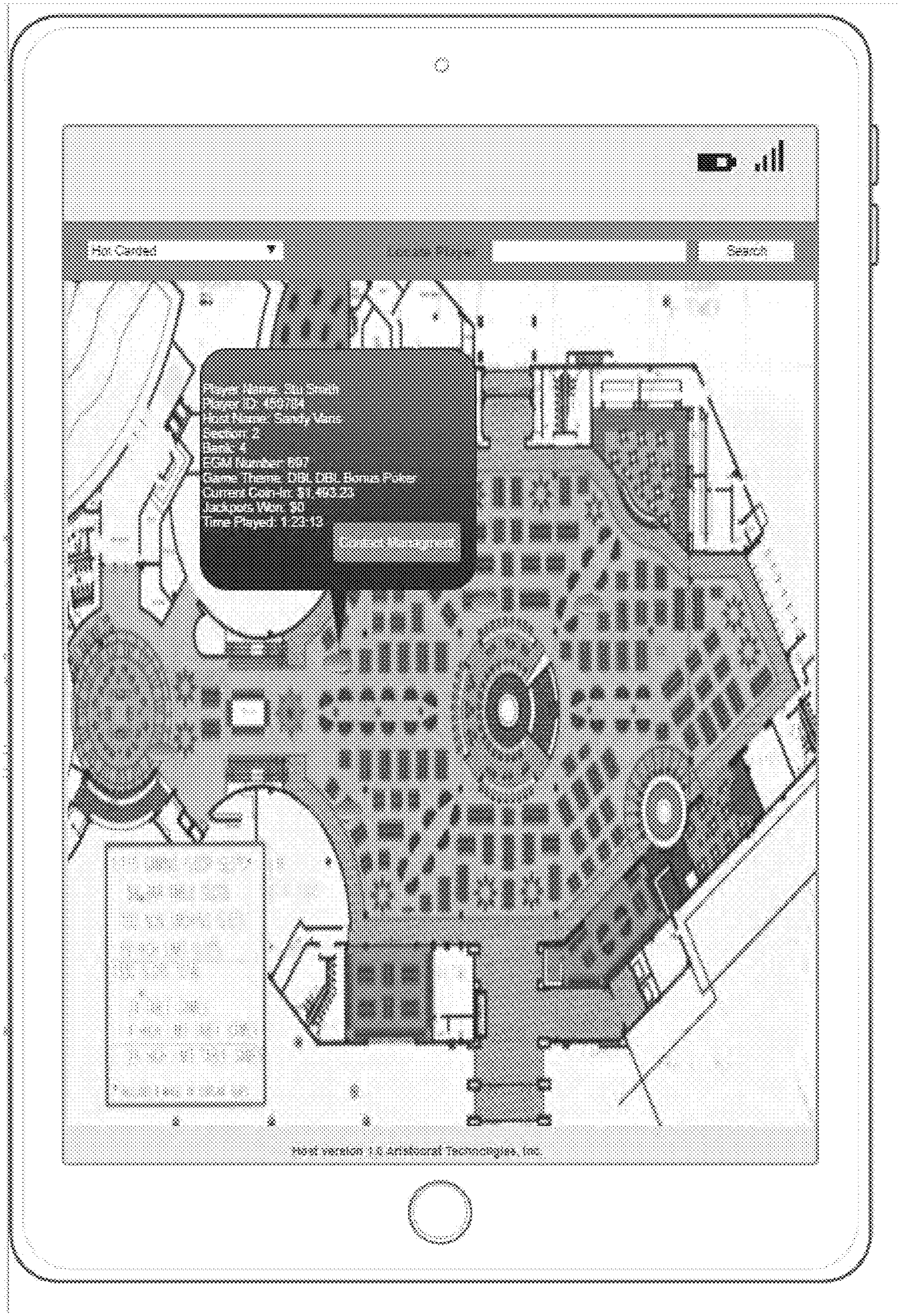
Figure 20:
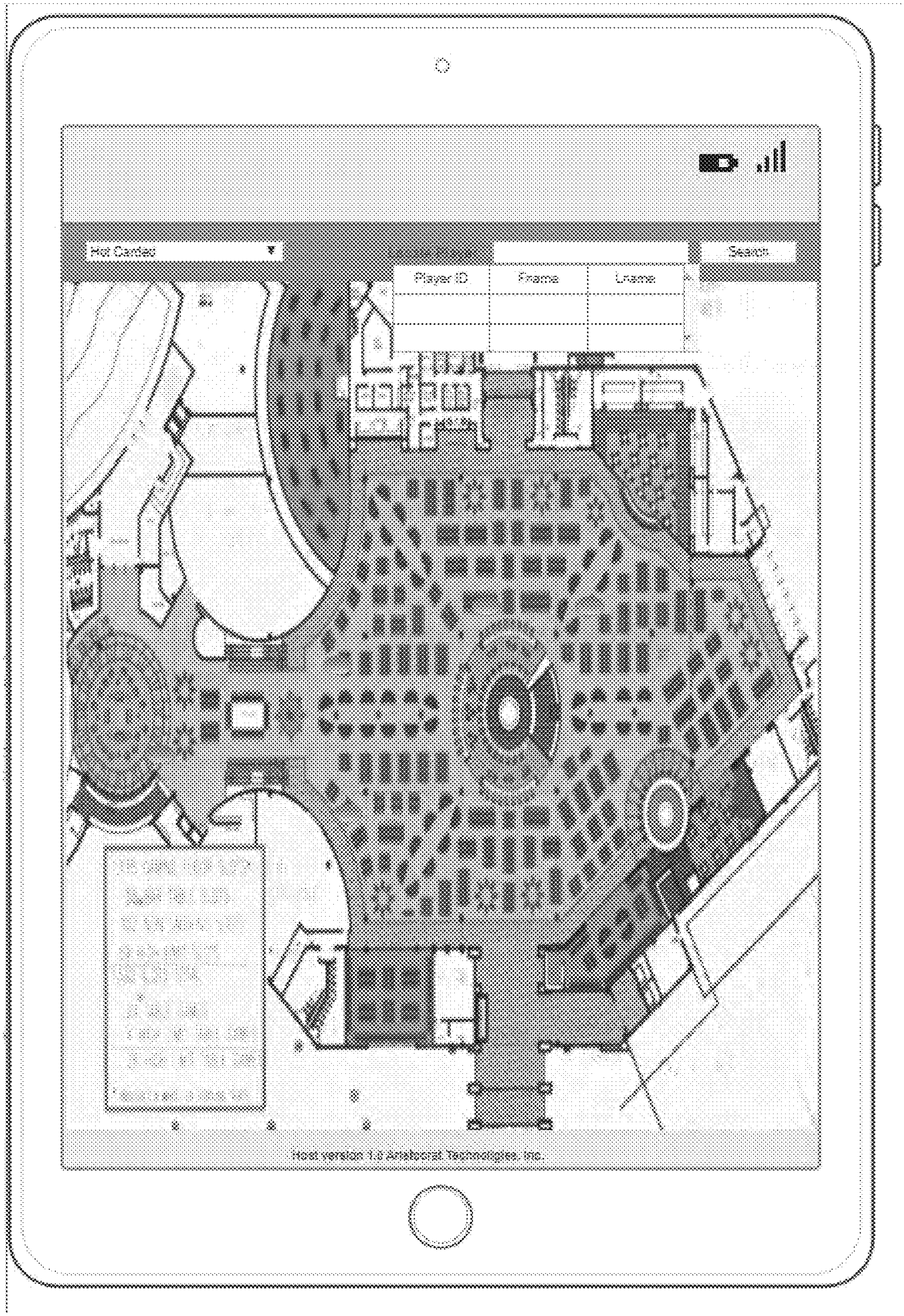
Figure 21:
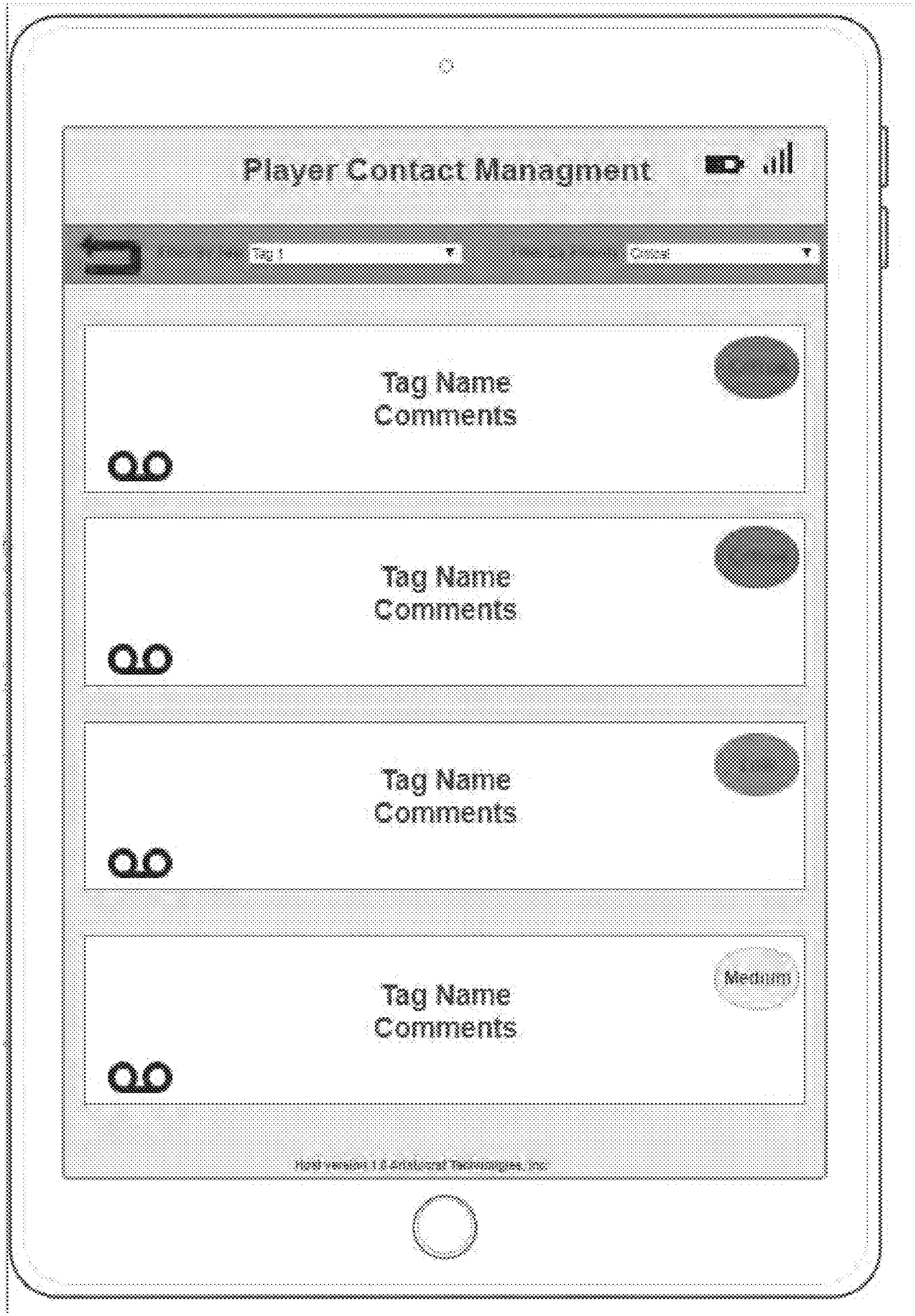
Figure 22:
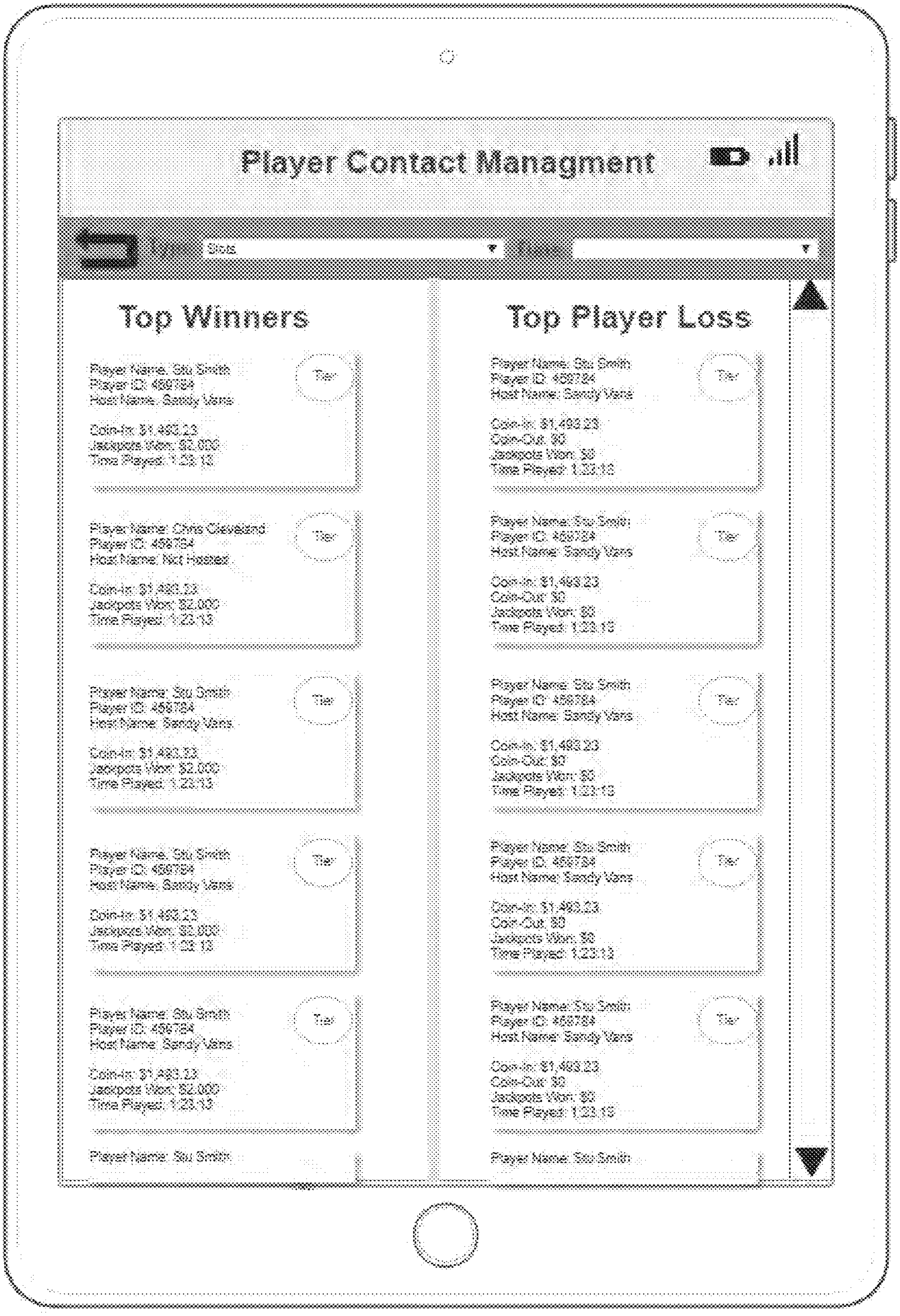
Figure 23:
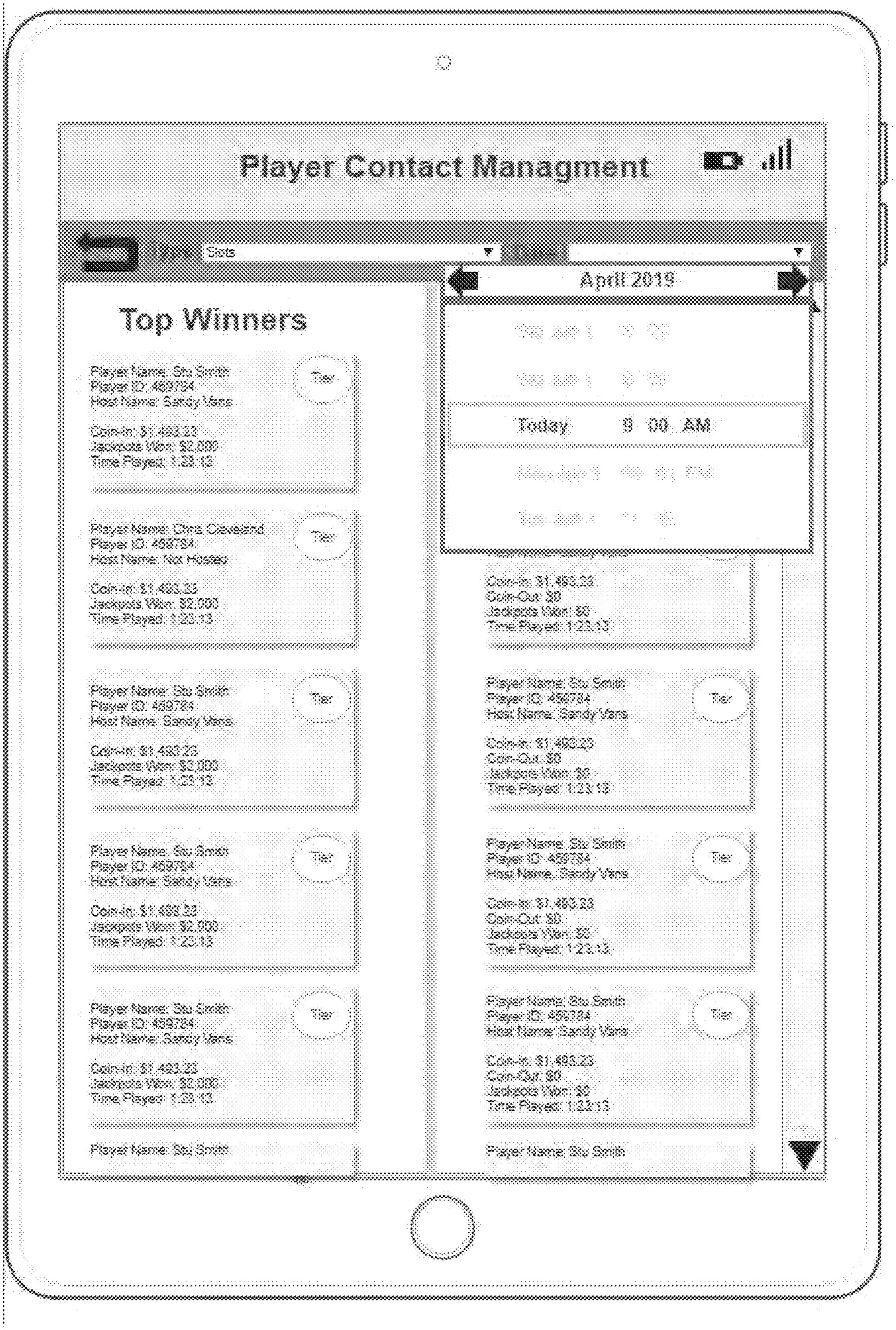
Figure 24:
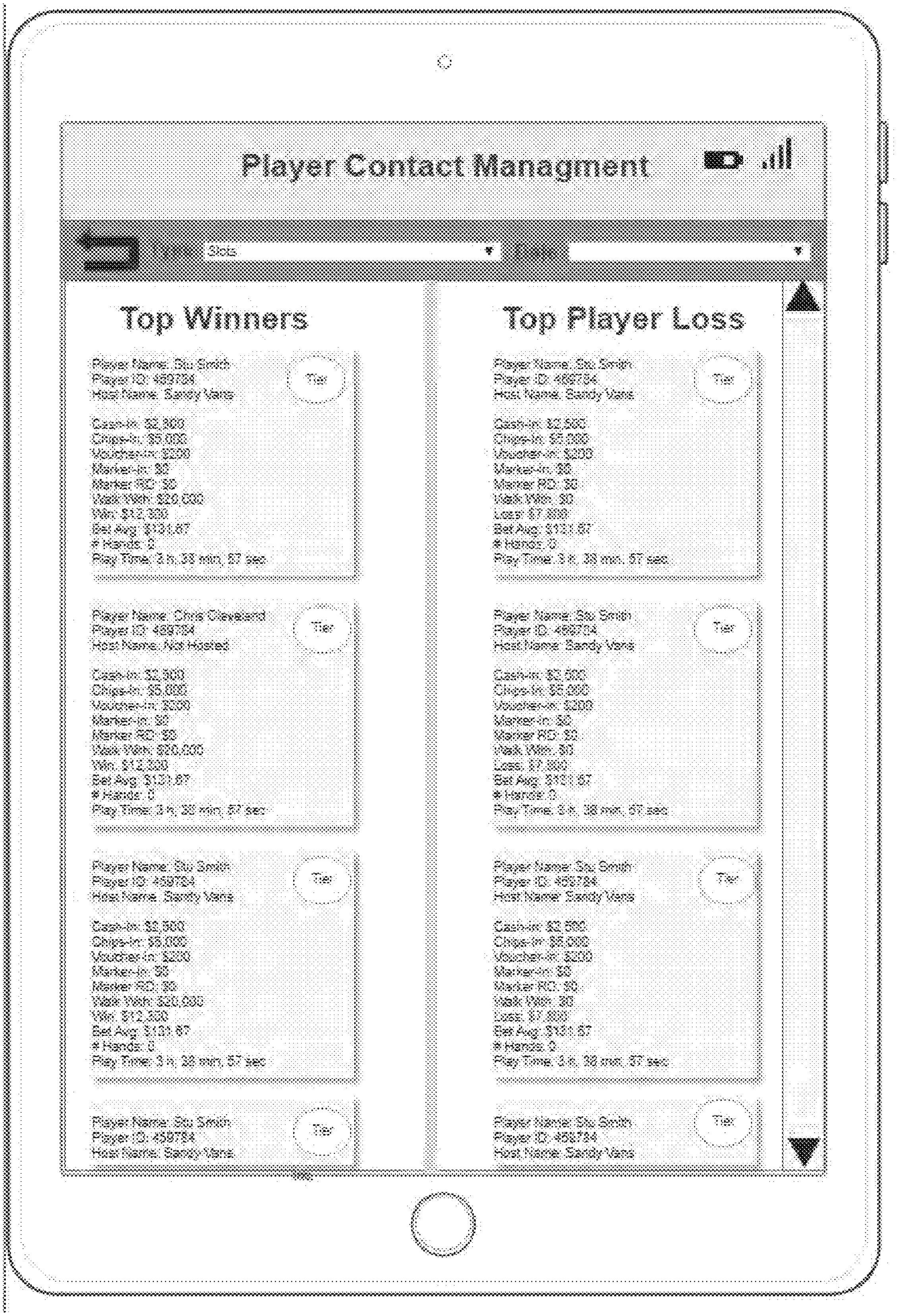
Figure 25:
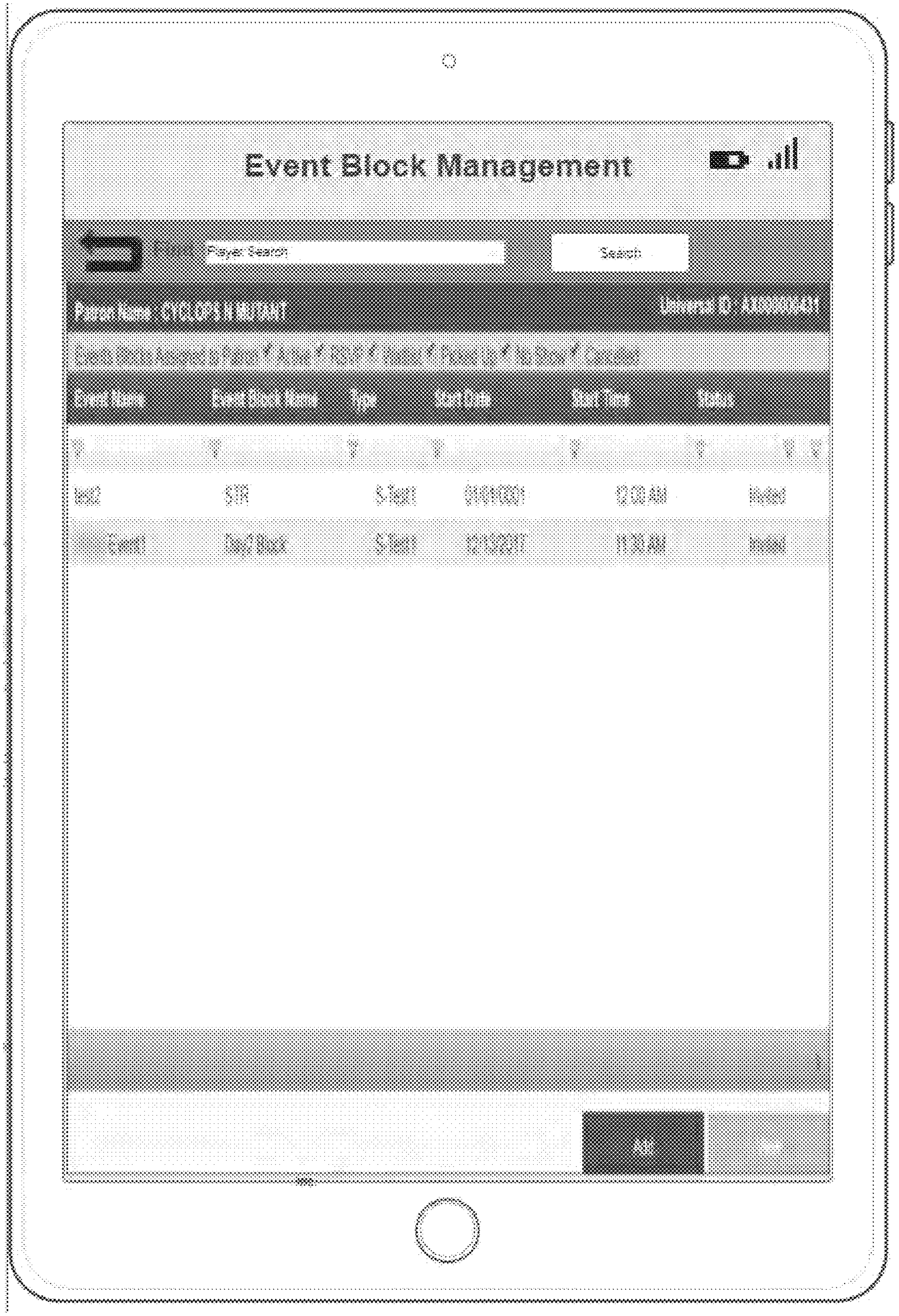
Figure 26:
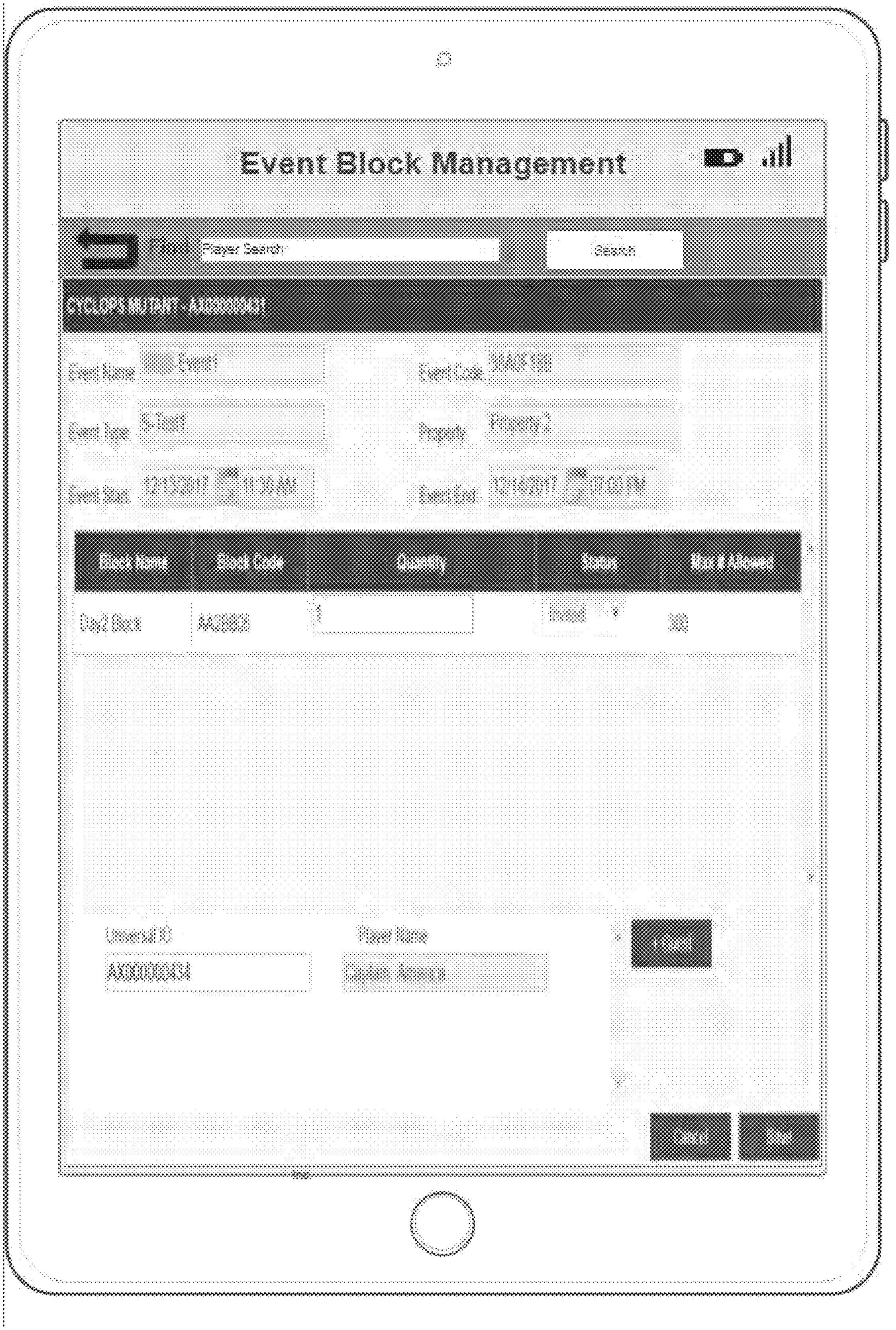
Figure 27:
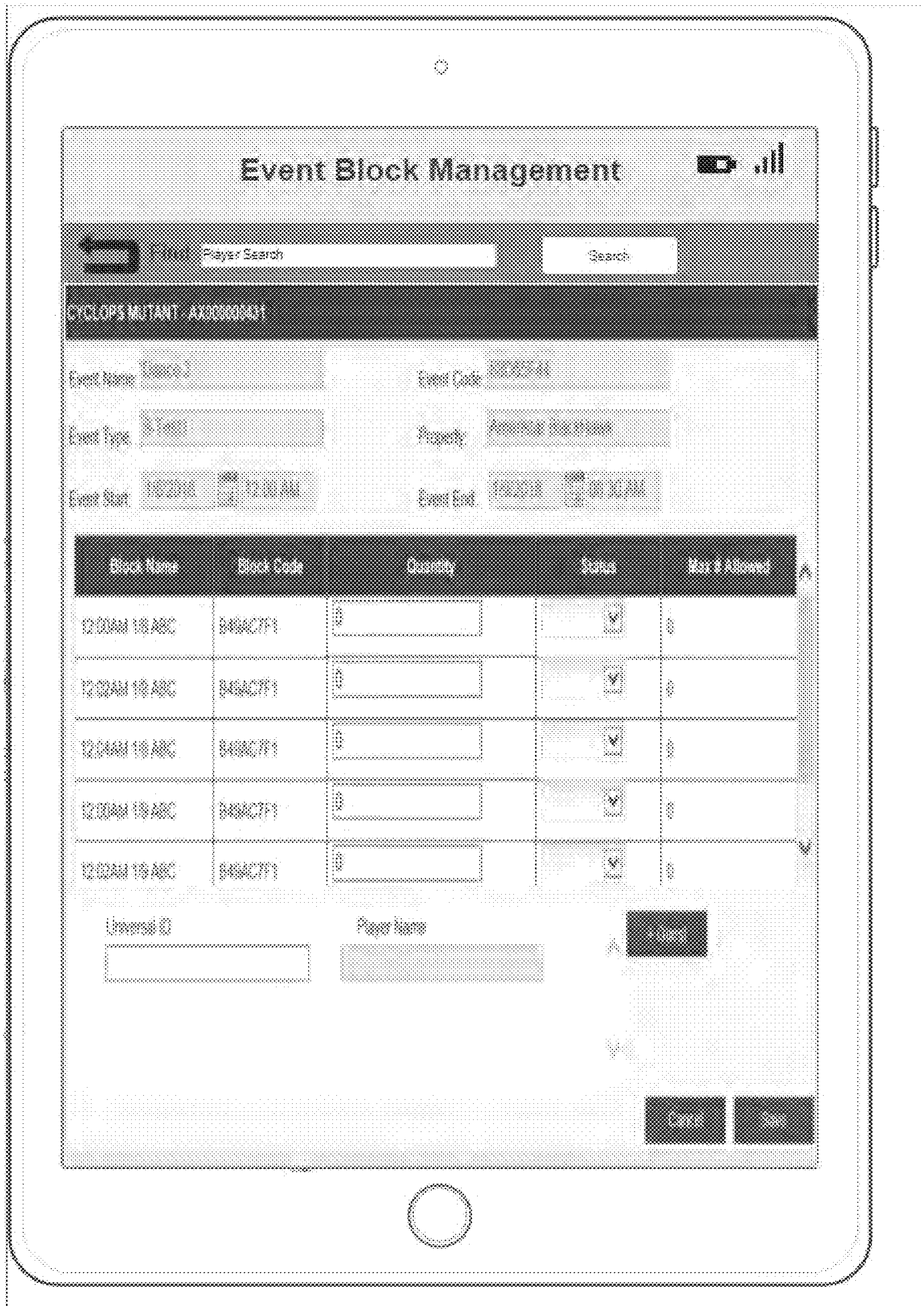
Figure 28:
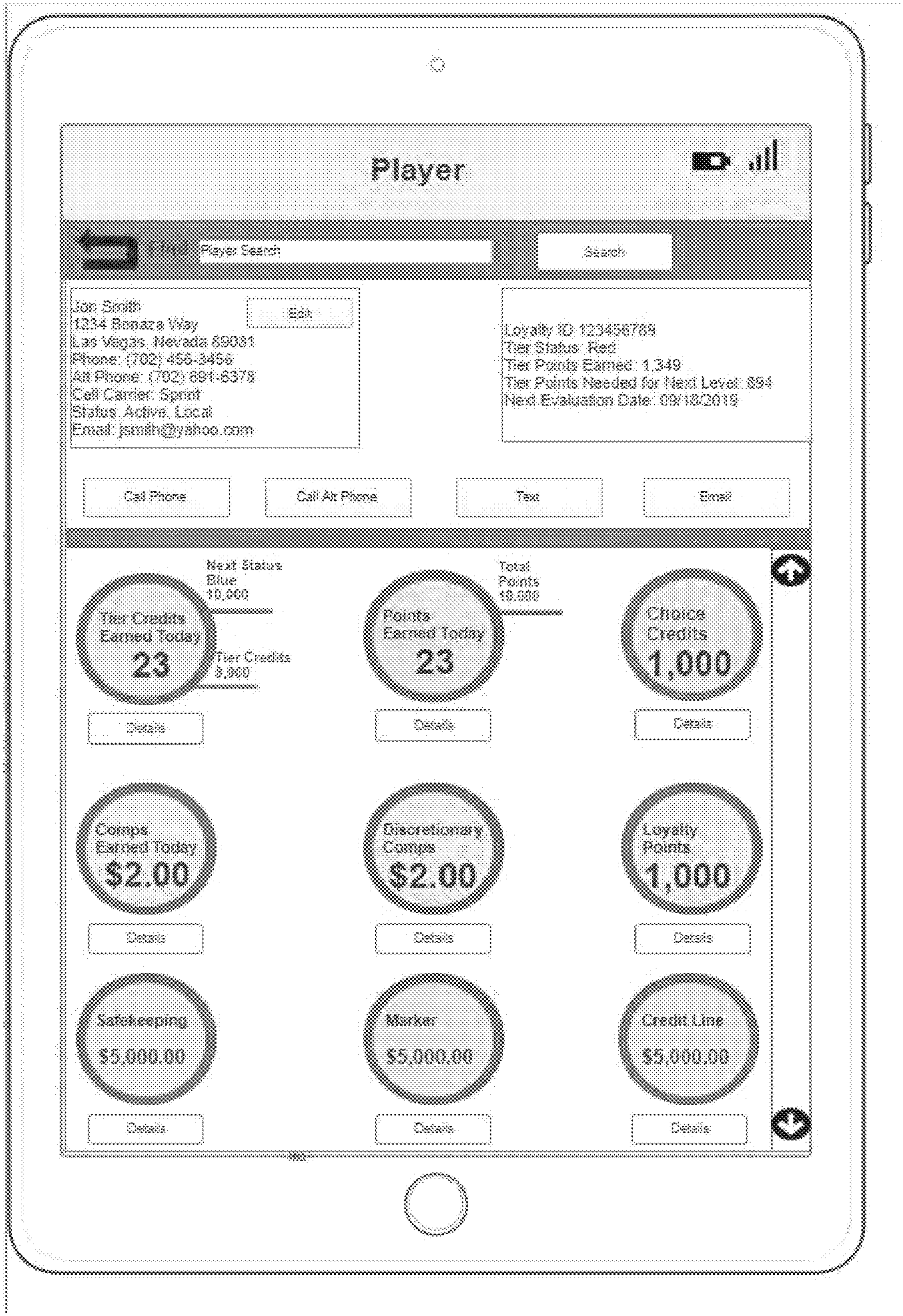
Figure 29:
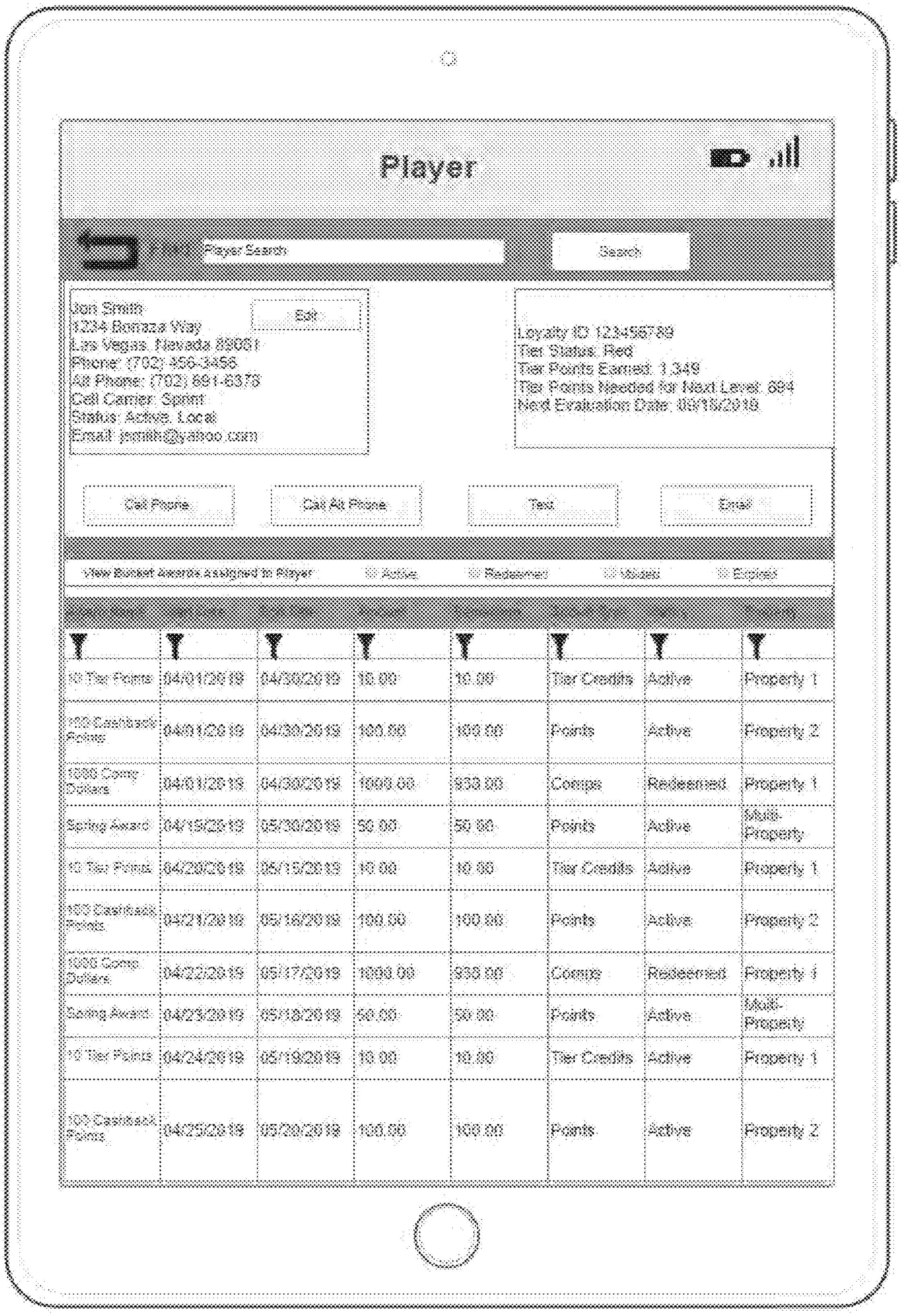
Figure 30:
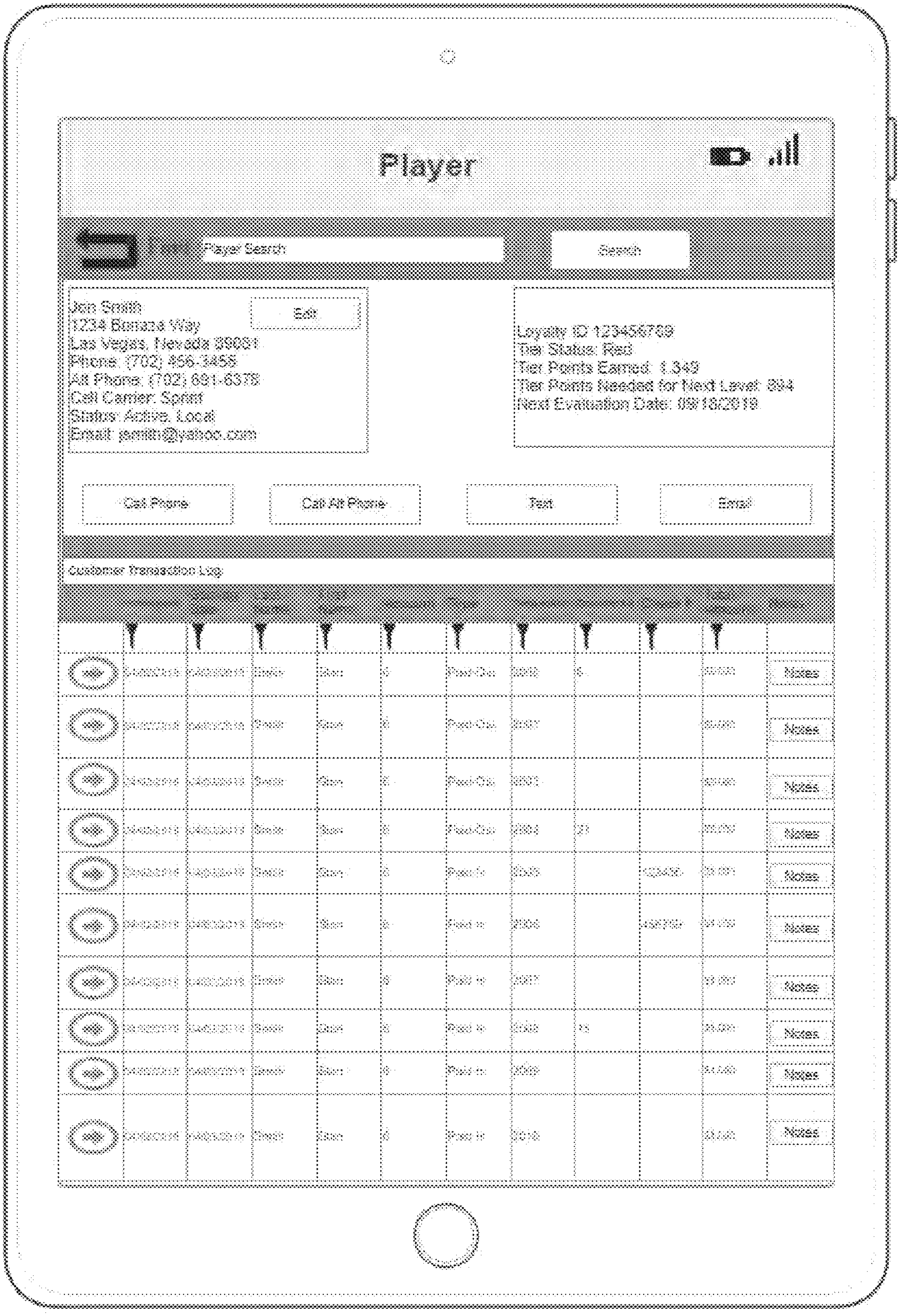
Figure 31:
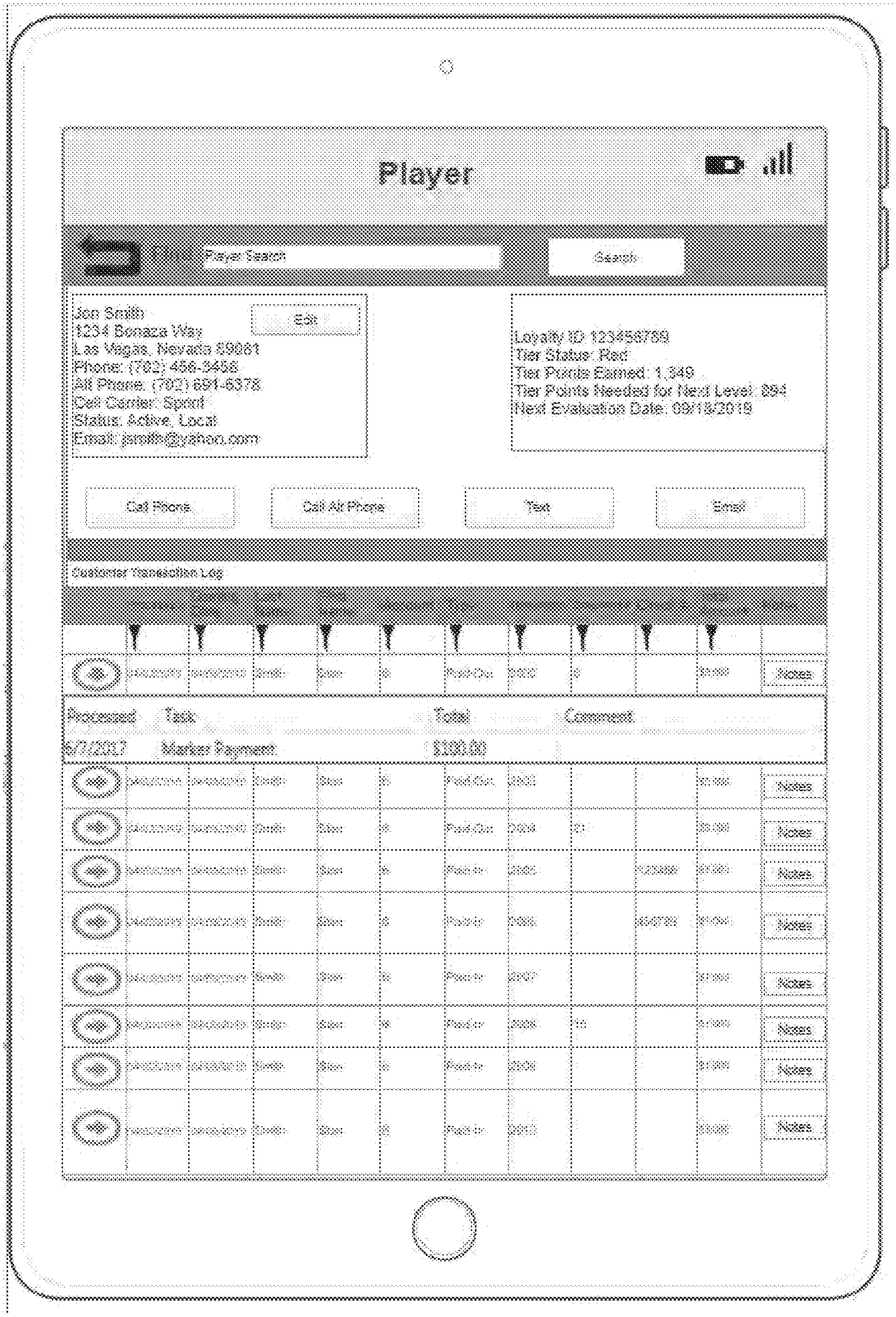
Figure 32:
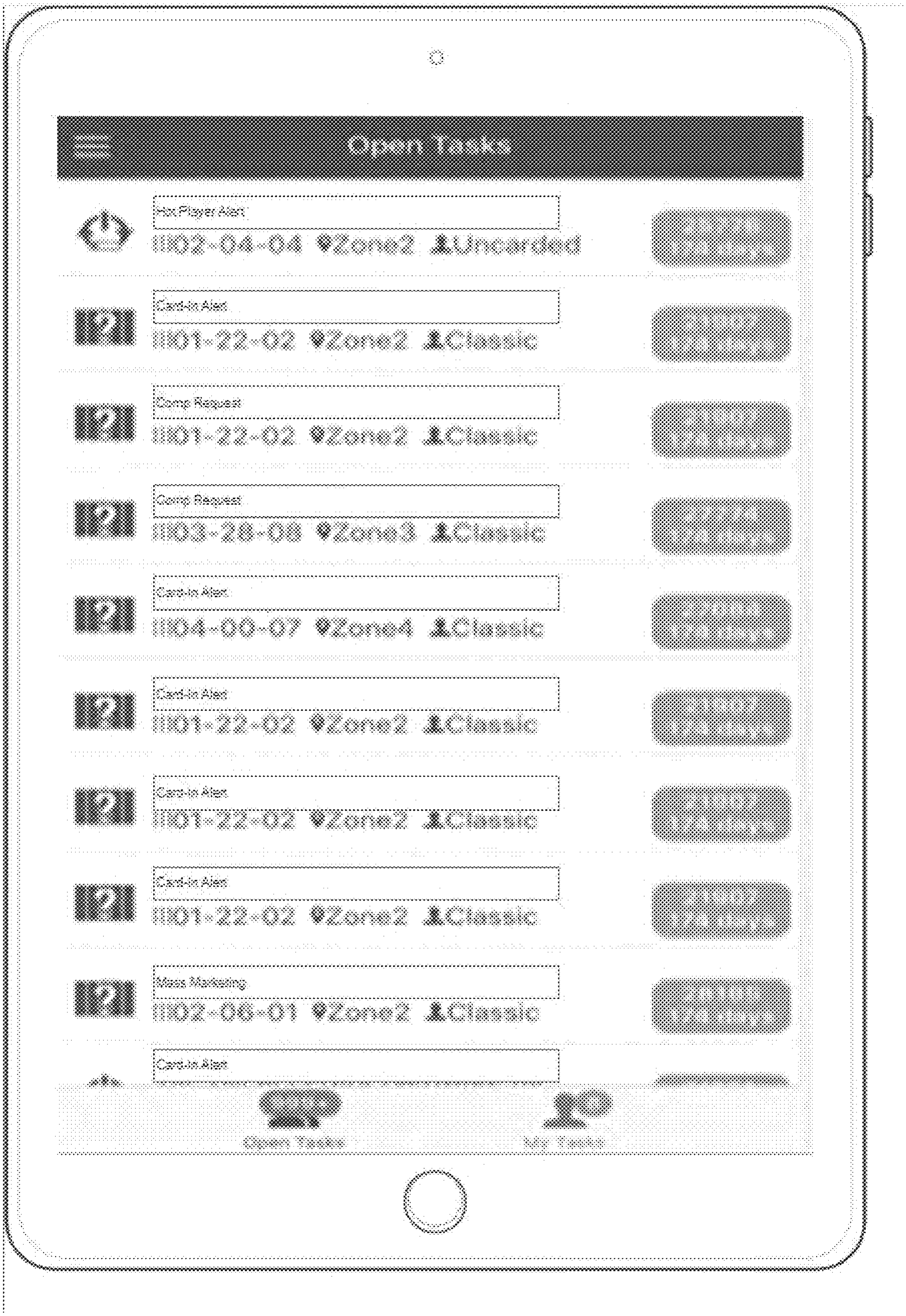
Figure 33:
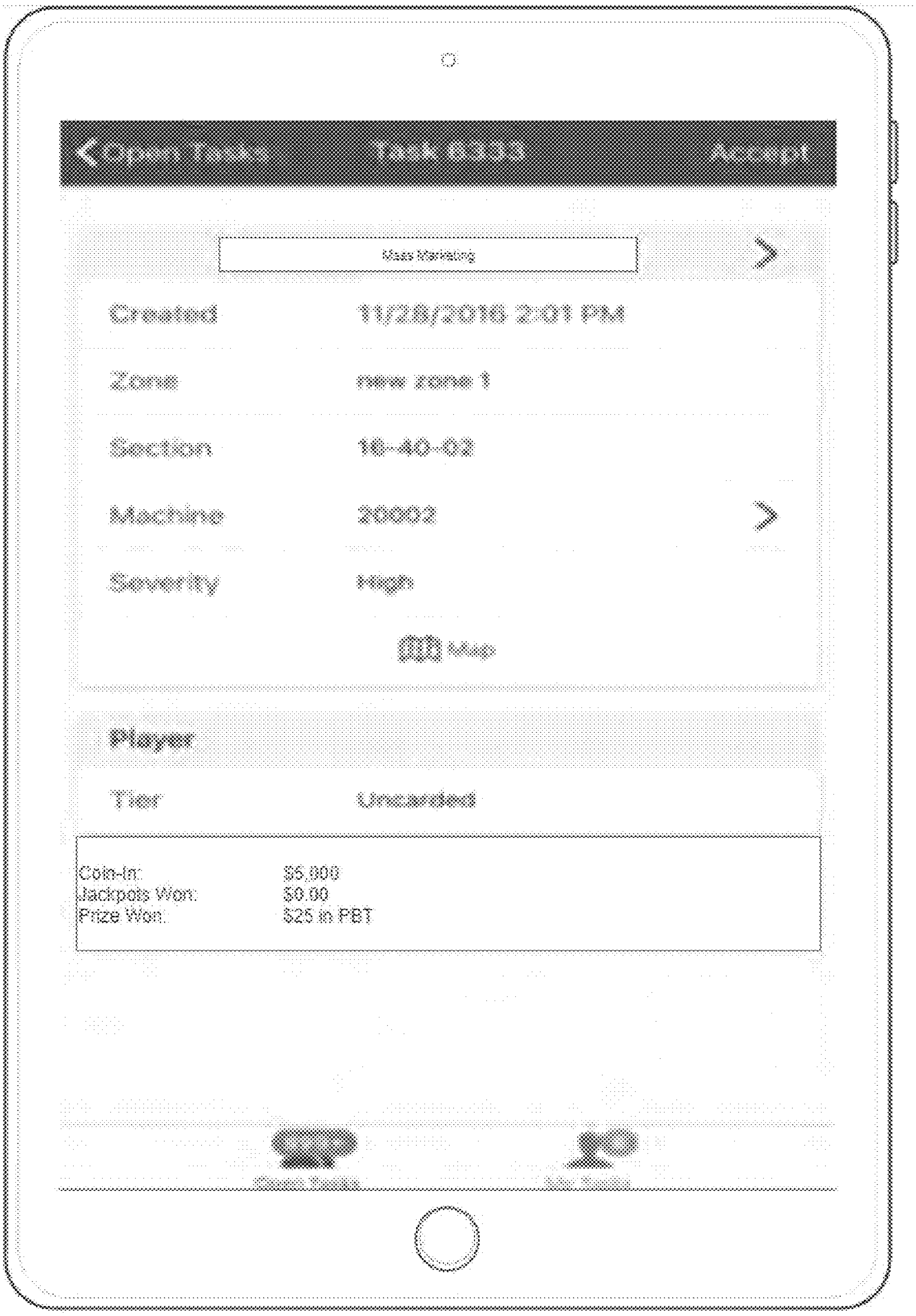
Figure 34:
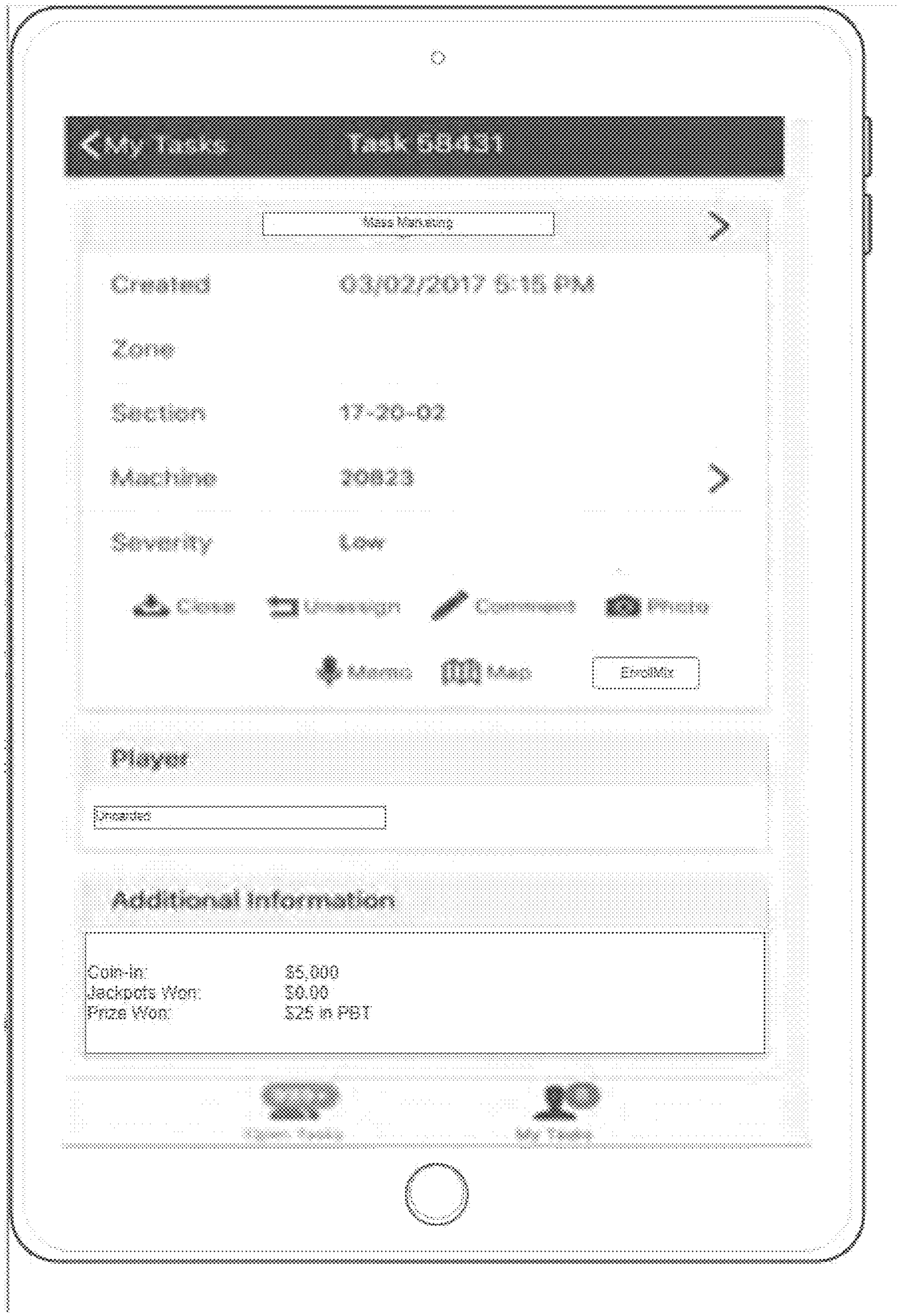
Figure 35:
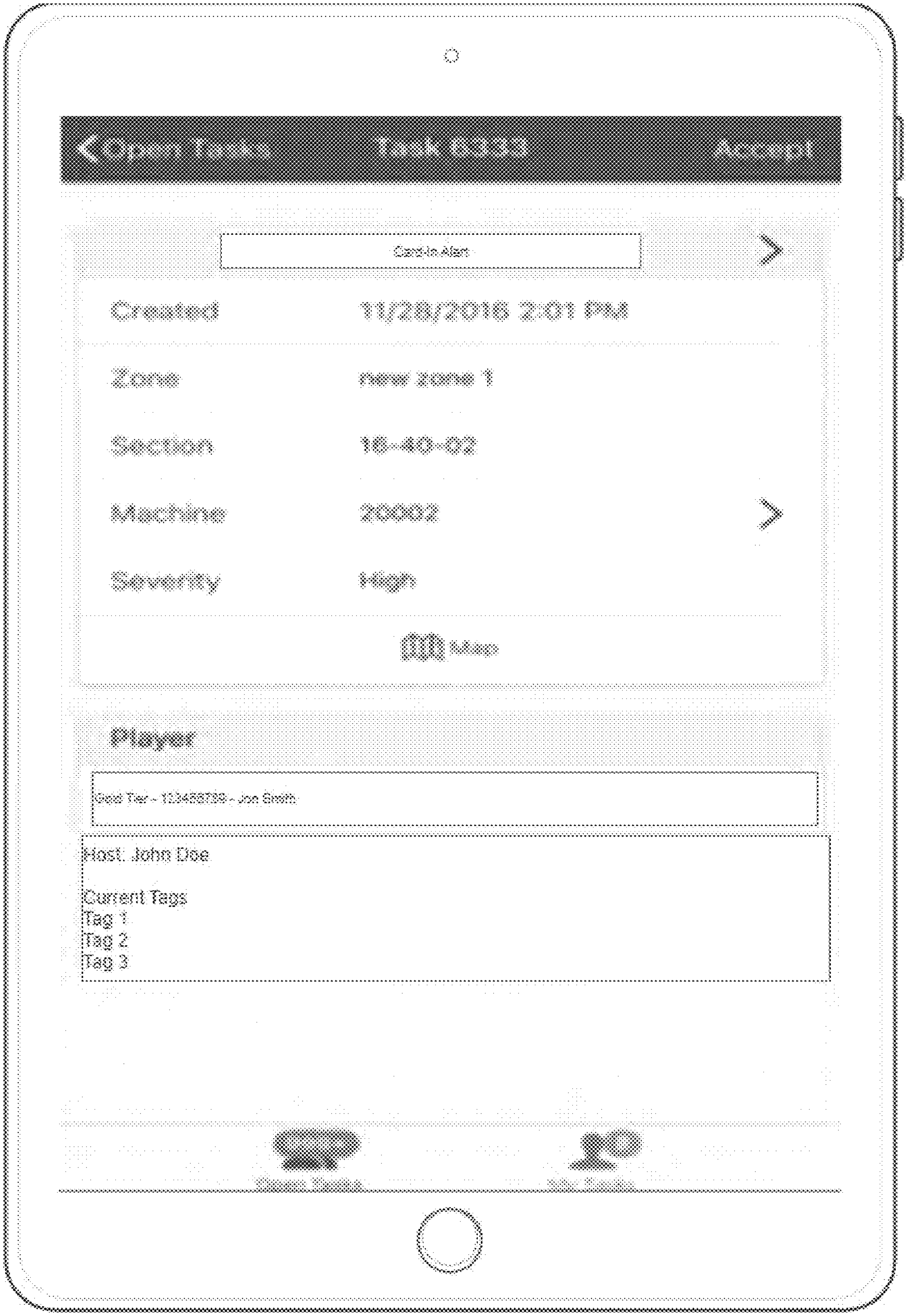
Figure 36:
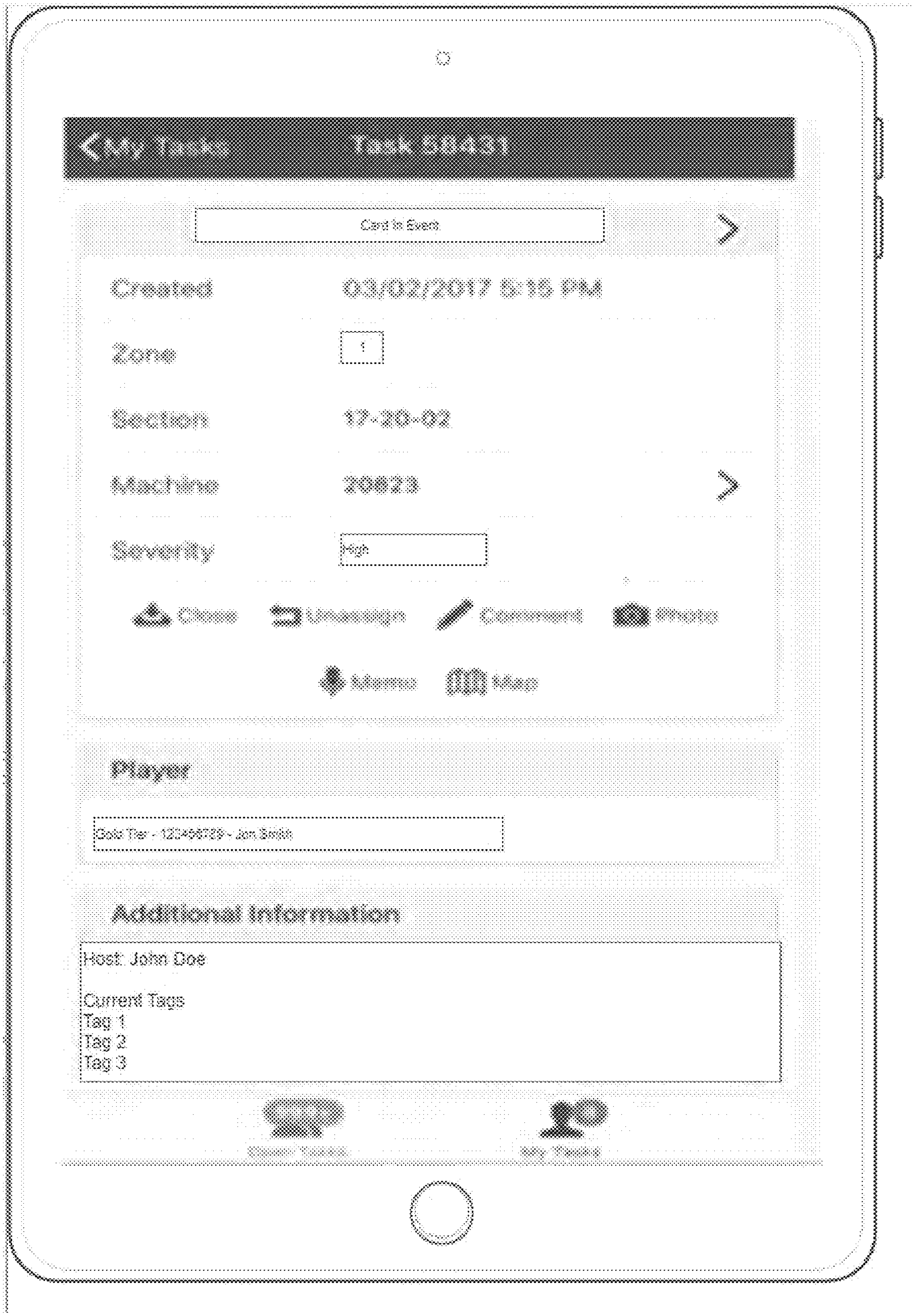
Figure 37:
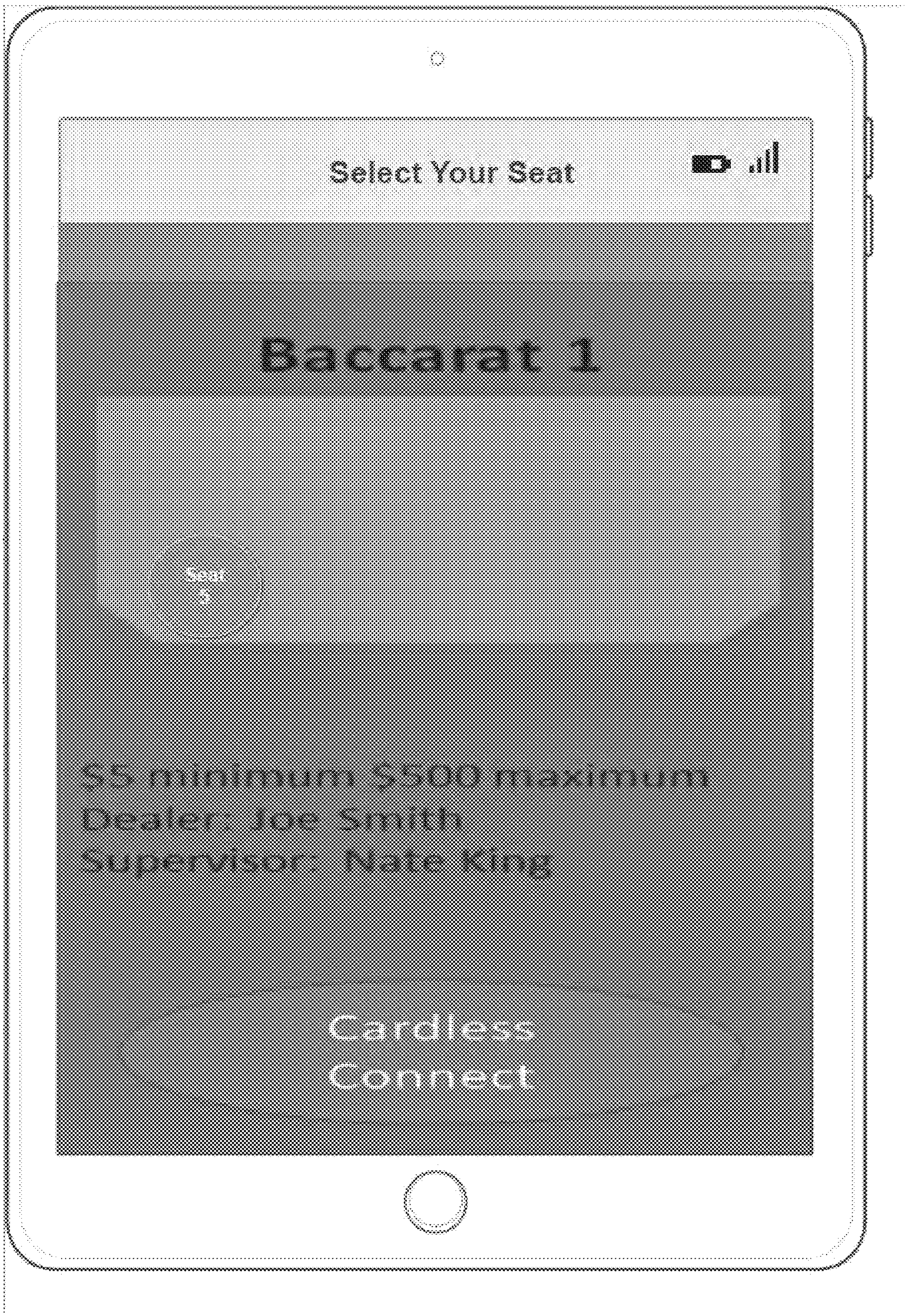
FIG. 37-FIG. 42 are example illustrations of a player dashboard, which may be provided to a player, and which may include a variety of summary and real-time data as well as one or more options to communicate with casino personnel.
Figure 38:
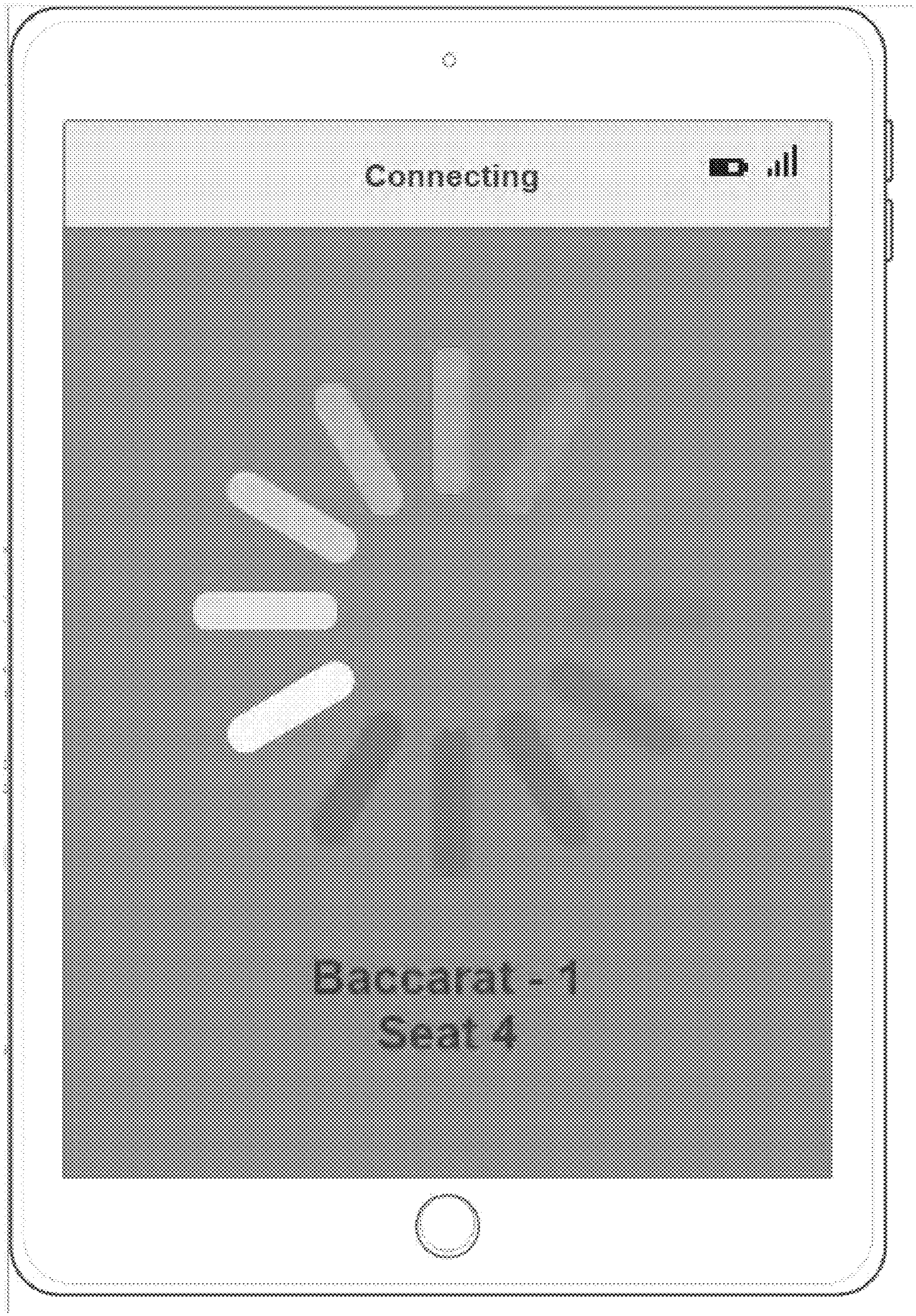
Figure 39:
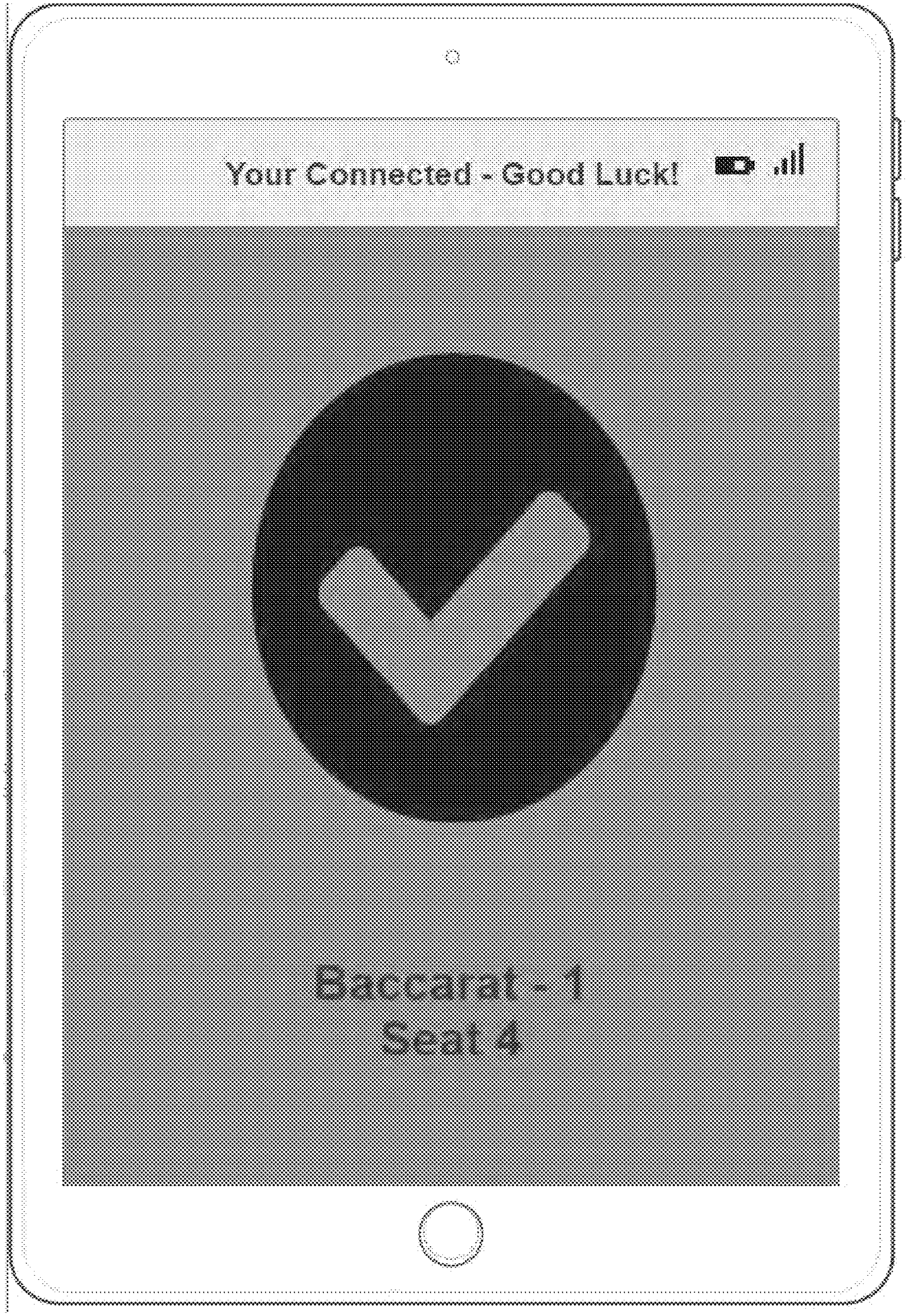
Figure 40:
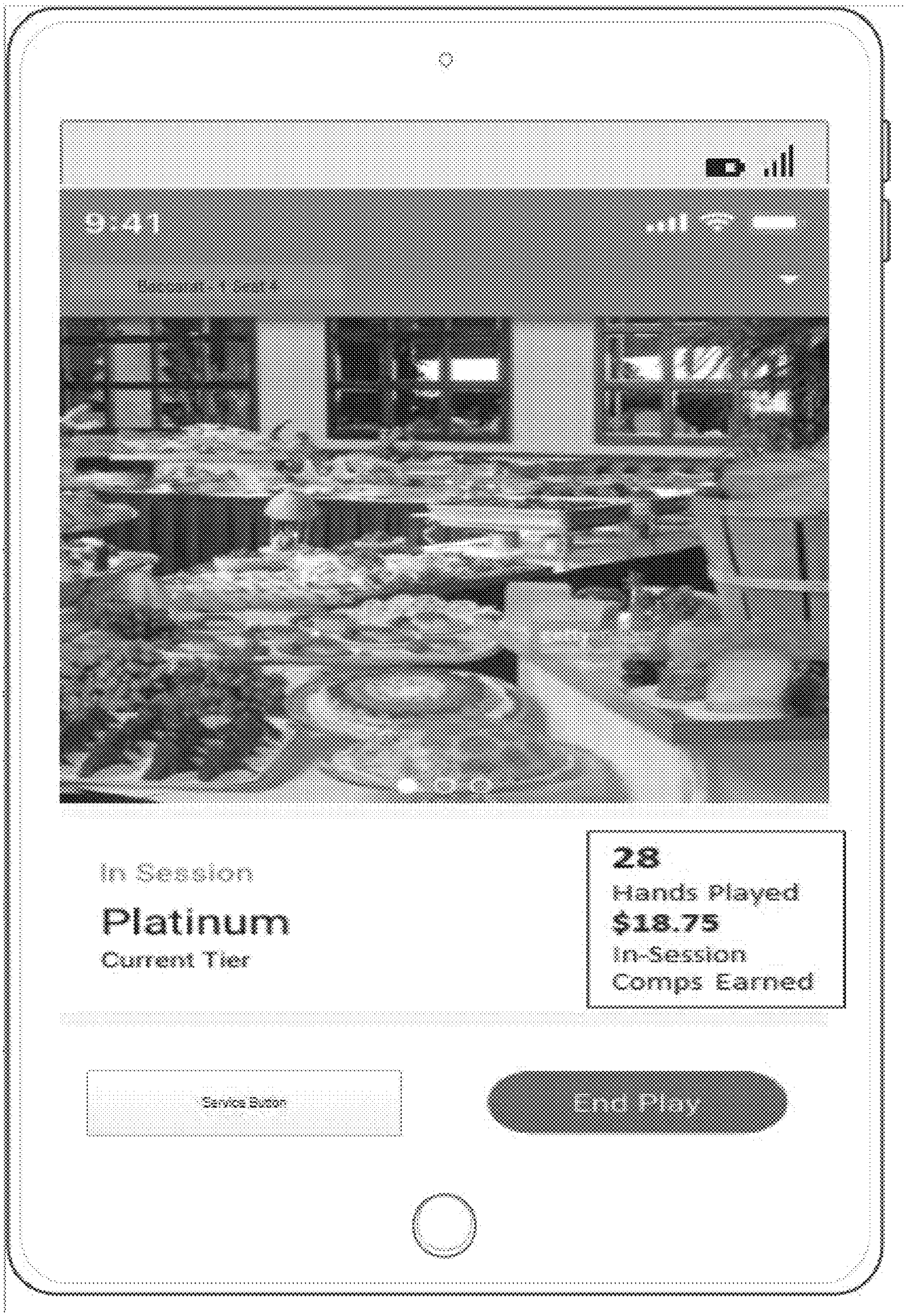

FIG. 4D illustrates an example method 450 for controlling EGM usage by, as an example, server 401, in accordance with the present disclosure. In the example embodiment, method 450 includes receiving 452, from an electronic gaming machine (EGM) (e.g., 104A-X, 410), player identification data and game data, wherein the player identification data identifies a player account of a player at an EGM and the game data includes an indication of an electronic game being played at the EGM. Further, method 450 may also include requesting and receiving 454, based upon the player identification data and from a player tracking server, player data associated with the player account, the player data including prior game data associated with the player account and causing display 456, on a host device associated with a casino host, of at least a portion of the player data and the game data.

Method 450 may also include determining 458 that the EGM should be disabled for a predetermined amount of time, causing display 460, on at least one of the EGM and a player device associated with the player account (e.g., device 404), of a message indicating that the EGM will be disabled, and disabling 462 the EGM for the predetermined amount of time.

In some embodiments, method 450 includes receiving, from an EGM, an indication that a new session has commenced on the EGM, generating, based upon the indication received from the EGM, a task indicating that the EGM should be cleaned, and transmitting a message including the task to the host device.

In some embodiments, method 450 includes receiving, from the EGM, an indication that a new session has commenced on the EGM, determining, based upon the indication received from the EGM, at least one other EGM nearby the EGM, transmitting, to the at least one other EGM, an out of service message, wherein the out of service message is configured to place the at least one other EGM into an out of service mode, and causing display, on the at least one other EGM, of a message indicating the at least one other EGM is out of service.

In some embodiments, method 450 includes receiving, from the EGM, an indication that a new session has commenced on the EGM, receiving, from the EGM and based upon an input received at the EGM from a player, an indication that the player has requested to opt in to social distancing, determining, based upon the indication received from the EGM, at least one other EGM nearby the EGM, and causing display, on the at least one other EGM, of a message indicating the at least one other EGM is out of service.

In some embodiments, method 450 includes, in response to disabling the EGM for the predetermined amount of time, causing display on the at least one of the EGM and the player device associated with the player, a message including a location of at least one other EGM that is enabled. In some embodiments, method 450 includes receiving, from the at least one of the EGM and the player device associated with the player, a message requesting that the EGM be disabled for a different period of time than the predetermined amount of time and disabling the EGM for the different period of time. In some embodiments, method 450 includes determining that the EGM should be disabled for a predetermined amount of time based upon the processor determining at least one of that i) the EGM should be cleaned, ii) the EGM should have maintenance performed thereon, iii) the EGM is needed for a tournament, and iv) the EGM is reserved.

FIG. 5-FIG. 36 are example illustrations of a host dashboard generated by server 401 and displayed at, for example, device 402. As shown, the host dashboard may be implemented to provide a large variety of data to casino personnel (e.g., at host device 402), all of which may be used, as described herein, by casino personnel to gain key insight into current and prior gaming metrics.

Accordingly, player alerts may include, for example, alerts based upon player activity, including, but not limited to, player wagering activity and other non-wagering activity (e.g., service requests, and the like, as described). These alerts may be provided (e.g., via host device 402) to casino personnel, such as one or more casino hosts, who may respond to player alerts substantially in real-time to increase player satisfaction and to personalize player experiences to meet individual player needs. System 400 may thus enable and facilitate a variety of dynamic and/or real-time responses by agents and/or employees of the casino, such as one or more casino hosts, to player activity and/or player alerts generated based upon player activity. A variety of other benefits and technical improvements (e.g., enabling offline gameplay) are also achieved by the present disclosure and described in additional detail below. The embodiments described herein may be generated in response to an input at, for example, host device 402, and/or automatically generated by server 401 in response to receiving data (e.g., from a device 410). Further, in some embodiments, server 401 may only provide certain functions described herein to players of a certain tier level (e.g., in a player loyalty program) and/or players "hosted" by a casino (e.g., players receiving additional perks at a casino).

In at least one example embodiment, system 400 may monitor player activity, such as an aggregate or total amount wagered by a player during a specified interval, to generate an alert indicating, for example, that the aggregate wager of the player meets or exceeds a threshold value, where the threshold value may be predefined or established by a casino operator. More particularly, in at least some embodiments, player activity may be monitored to identify players who meet one or more criteria for designation as "high rollers," and once the designation is applied, a casino host, or key casino personnel, may receive an alert indicating that the player has been identified or designated as a high roller.

In at least one embodiment, server 110 may receive data associated with a player of a wagering game of the casino, where the data may include at least one of i) wagering data, or ii) service request data. As used herein, wagering data may include any data, such as individual and/or aggregate amount wagered. Service data may include any data associated with or specifying a request for service(s). As described herein, service request data may, for instance, specify that a player needs help, would like to order food and/or beverage, and the like (see additional detail below).

Similarly, player wagering activity may be monitored to identify regular or otherwise consistent players. The casino host may, in response to identification and one or more alerts generated, reach out to such consistent and/or high roller players (e.g., by visiting the EGM 104A occupied by these players) to congratulate the players and introduce the players to one or more high-roller or loyalty club benefits offered by the casino.

In at least some embodiments, in response to generation of an alert identifying a particular player (e.g., a high-roller, as described), a casino host or other casino personnel may select an option in the host dashboard to provide a message, such as a welcome message, to the player. The welcome message may, for example, be displayed by the EGM 104A of the player and/or the player device 404 of the player. In at least one embodiment, a variety of messages, such as the welcome message described herein, may include a variety of previously prepared and formatted (e.g., "canned") welcome messages (e.g., in a library of such messages), any of which may be selected from the host device 402 or host dashboard and transmitted (e.g., "pushed") to the player dashboard, the EGM 104A, or player device 404. Likewise, in at least some embodiments, a casino host may prepare and format any customized message that the host prefers, and the custom message may be pushed or transmitted to the EGM 104A or the player device 404.

In some embodiments, players may also be provided an option in the player dashboard to create and send custom or other predefined messages to a casino host. For example, in at least one embodiment, a chat window may be created to enable a chat or messaging session between the player and the casino host.

Further, if the player is "uncarded," the casino host and/or system 400 may inquire with the player if he or she would like to enroll in a loyalty card program, whereupon, if the player is interested and enrolls, the player may be provided a player loyalty account and a player loyalty card. As used herein, then, an "uncarded player" refers to a player who is not enrolled in a casino loyalty program. Likewise, a "carded player" refers to a player who has previously enrolled in the casino loyalty program.

In some embodiments, an alert may be generated, as described herein, in response to an uncarded player spending a specified (e.g., threshold) amount of time playing a particular game, a particular group of games, or an amount of time within a casino, playing one or more games on one or more EGMs 104A-104X within the casino, and the like. In addition, in response to an uncarded player opting in or enrolling in a player loyalty account, as described above, an alert may be generated (e.g., and provided to a host dashboard) to alert the casino host or other casino personnel that the player has enrolled or opted into a loyalty account and/or otherwise satisfied one or more criteria for being offered the loyalty membership.

As a result, at least one technical improvement embodied by the present disclosure is that casinos are more easily able to identify their best customers (e.g., high rollers, consistent or regular players, and the like). Likewise, the technical improvement extends to an enhanced ability to enroll these newly identified customers in a casino's loyalty program, whereby customers benefit from a variety of additional complimentary services and bonuses, and whereby casinos benefit by the addition of such customers to their loyalty or rewards programs.

In another example, an alert may be generated in response to an action taken by a player, such as in response to a player selection of a service button or service option (provided and made available on player device 404 and/or EGM 104A) requesting service by casino personnel. In at least some embodiments, player selections may be performed by a player using a player dashboard, which may be provided as a GUI via player device 404. As described herein, player device 404 may include a wireless computing device of the player, such as a tablet or smartphone, and/or an EGM 104A occupied by the player.

In one example implementation of a player dashboard, a player may request the presence of casino personnel (e.g., a casino host) via the player dashboard. In another example, a player may request a complimentary service, assistance with cashing out of gameplay, and/or help in more general terms. As above, casino personnel may receive these player-generated alerts or service requests, such as via host device 402, whereupon casino personnel may respond in-person to the player request for assistance.

As described herein, in at least some embodiments, a player may provide input to a player dashboard via UI system 302, which may include one or more game play UIs 304 and/or one or more other UIs, such as service-request UIs (not shown). In other embodiments, a player dashboard may be displayed via any other suitable UI or GUI, which may be displayed on any display device of an EGM 104A and/or via player device 404.

Figure 41:
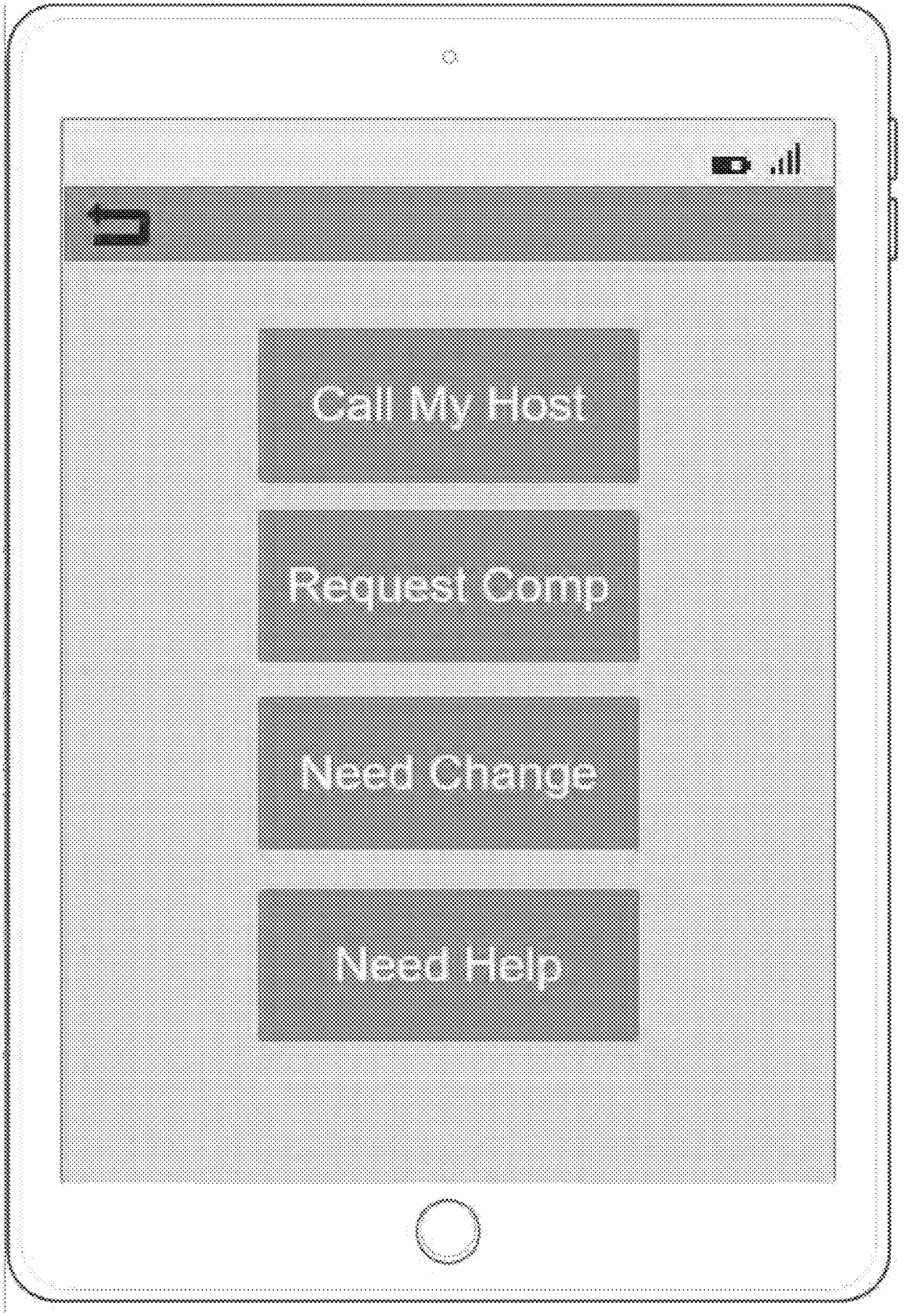
Figure 42:
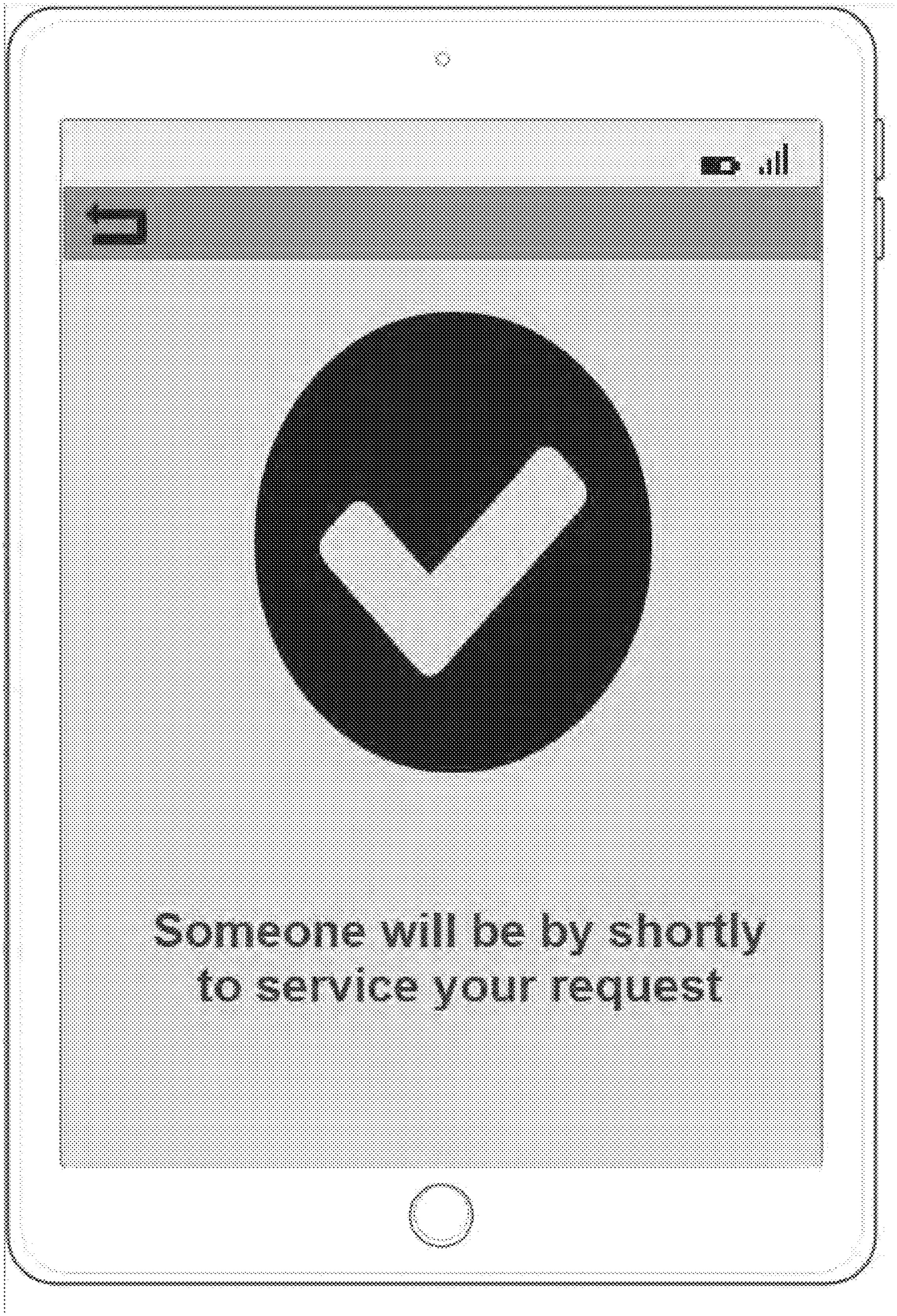

FIG. 37-FIG. 42 show example embodiments and configurations of the player dashboard, as displayed by player device 404. For example, as shown at FIG. 41, the player dashboard may include an option such as "call my host," "request comp," "need change," and "need help." Although just a few options are shown and described, many other options are contemplated by and within the scope of the present disclosure. Specifically, an option may be provided to anticipate almost any player need, such as "request vehicle from valet," "request gift shop vendor," "order food and beverage," and the like.

In some embodiments, an option to order food and beverage may also display a menu of one or more restaurants of a casino, and a player may select one or more menu items from a selected menu. For example, a first player may select a first restaurant and a first menu item (e.g., fish and chips) from the menu of the first restaurant. Similarly, a second player may select a second restaurant and second and third menu items (e.g., spaghetti and iced tea) from the menu of the second restaurant. Accordingly, many player-initiated service requests are contemplated by and within the scope of the present disclosure.

Further, when a player uses the player dashboard to initiate such a service request, the service request (i.e., the "alert") may be mapped and/or routed by system 400 to one or more appropriate casino personnel. For example, if a player requests his or her vehicle from valet, the request may be routed to a host device 402 of a valet of the casino. Likewise, if the player requests food and beverage, the alert may be routed to one or more bartenders/food services employees of the casino, who may subsequently visit the player within the casino to take a food and beverage order of the player.

Stated another way, in response to a player using the player dashboard to initiate a service request (and/or in response to other analysis of player and/or non-gaming patron data, such as other wagering or spend data, as described herein), system 400 (e.g., server 110) may generate a player activity alert based upon an analysis of the received data, and/or provide the player activity alert to a computing device of an agent or employee of the casino (e.g., the host device 402), where the player activity alert enables the agent or employee to initiate in-person contact with the player.

In addition to the player service requests described above, in at least some embodiments, system 400 may enable removal of one or more games from a revenue mode for a specified period of time. As used herein, removal of a game from casino revenue in the manner described may be referred to as taking the game "offline."

Accordingly, in at least some embodiments, a player may provide a request, via player device 404, to take a game offline for a specified duration. This option may be provided to players based, for example, upon an aggregate or total wager of the player during a preceding period (e.g., the preceding twenty-four hours). Similarly, players may be allowed to request that games be temporarily taken offline if they meet certain other criteria, such as being designated high rollers and/or based upon any other suitable criteria specified by a casino. Generally, however, a casino may allow a given player to remove a game from revenue for a short period to reward the player for being a good customer of the casino. In some cases, a player may win such an option during gameplay itself (e.g., as a high-value award).

Whatever the specific case, a player may request that a game (e.g., a favorite game of the player) be taken offline by the casino from the player dashboard displayed by player device 404. Specifically, in at least one embodiment, the player may access the player dashboard via a smartphone or tablet of the player to request that a game be taken offline. A player may make such a request in advance of arriving at a casino to prevent a jackpot (e.g., if the jackpot has accumulated to a substantial value) of the game being awarded prior to arrival and participation in the game by the player.

When the player arrives, system 400 may detect arrival of the player, such as by physical entry of the player device 404 within a geofence established and defined by one or more wireless transceivers, such as wireless transceivers 406 and 408. In some instances, one or more cameras of the casino may also detect arrival of the player, and/or the player may simply use the player dashboard to indicate arrival at the casino. In each case, the game that was previously taken offline by the player may, in response to arrival by the player, be reintroduced or placed back into revenue play. As a result, the game may be accessible and playable by any player having an interest in the game within the casino, including the player who initially requested that the game be taken offline, and gameplay may generally resume under normal or standard conditions.

In some embodiments, a player may also be permitted to take a game offline for short periods of time, such as for ten minutes, fifteen minutes, half an hour, and the like. Each of these options may be provided to the player via the player dashboard, which as described herein, the player may access via player device 404. One technical improvement embodied in these shorter duration offline increments is that a player may request removal of a game from revenue when the player needs to take a short break (e.g., a bathroom break) and/or when the player is ready to take a break for dining or other entertainment within the casino.

Notably, in at least some embodiments, although a player may have earned an ability to request that a game be taken offline, as described herein, not all such requests may be granted and/or capable of being granted. For example, if one or more other players are engaged in active play of a game that the player wishes to take offline, it may not be possible, at that time, to remove the game from casino revenue.

As a result, the player requesting that the game be taken offline may be notified that the request cannot be granted. In such a case, an option to be notified when the game is "idle" (e.g., no other players are playing the game) may be provided to the player requesting that the game be taken offline. If the player selects the notification option, a notification may be provided to the player via the player dashboard when the game is not being played by any player other than the player requesting that the game be taken offline, whereupon the player may be allowed to take the game offline for a period of time, as described.

In some embodiments, alerts can be generated based upon non-gaming activity of casino patrons (who may or may not be regarded as players, inasmuch as they may or may not play any of the games offered by a casino). For example, many casinos offer a wide array of dining, entertainment, and other services (e.g., spas and salons), and in some cases, many casino patrons may visit their favorite casino only for these services. Although these patrons may or may not gamble within the casino, as used herein, they may be referred to for convenience as "non-gaming" patrons.

Accordingly, to reward such non-gaming patrons, system 400 may track or monitor an aggregate or total expenditure (or "spend") of the non-gaming patrons of a casino. More particularly, system 400 may be connected to the point-of-sale (POS) devices within the casino, which may enable system 400 to receive and track the total spend of any of the casino's players and/or non-gaming patrons.

In response to the total spend of one or more such patrons meeting or exceeding a threshold value, an alert may be generated, as described herein, and a casino host notified (e.g., via the host dashboard displayed by a particular host device 402), whereupon the casino host may attend the non-gaming patron in person to, e.g., make an introduction, provide one or more rewards, bonuses, or complimentary services to the non-gaming patron, and the like.

In addition, in at least some embodiments, a variety of statistics and other data, such as individual EGM 104A data and casino floor summary data, may be provided to casino personnel via one or more host devices 402. These data may include almost any statistical and/or summary data that are desirable by a casino. However, to illustrate briefly, as shown with reference to FIG. 18, FIG. 19, and FIG. 20, one or more heat maps may be generated to indicate a variety of play intensity and other player expenditure or wagering data within a casino. As shown, a casino floor may be divided into sections, and data for individual sections may also be displayed. Further, casino personnel may use the heat map to "drill down" or otherwise expand on any area or EGM of particular interest to obtain additional data associated with the EGM and/or area.

Accordingly, in general terms, the host dashboard may be implemented and customized to display any of a wide variety of data, such as statistical data, summary data, EGM data, and the like, within the casino. These data may, in addition, be provided substantially in real-time, whereby real-time dynamic responses by casino personnel are facilitated. As a result, a casino may implement system 400, as described herein, to provide a customized and unique player experience tailored to individual players. Further, server 401 enables casino personnel to meet with and provide the "personal touch" for many players and other non-gaming patrons of the casino that might otherwise go unnoticed or unrewarded.

Exemplary Distancing Embodiment

Figure 43:
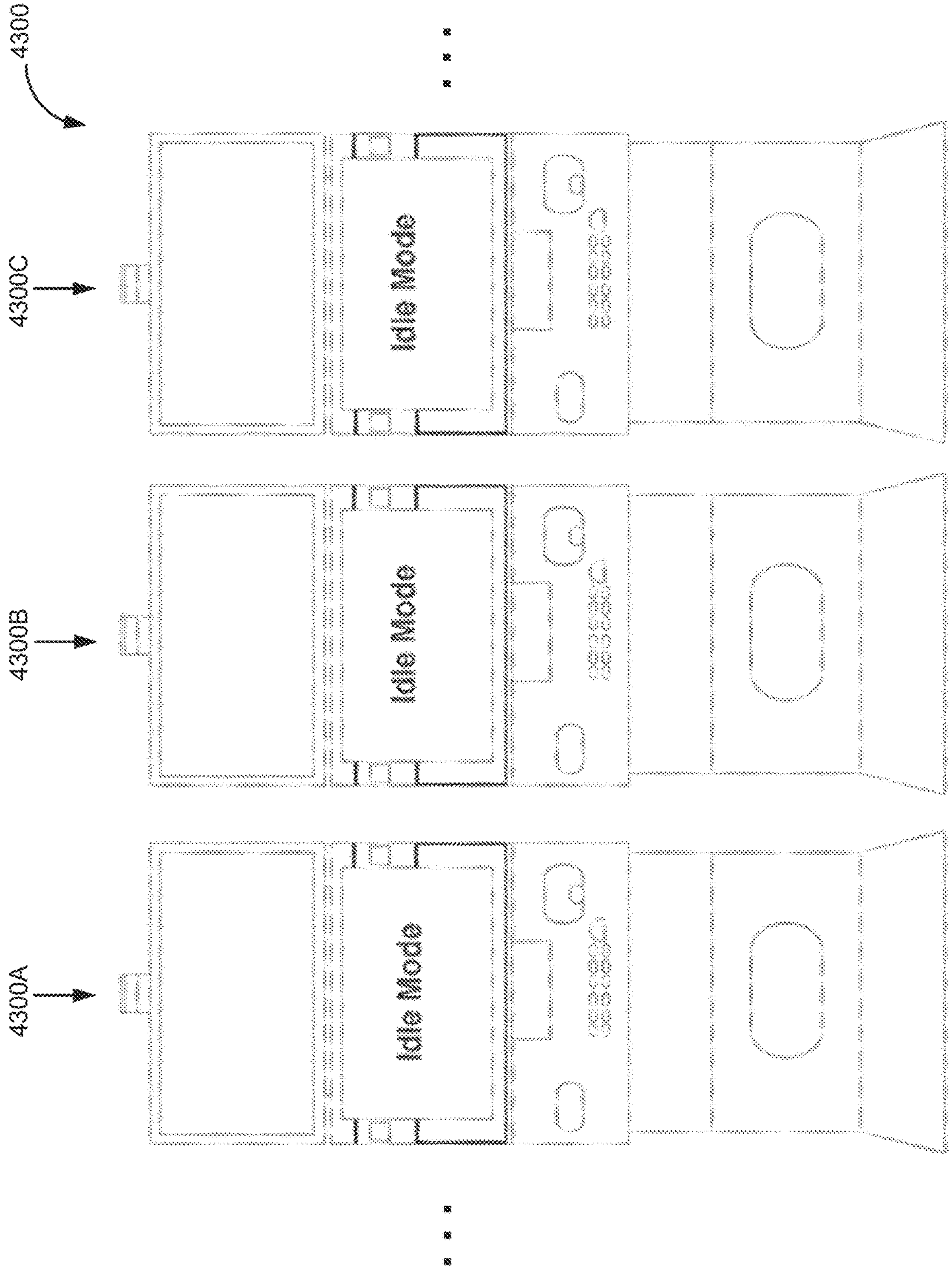
FIG. 43 illustrates an example bank of EGMs that participate in a social distancing system and methods described herein.

FIG. 43 illustrates an example bank of EGMs 4300 that participate in social distancing as controlled by server 401 and methods described herein (e.g., the processes/actions described herein may be controlled by server 401). The EGMs 4300 may be similar to the EGMs 104 shown in FIG. 1, the gaming device 200 shown in FIG. 2A, or the bank of EGMs 252 shown in FIG. 2B. There are at least three methods that can trigger a casino employee to sanitize one of the EGMs 4300. In some embodiments, when a patron successfully wirelessly connects to one of the EGMs 4300, server 401 triggers a task to a venue management application (e.g., at device 402) (e.g., Mobile nCompass, central determination gaming server 106 operating as a social distancing system server, or the like) for floor service personnel to clean the EGM 4300. In some embodiments, a patron has the ability (e.g., within a player app on their mobile device, within Mobile nCompass, via a service request button on the EGM 4300) to request cleaning service. In some embodiments, server 401 automatically initiates a cleaning request at conclusion of a game play session (e.g., when a player disconnects or cashes out of an EGM 4300).

In some embodiments, patrons can view the base game nCompass and the games UI messaging of when the last sanitized cleaning of the game. Patrons can also view, within a loyalty app, a slot finder showing EGMs 4300 and their most recent cleaning times. In some embodiments, patrons can use the player app to locate and reserve a particular EGM 4300 for play near their friends or relatives. In some embodiments, server 401 allows patrons or operators to exclude EGMs 4300 or banks of EGMs 4300 by bank, EGM location, or cabinet style.

In the example shown in FIG. 43, three EGMs 4300A, 4300B, 4300C are shown in an idle state (e.g., when no players are present and playing any of the EGMs 4300A-4300C). Some or all of the EGMs 4300 may allow players to wirelessly connect to the EGMs 4300 (e.g., via Bluetooth® or other near-field communications (NFC)). Such wireless connection allows patrons to avoid some or all physical contact with the EGM 4300 before the EGM 4300 is sanitized.

Figure 44:
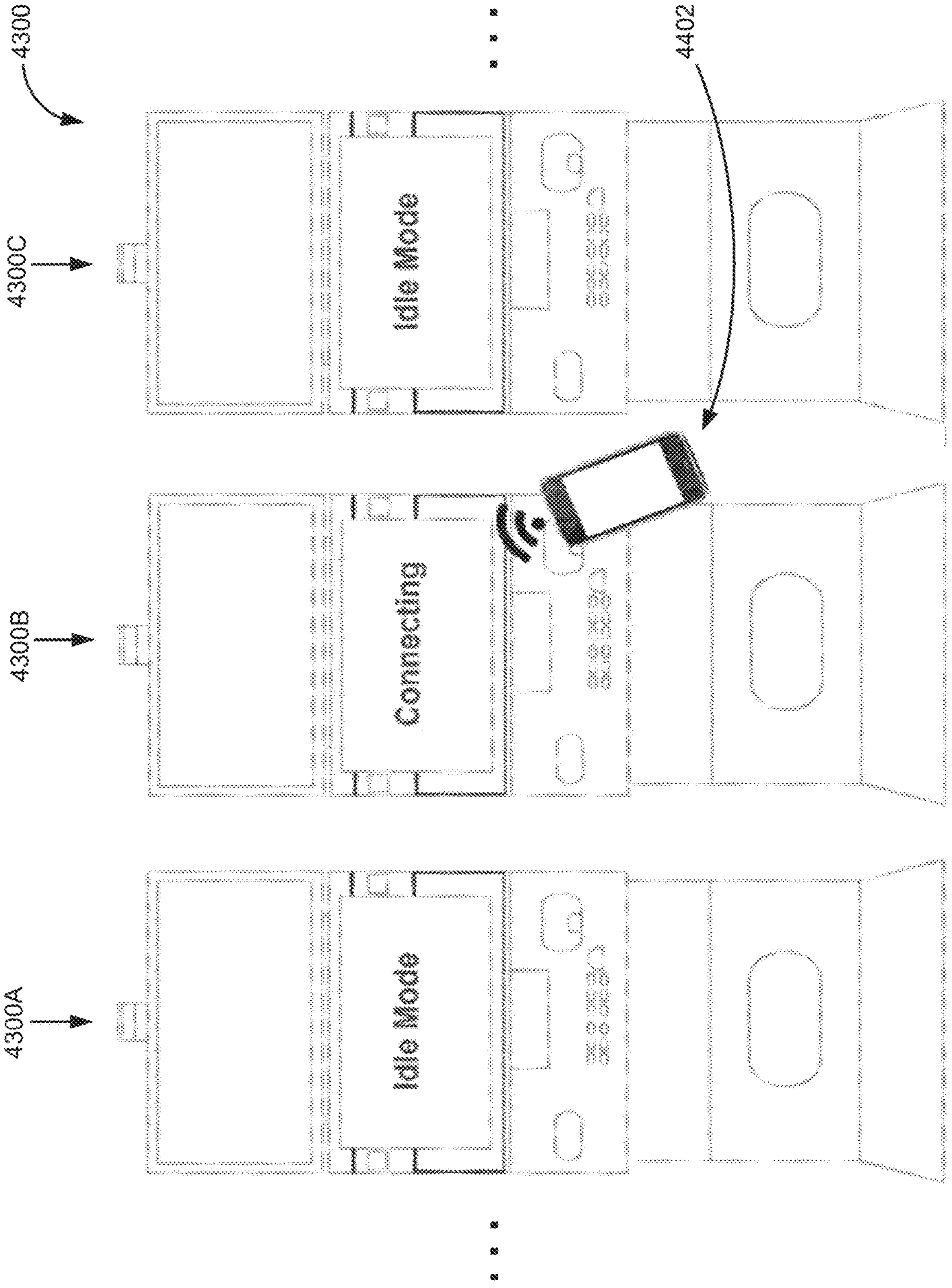
FIG. 44 illustrates a wireless connection scenario in which a patron uses their mobile device to wirelessly connect with the EGM.

FIG. 44 illustrates a wireless connection scenario in which a patron uses their mobile device 4402 to wirelessly connect with the EGM 4300B. When the patron selects a connect button in a player app running on the mobile device 4402 (e.g., device 404), the player app displays a new page of content that shows game details based on the proximity of the mobile device 4402 to the EGM 4300B such that the patron knows specifically with which EGM 4300 they are about to enter into cardless session play. The EGM 4300B displays a "connecting" status message on an integrated display device. Server 401 allows the ability, for carded and un-carded patrons, to enter into session play without Mobile nCompass. For the patron to conduct, they will interact with the nCompass and view pages of content that allows for entering into session play.

Figure 45:
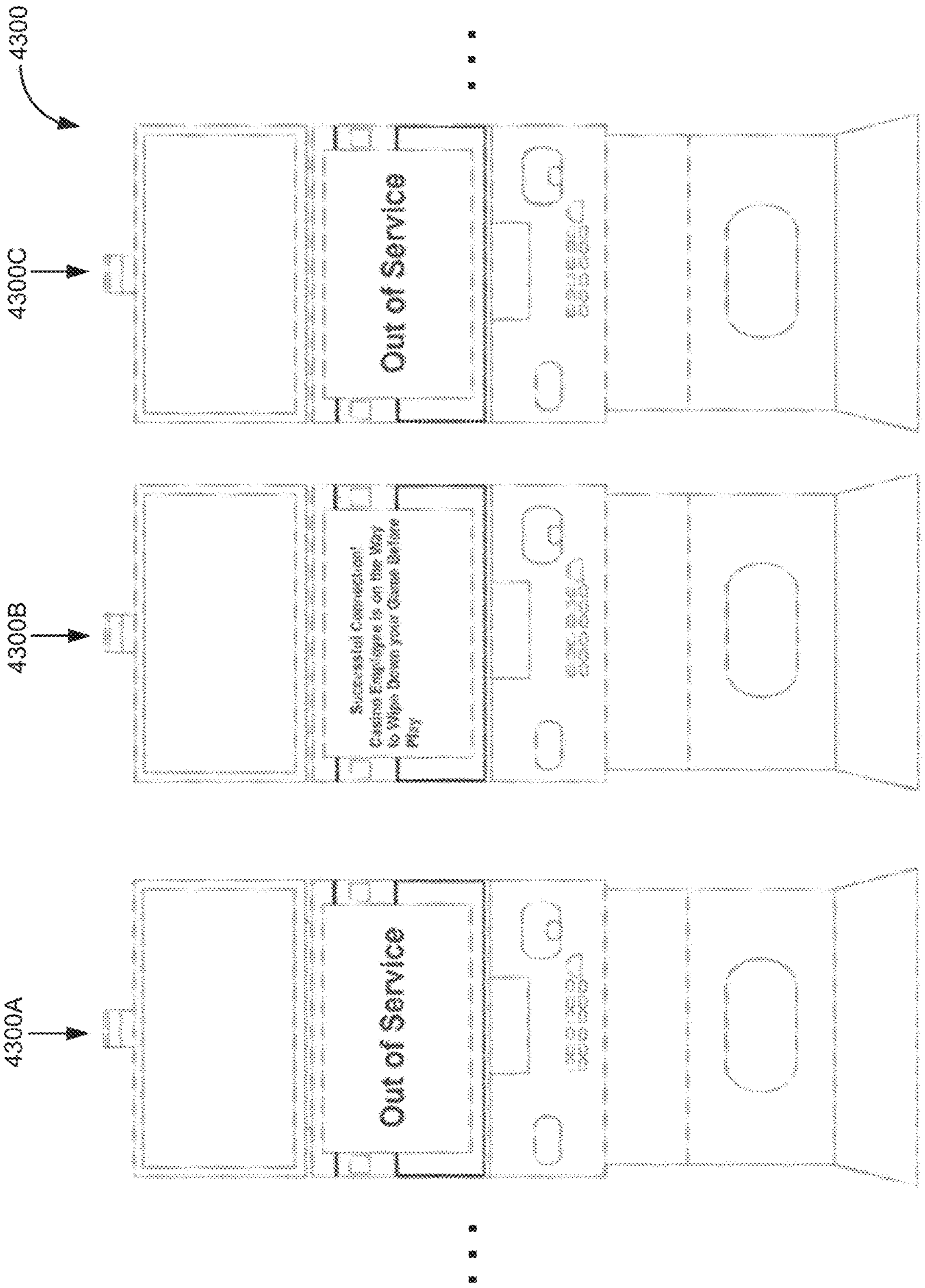
FIG. 45 illustrates status of the EGMs after successful wireless connection between the mobile device and the EGM and a new playing session has commenced.

FIG. 45 illustrates status of the EGMs 4300A-4300C after successful wireless connection between the mobile device 4402 and the EGM 3400B and a new playing session has commenced. In the example embodiment, after a successful connection to the EGM 4300B, the patron will see messaging on the EGM 4300B (e.g., as caused by server 401) that informs them that a casino employee is on the way to sanitize the game. Server 401 automatically marks the EGM 4300B as needing cleaning and creates a task to be assigned to a casino employee for cleaning that EGM 4300B. In addition, server 401 automatically identifies nearby EGMs 4300, such as EGMs 4300A and 4300C, and places those EGMs out of service (e.g., not available to other patrons for gaming). The nearby EGMs 4300 display an out-of-service notification to inform other patrons. The number of EGMs that can go offline is definable by the admin (e.g., at device 415) based on the bank structure. For example, EGMs 4300 immediately adjacent neighbor devices to the in-service EGM 4300B may be identified to be placed into out-of-service mode (e.g., to establish a boundary of at least one unused device between active players), or two devices on either side of the in-service EGM 4300B may be identified (e.g., to establish at least two devices of separation between active players).

In some embodiments, a new game session may be started by a patron manually (e.g., through direct physical contact with the EGM 4300B, such as through inserting a TITO ticket to establish a credit balance). As such, server 401 may detect the new in-session EGM 4300B and may similarly automatically disable nearby EGMs 4300A, 4300C or automatically dispatch casino personnel for cleaning service.

In some embodiments, when an EGM is placed out of service, the server 401 may initiate cleaning tasks for those out-of-service EGMs 4300. As such, the out-of-service EGMs 4300 may be cleaned while out of service, thereby preparing the EGMs 4300 for later use.

Figure 46:
FIG. 46 is an example user interface illustrating a view of a task management application in which service requests for disinfecting EGMs are provided by the social distancing system to service personnel.

FIG. 46 is an example user interface 4600 illustrating a view of a task management application in which service requests for disinfecting EGMs 4300 are provided by server 401 to service personnel (e.g., via device 402). In the example embodiment, after the patron has successfully connected to the EGM 4300B with the mobile device 4402, server 401 creates a task in the task management system for a role assigned to that task type to service. Within the detail of that task will be an indicator if this is the first, second, third, etc., request to service the EGM 4300B based on an administration request for service threshold. By including this, the casino user can escalate to management if they feel the patron is making too many requests.

Figure 47:
FIG. 47 is an example user interface illustrating another view of the task management application in which a tasked service person closes a pending service request.

FIG. 47 is an example user interface 4700 illustrating another view of the task management application in which a tasked service person closes a pending service request. After the service person has serviced the task and selected the close button on the user interface 4700, the serviced EGM 4300B will move to a state of available for active session play, as controlled by server 401.

Figure 48:
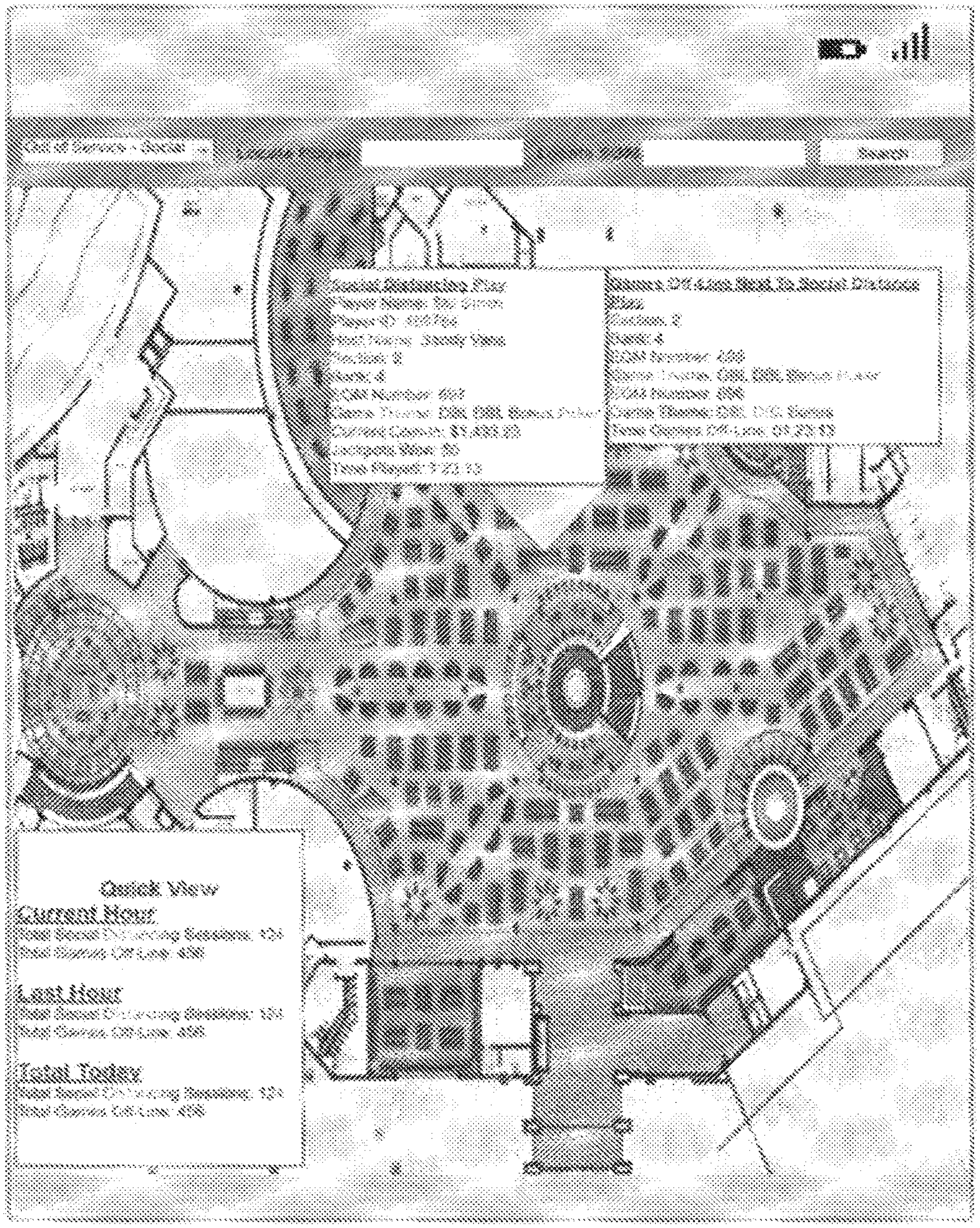
FIG. 48 is an example user interface illustrating a view of a social distancing interface for the social distancing system.

FIG. 48 is an example user interface 4800 illustrating a view of a social distancing interface as generated by server 401. A slot manager can interact with the user interface 4800 (e.g., at device 402), allowing them to view floor wide the number of active social distancing sessions. Additional filters allow for the location of a specific player or EGM 4300 with the option to select an indicator on the floor mapping that will display stats on the active session and the social distance games that are off-line. Included on this page is a field of data that shows stats on current hour social distancing play, past hour, and total for the day.

In some embodiments, the server 401 allows for linked patrons to game at EGM's that are next to each other. For example, a first player enters active gaming session on a first EGM 4300B, followed by a second "linked patron" attempting to connect to another EGM 4300A. Server 401 is configured to recognize linked patrons and allow the second patron to enter play on the game even if it is within the first games social distance (e.g., placing the EGM 4300A back into service for that second player based on the known association between the first and second players, such as a husband and wife). In some embodiments, patrons can favor and follow specific EGMs 4300 and be notified by server 401 when they become available or when game is not available.

Figure 49:
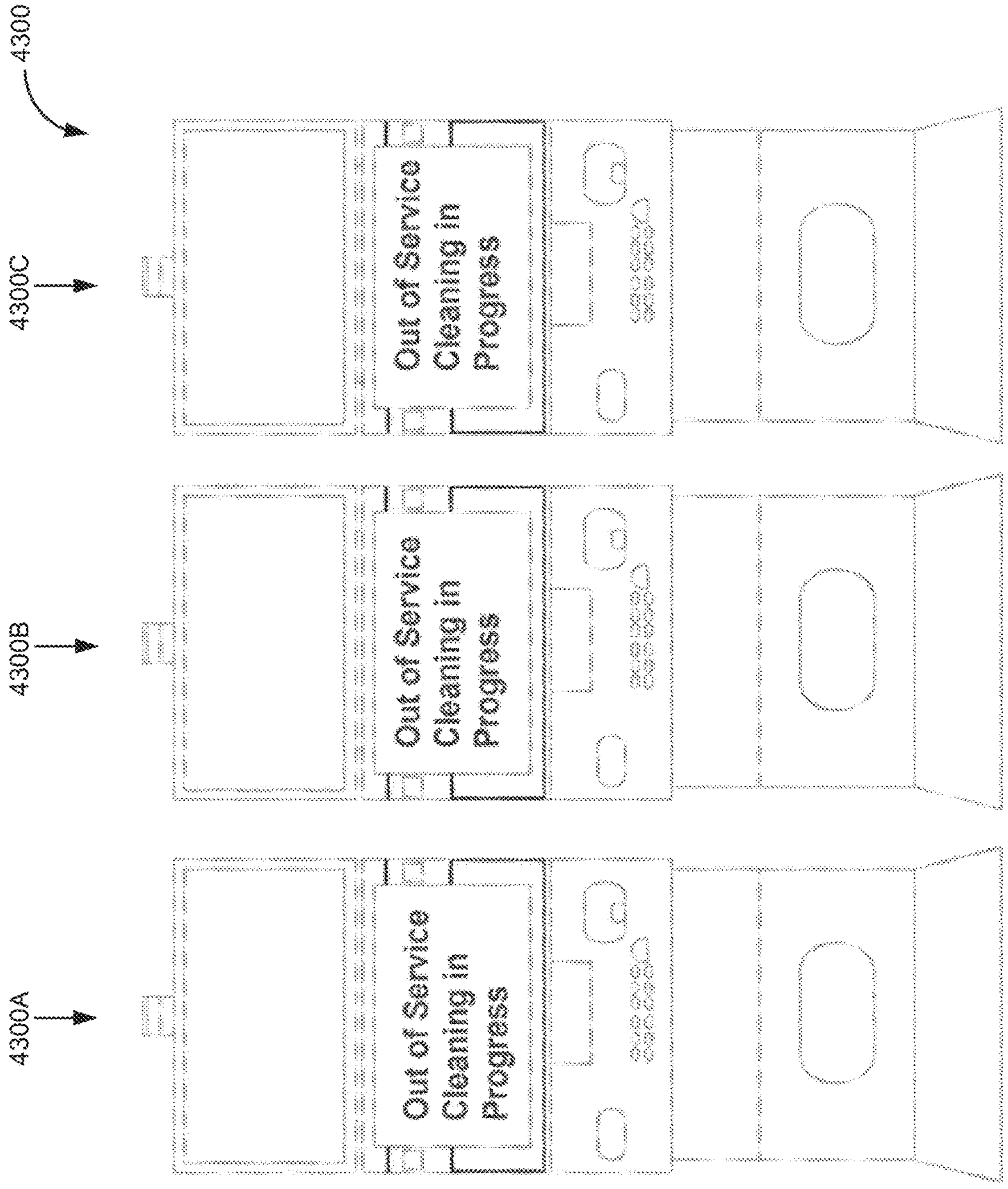
FIG. 49 illustrates the bank of EGMs after the example patron concludes their game play session.

FIG. 49 illustrates the bank of EGMs 4300 after the example patron concludes their game play session. When the patron ends session play (e.g., via the cash out button on the EGM 4300B, disconnects the wireless connection between the mobile device 4402 and the EGM 4300B, terminates the session through the player app), the EGM 4300B that was in play, along with the social distancing games that were out of service due to that gaming session, will all go into an out-of-service mode for cleaning. Server 401 automatically initiates tasks for cleaning for the EGM 4300B and perhaps other nearby EGMs. After sanitization has been done, the service person can return the game to an idle state with a selection of a button within the app (e.g., at device 402), thereby placing the EGM 4300B and the other nearby EGMs 4300A, 4300C back into service (e.g., available for game play).

In some embodiments, if a patron is in a delivery at place (DAP) status, server 401 will prohibit connection to the EGMs 4300. In some embodiments, if a patron wins a jackpot or other award that utilizes hand-pay by support staff, server 401 may create a task to sanitize the winning EGM 4300B when the EGM 4300B is keyed off. In some embodiments, when an unattended jackpot is awarded at the EGM 4300B, server 401 may cause display of a PIN pad within the player app (e.g., at device 404) for the player to acknowledge the jackpot. In some embodiments, if the EGM 4300 is in a state that does not allow for session play, server 401 causes display of a message that indicates that wireless connection is disabled or game play at the EGM 4300 is disabled at the EGM due to social distancing.

In some embodiments, the server 401 may provide a transaction type identification number for sanitizing tasks and allow sanitizing tasks to be assigned to different roles. In some embodiments, server 401 may provide a service request threshold for individual patrons and may, for example, limit or restrict new service requests when the patron exceeds the service request threshold (e.g., based on player loyalty tier). In some embodiments, server 401 may allow administrators to pre-determine which EGMs 4300 are taken offline within a bank of EGMs 4300 when a particular EGM 4300 enters gameplay.

In some embodiments, server 401 may allow patrons to redeem issued vouchers (e.g., TITO tickets) through the player app and may, for example, post winnings to a casino wallet of the patron, a digital wallet of the player, or the like. In some embodiments, server 401 may allow a player in an active session to place their EGM 4300B into an offline status for a period of time. For example, the player may put the EGM 4300B into an offline status while they go to the bathroom or eat a meal, and the EGM 4300B may save the game session status until the player returns. When the player returns, they may resume their session through the player app, and server 401 may automatically initiate a task to sanitize the EGM 4300B.

In some embodiments, server 401 may incorporate services for table games (not shown) into its operations. For example, server 401 may provide a user interface to a dealer at a table game (e.g., blackjack table, roulette table, craps table, or the like) and may allow the dealer to request sanitization tasks to be created for their table (e.g., based on dealer or player request). In some embodiments, server 401 may automatically create sanitization requests based on a pre-determined time schedule (e.g., clean EGM 4300 or table once every hour, at least every two hours, or the like).

Figure 50:
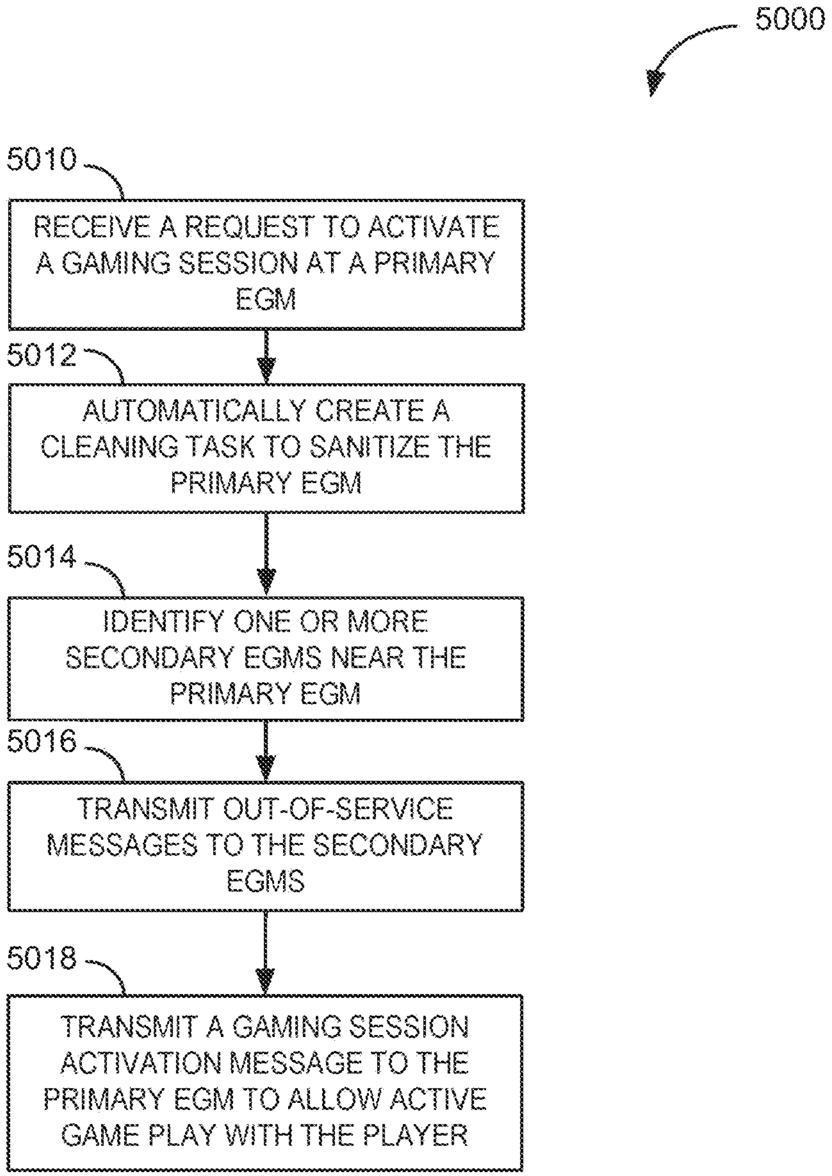
FIG. 50 is an example method for enhancing social distancing and cleanliness of gaming devices.

FIG. 50 is an example method 5000 for enhancing social distancing and cleanliness of gaming devices. In some embodiments, the method 5000 is performed by server 401 operating in conjunction with the EGMs 4300 shown in FIG. 43. In the example embodiment, the method 5000 includes receiving 5010 a request to activate a gaming session on a primary EGM 4300B in conjunction with a mobile device 4402 of a player. The method 5000 also includes automatically creating 5012 a cleaning task for the primary EGM 4300B based on the request to activate the gaming session, the cleaning task represents a request to sanitize the primary EGM 4300B. The method 5000 further includes identifying 5014 one or more secondary EGMs 4300A, 4300C that are near the primary EGM 4300B. The method 5000 also includes transmitting 5016 out-of-service messages to the identified one or more secondary EGMs 4300A, 4300C, the out-of-service messages being configured to place the one or more secondary EGMs 4300A, 4300C into an out-of-service mode. The method 5000 further includes transmitting 5018 a gaming session activation message to the primary EGM 4300B, thereby allowing the primary EGM 4300B to enter into active game play with the player.

Exemplary Further Distancing Embodiment

Embodiments of the disclosure enable venues to keep all their EGM's enabled and disables them on a needs basis which will: a) Give loyal members the comfort of social distancing while on the gaming floor; b) Prevent EGMs having to go into storage or venues spending money to re-designing their floor with wide bases etc.; c) Provide greater flexibility than physical floor layout changes as social distancing rules change in light of health recommendations; d) Allow people from the same household to play together; and e) Provide a solution for fixed products such as multi-terminal gaming machines ("MTGMs").

Figure 51:
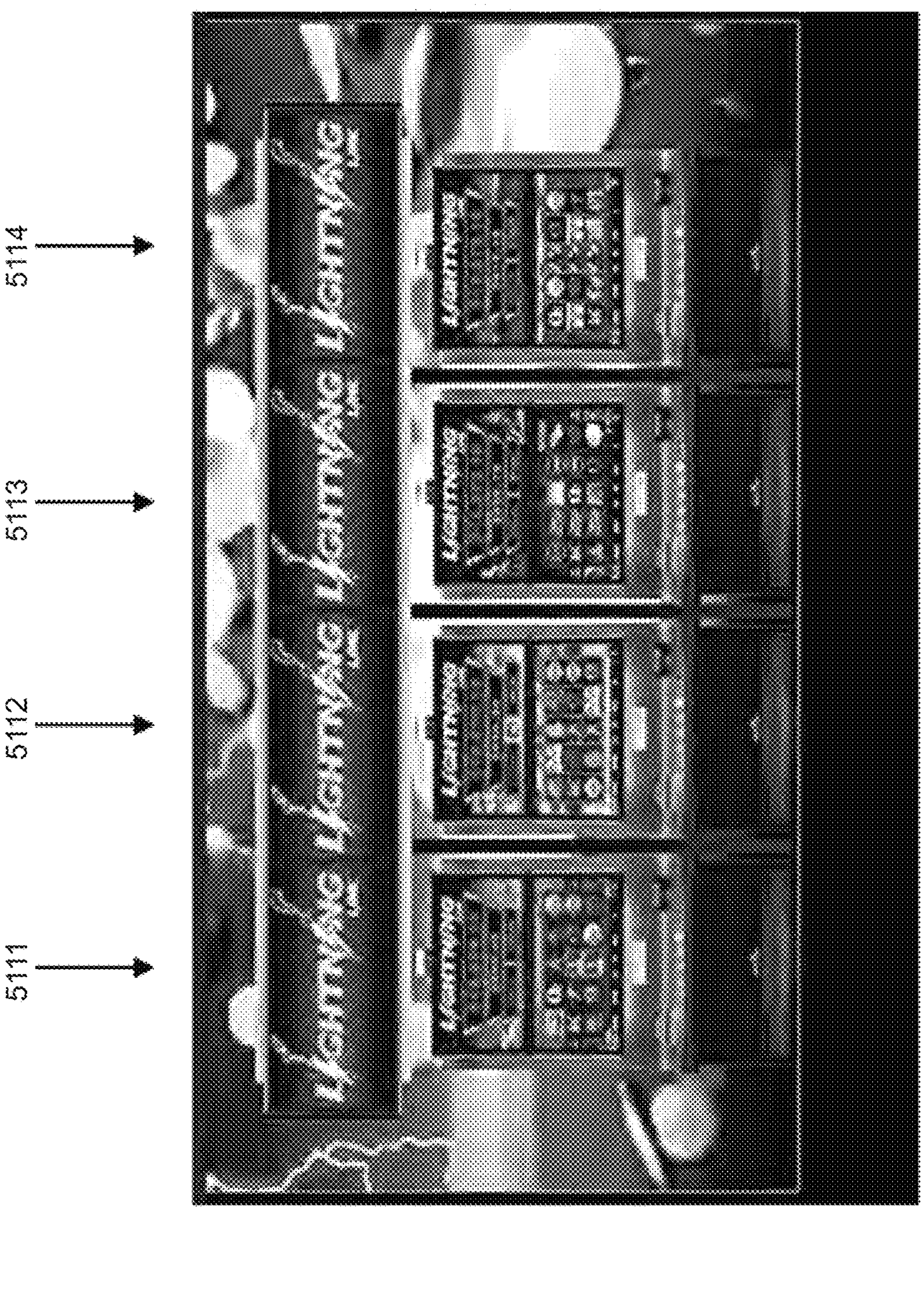
FIGS. 51-56 are schematic diagrams illustrating operation of certain embodiments.
Figure 52:
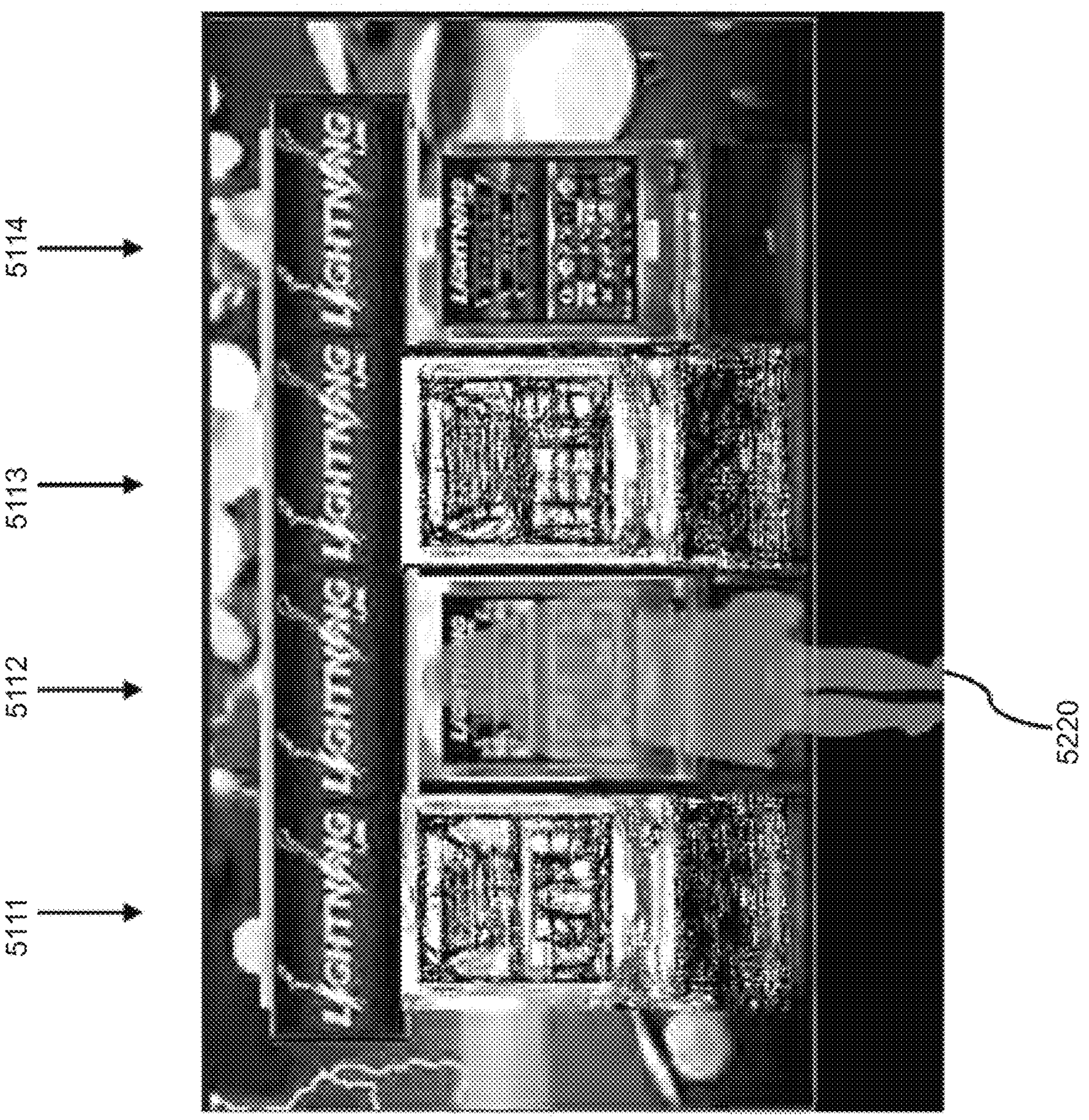
Figure 53:
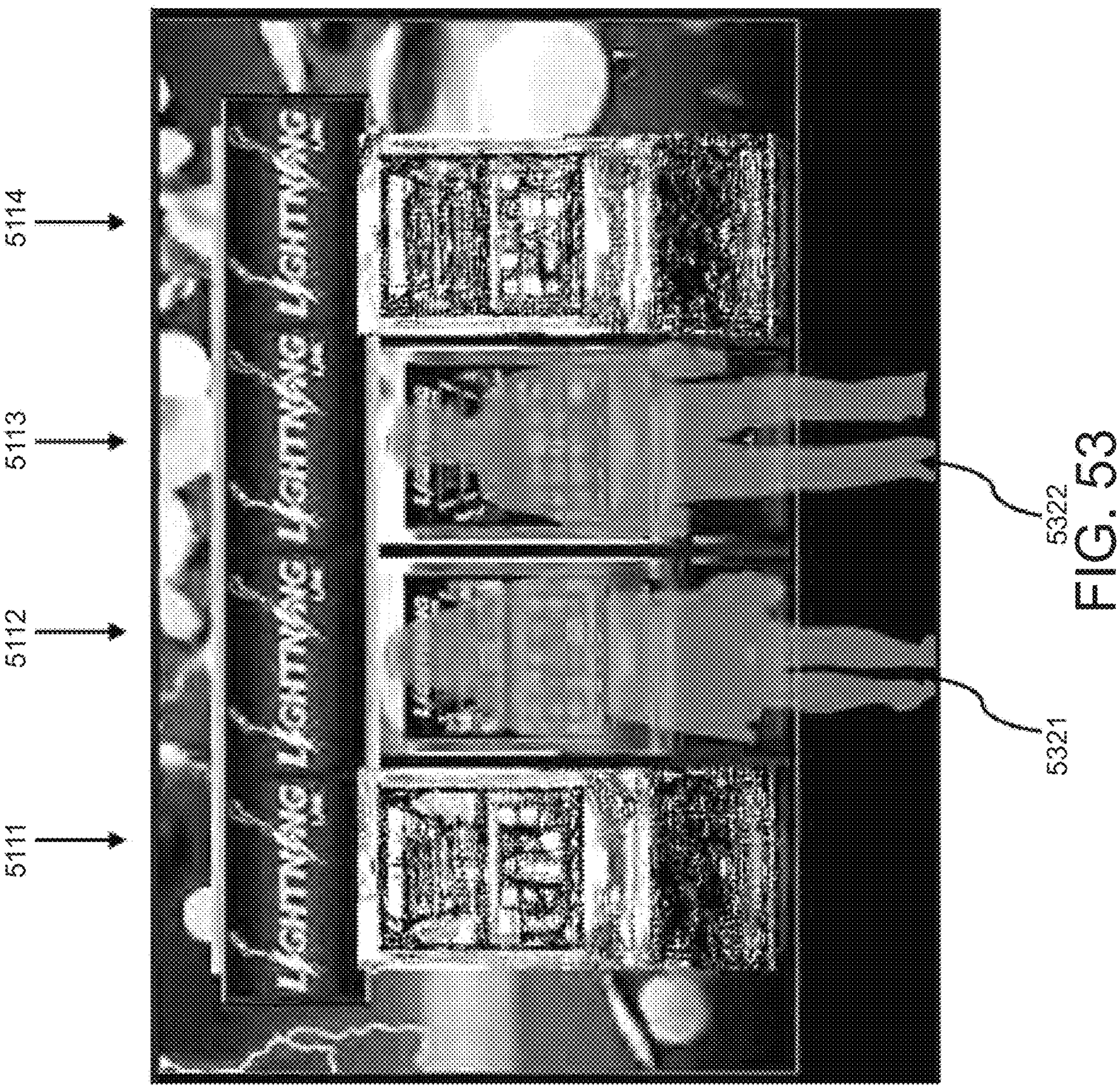

FIGS. 51-53 illustrate schematically embodiment where all EGMs remain online in the venue. FIG. 51 shows an example bank of four gaming machines 5111-5114 that are on.

FIG. 52 shows an example scenario where a patron 5220 inserts a card into EGM 5112 and server 401 of the embodiment automatically disables EGMs either side—i.e. EGMs 5111,5113.

Embodiments of the disclosure enable couples to have linked cards that will allow side by side EGMs to remain enabled. In an example, shown in FIG. 53, the members of the couple 5321, 5322 have linked cards and insert them to EGMs 5112,5113 and the system disables EGMs 5111,5114.

Figure 54:
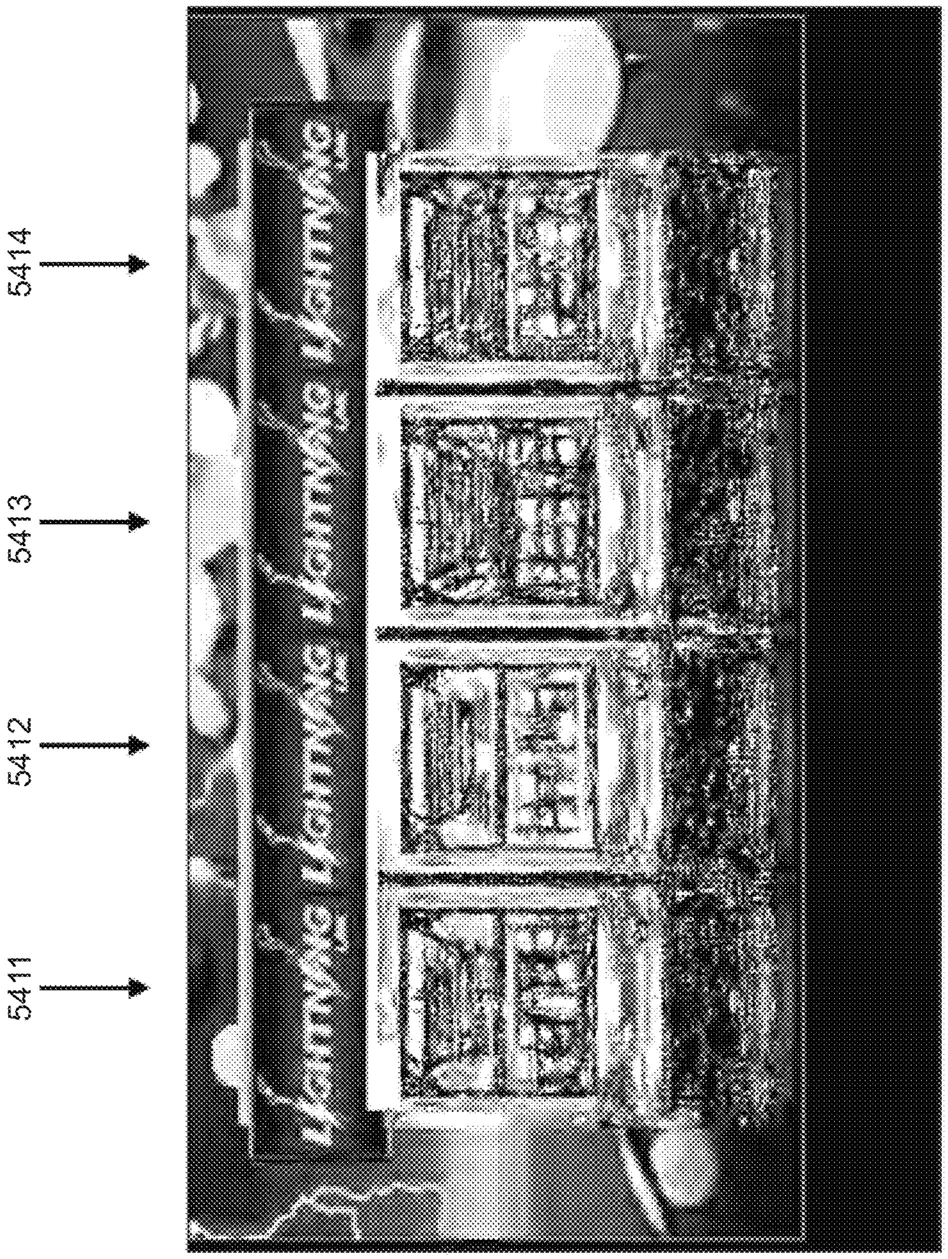
Figure 55:
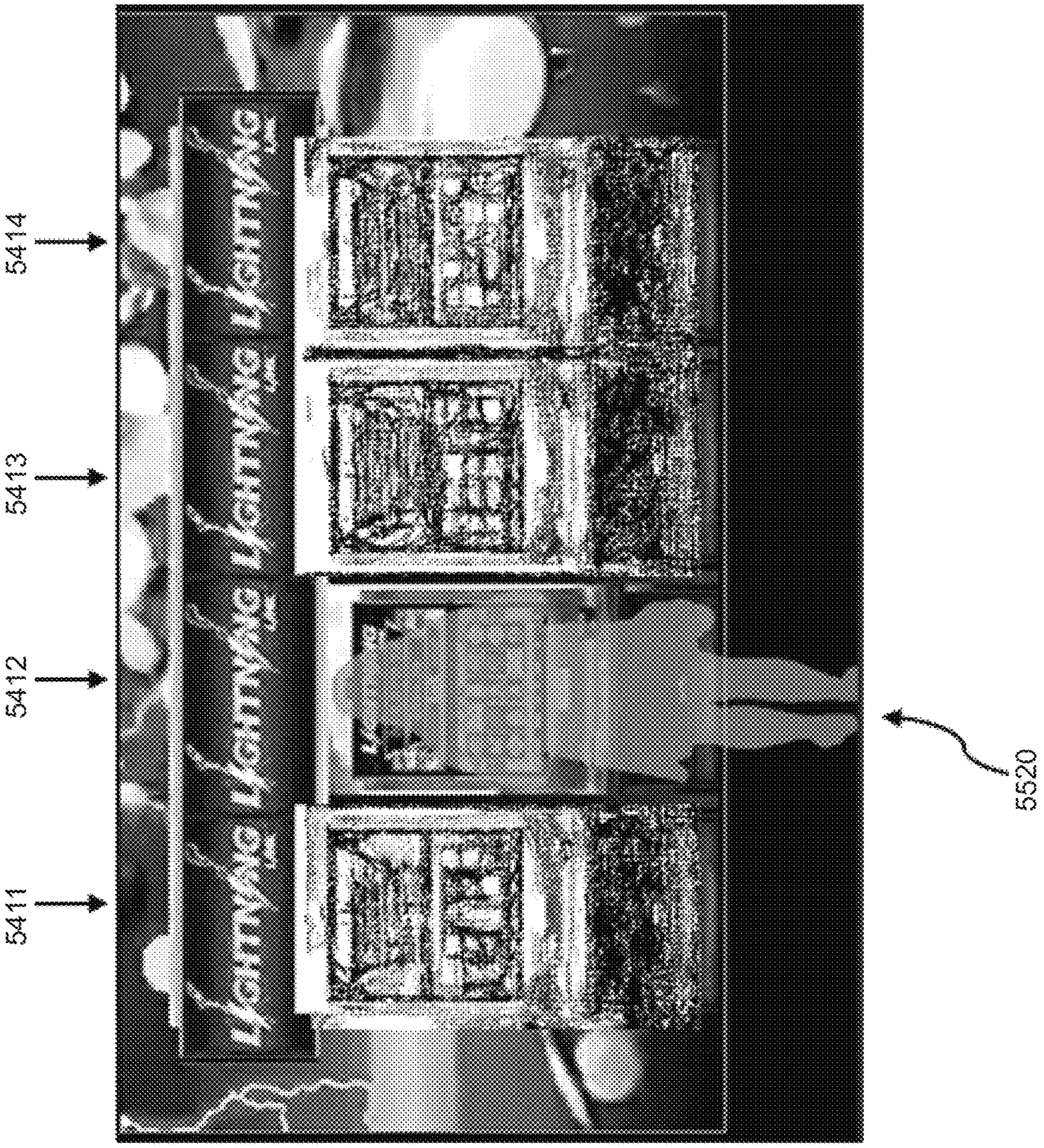
Figure 56:
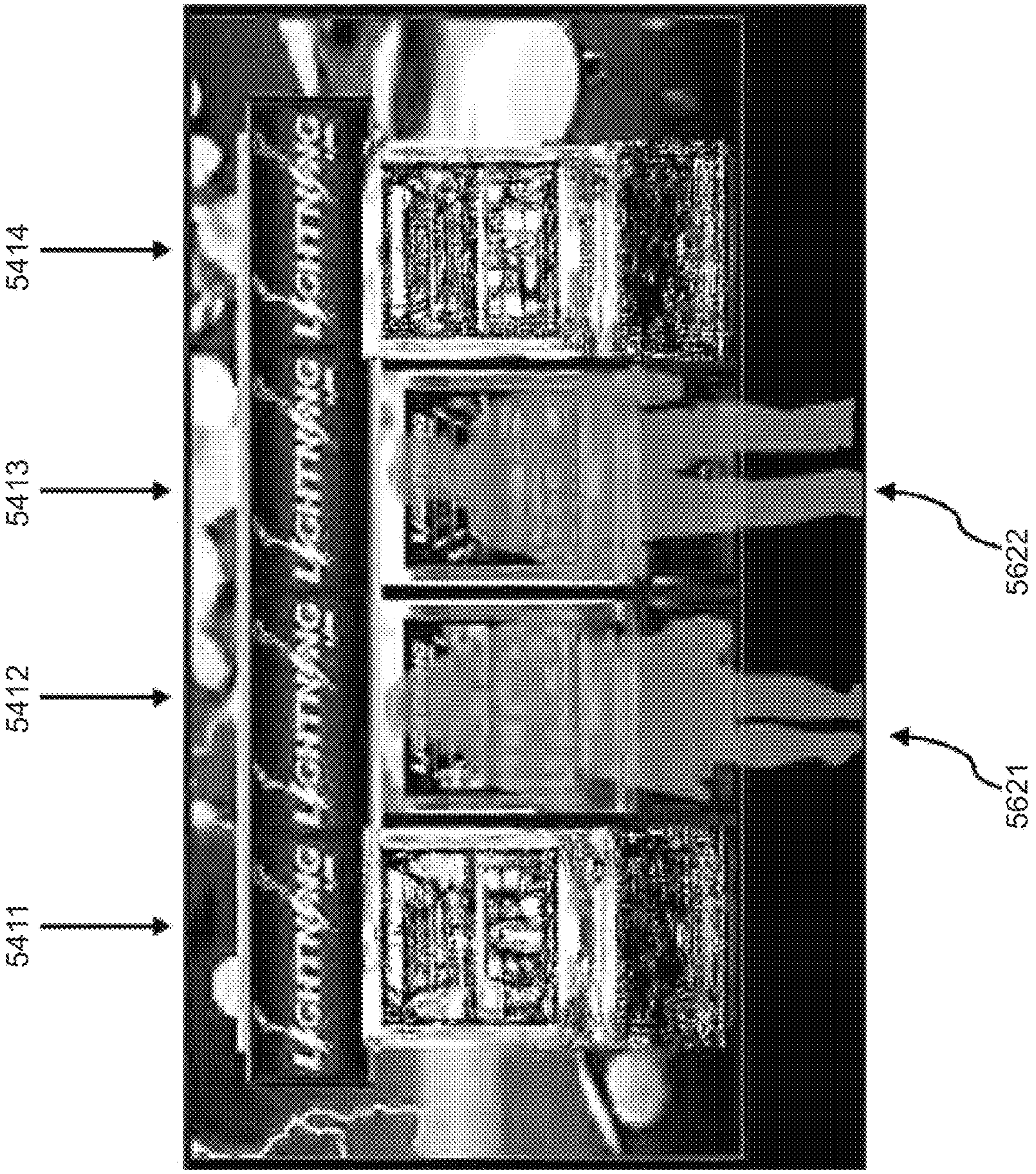

FIGS. 54-56 illustrate schematically an embodiment where all EGMs are initially off in the venue. FIG. 54 shows an example bank of four gaming machines 5411-5414 that are off.

FIG. 55 shows an example scenario where a patron 5520 inserts a card into gaming machine 5412 and server 401 automatically enables the EGM for play and also automatically disables EGMs either side so that they can't be turned on—i.e. EGMs 5411,5413.

In an example, shown in FIG. 56, the members of the couple 5621, 5622 have linked cards and insert them to EGMs 5412,5413 resulting in server 401 turning them on and server 401 disabling EGMs 5411,5414.

In example embodiment, server 401 is implemented in combination with mechanisms at the EGMs that enable their status to be determined and for them to be enabled/disabled. Functionality for reserving machines can be adapted to provide these mechanisms. In this respect, most EGMs have a card reader for reading a loyalty/membership/guest card and thus, additional software instructions loaded into the memory 208 of the EGM 200 cause the processor 204 to communicate with management server 401 when there is an attempt to activate the respective EGM and wait for a communication from server 401 before activating. The same software running on other EGMs allows them to be disabled by server 401. In other examples, a unit known as a player marketing module may be connected between the EGM and server 401. The player marketing module has a card reader and additional software in the memory of the player marking module causes it to communicate with server 401 and enable/disable the EGM, thus providing an EGM enablement control apparatus.

In an example, software is running on all EGMs to display EGM disabled messages (e.g., as caused by server 401) and software is running on server 401 that enables control of EGM status and manually disable/enable EGMs if required.

In some examples, software is executable on a tablet computer to enable floor staff to control EGMs from the gaming floor of the venue (e.g., device 402 and/or 415).

In some embodiments, only authorized staff can enable the Social Distancing function.

Table One sets out example system wide parameters that the venue will be able to operate under:

TABLE ONE

| Function | Definition | Settings description |
|---|---|---|
| Enable Social Distancing function | 0. Disable<br>1. Enable | If enabled;<br>All EGMs ON. Social distancing enforced by either card in or detecting of active machine, non-zero credits above residual.<br>All EGMS OFF. Social distancing enforced by requirement of a card to enable the machine. |
| Membership Opt in | Enforce on all Cards<br>Enable is Opt In<br>Enforce for certain Tier(s) Only | Option 2 & 3 Will become more relevant when restrictions start to ease so venues can continue to offer this function to some players. It may be a good way to keep their top players that spend 2 or 3 times the average to justify the locking of additional EGMs. |
| Alerts | Enable is audit trail message<br>Alerts not enabled | Alerts to Staff can assist with patron education to ensure they know of the existence of a guest card or check for card IN errors etc. |

TABLE ONE-continued

| Function | Definition | Settings description |
|---|---|---|
| Partner Card | 0. Disable<br>1. Enable | This function will allow either two members to join cards or for a member to join a social group. |

Server 401 may be configured for venues to operate in either of two modes.

A first mode where all EGMs are on. In this mode advantageously a patron will be able to view all non-disabled machines in their attract mode. Social distancing is enforced by either card in or detecting of active machine, non-zero credits above residual.

A second mode where initially all EGMs are off. Social distancing is enforced by requirement of a card to enable the machine. In this scenario machines that are available to be enabled would display a message on the console and the machine if the machine supports messaging.

Floor configuration data is stored in a memory of and/or connected to server 401, which enables server to know which EGMs to enable and which ones to disable. The floor configuration takes into account a wide variety of configurations including EGMs at the end of the banks and EGMs on Carousels.

The disabling function is configured such that when a card is inserted into an EGM, server 401 will: a) Check the EGMs that are designated to be disabled; b) Check the credit meter of each of those EGMs to ensure it is set to ZERO (Allowing for residual credits); c) Check the last Active Flag is not within the greater of (Poll Cycle) or 5 seconds; d) Disable the EGMs; and e) This limits the chances of someone who is playing an EGM will be disabled.

The enabling function is configured such that when a card is removed, it will re-enable the disabled EGMs next to it, provided any machines adjacent to those machines are not in play.

To set the rules to disable EGMs, in the EGM Setup screen, each EGM will have a custom attribute associated with it to allow server 401 to know which EGMs to disable on Card In based on a location tree. Collectively, this data defines a set of disablement relationships that defines which EGMs to disable when a respective EGM is active, as shown in Table Two:

TABLE TWO

| Function | Definition |
|---|---|
| Both | Default configuration that will disable both previous and next EGMs |
| Previous | Will be the previous ACTIVE EGM floor location |
| Next | Will be the Next Active EGM floor Location |
| Specific | Will allow the user to define a location (e.g. in the case of a Carousel) |
| None | No EGMs will be disabled. |

Selecting 'Specific' will allow the user to manually assign both the previous and next EGM locations.

To save venue setup time, in an example there is a menu item to enable the user to set "All EGMs" to the Both Setting. This will allow the venue to only need to update the EGMs that are exceptions such as on end banks etc.

In some embodiments, server 401 is configured so that server 401 is able to enforce the social distancing or allow patrons to opt into the scheme.

Where server 401 is able to enforce social distancing on all patrons and when applied, this rule will utilize the lock rules to any cards inserted into an EGM.

In other example, for example, when social distancing starts to wind down and the venue wishes to allow certain patrons or groups of patrons to continue social distancing (e.g. patrons in high risk categories), server 401 allows for the introduction of Opt IN social distancing. This field appears in Membership and QMR.

The membership database includes a field that will allow two cards to be joined, as shown in Table Three:

TABLE THREE

| Function | Setting | Partner Card Number | Partner Member Number |
|---|---|---|---|
| Partner Card | Yes \| No | | |

When a member selects "Yes" via a user interface, they can then either swipe the partner card or enter the Member Number. On save the system will: a) Check if the Partner already has a partner Card, and prompt if already exists with Override or cancel; b) Override will remove all previous links for that partner card; and c) Update partner card details with new link.

In this example, when the first player inserts their card it will disable both EGMs next to the EGM at which the card is inserted, when the second player inserts their card it will enable the sequential EGM and disable the unoccupied EGM next to it.

In opt-in embodiments, a member can belong to a social group that will allow multiple members to be linked.

The venue would create a social group and control the maximum number of members that can join. Similar to the Joined Cards, a member would join their card to a social group instead of another individual.

Similarly to an individual card, when a member inserts their card into a locked EGM the system will: a) Check EGMs that are designated to be disabled; b) Check the credit meter of each of those EGMs to ensure it is set to ZERO; or c) if an active EGM has a joined card; d) Check the last Active Flag is not within the greater of (Poll Cycle) or 5 seconds; e) Enable the EGM if conditions met; and f) Disable the EGMs next to it (if required).

In some examples server 401 caters for guest cards. A guest card is a card that belongs to a player for the purposes of enabling EGMs but will not have member functions such as Redeeming Points and Earning prizes enabled.

Venues may wish to enforce all EGMs being played have a card entered and staff can be notified if this rule is not adhered to which allows staff to educate patrons and hand out guest cards.

In an example, there will be two types of guest cards available. Anonymous Guest Cards follow the same principles as Anonymous TITO cards, where a patron can pick up a card and lock EGMs on either side and dispose of them when they leave. In an example, these guest cards have different rules attached to prevent abuse. In an example, EGMs will only lock the side EGMs after Minimum credits are inserted into the EGM. EGMs will unlock if the EGMs are in idle mode for (X) minutes (to prevent cards being left IN after session).

Other Guest Cards are offered to patrons who do not need to become a member as they live outside the 5 kms or have been signed in by a member. The card belongs to the player so they have full member records to track player activity but do not offer member rewards such as bonus points or entry into member promotions.

To improve uptime for EGMs, in some examples, server 401 offers alerts to assist staff to find cards that have been left in EGMs. The Alerting option will be delivered through the audit trail which will allow paging systems to pick them up. Server 401 will create an Alert event when an EGM is being played without a card inserted or an EGM is in idle mode for (X) seconds with a card inserted and has less than ($Y) on the credit meter In order to assist with cleaning between patrons, venues can opt to have the EGM disable at the completion of a session and an Alert will go to the staff member to clean the EGM. In this scenario the: a) EGM will be locked and remain locked until a staff member has attended; b) The PRIME Impact will also display a message advising the EGM is in Maintenance mode; c) An Alert is sent to Staff to notify that an EGM requires clearing; d) Staff can then re-enable the EGM through a code on the console or the insertion of a staff card; and e) During this locked state the EGMs on either side can be played.

With EGMs being disabled the following reports must be created: a) A record of EGMs being disabled with a Date/Time Stamp & duration and member number; b) Either a new utilization report, or existing utilization report is modified to allow for the time the EGM was disabled to ensure it doesn't skew performance figures but also allows the venue to relocate EGMs if their 2nd best performing machine is locked 50% of the day.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming system comprising:

at least one memory with instructions stored thereon; and at least one processor in communication with the at least one memory, wherein the instructions, when executed by the at least one processor, cause the at least one processor to:

receive, from an electronic gaming device, data indicating that a game session has begun at the electronic gaming device;

based on the data indicating that the game session has begun at the electronic gaming device, generate a task indicating that the electronic gaming device should be cleaned; and cause the task to be stored in a task management system.

2. The electronic gaming system of claim 1, wherein the instructions further cause the at least one processor to assign the task to a worker.

3. The electronic gaming system of claim 2, wherein the instructions further cause the at least one processor to:

receive input data indicating that the worker has cleaned the electronic gaming device; and based on the input data, close the task in the task management system.

4. The electronic gaming system of claim 1, wherein the instructions further cause the at least one processor to, based on the data, cause at least one electronic gaming device nearby the electronic gaming device to operate in an out of service mode.

5. The electronic gaming system of claim 4, wherein the instructions further cause the at least one processor to cause display of a message indicating that the at least one electronic gaming device is operating in the out of service mode.

6. The electronic gaming system of claim 4, wherein the instructions further cause the at least one processor to:

receive a message from the electronic gaming device indicating that a player at the electronic gaming device has opted in to social distancing; and cause the at least one electronic gaming device nearby the electronic gaming device to operate in the out of service mode based on the data and the message.

7. The electronic gaming system of claim 1, wherein the instructions further cause the at least one processor to:

identify an outstanding previous task indicating that the electronic gaming device should be cleaned; and escalate the task based at least in part on the task and the outstanding previous task.

8. The electronic gaming system of claim 1, wherein the task management system comprises at least one of the at least one memory or the at least one processor.

9. The electronic gaming system of claim 1, wherein the instructions further cause the at least one processor to:

receive, from the electronic gaming device, second data indicating that the game session has ended;

based on the second data indicating that the game session has ended, generate a second task indicating that the electronic gaming device should be cleaned; and cause the second task to be stored in the task management system.

10. At least one non-transitory computer-readable storage medium with instructions stored thereon that, in response to execution by at least one processor, cause the at least one processor to:

receive, from an electronic gaming device, data indicating that a game session has begun at the electronic gaming device;

in response to the data indicating that the game session has begun at the electronic gaming device, create a task indicating that the electronic gaming device should be cleaned; and cause the task to be stored in a task management system.

11. The at least one non-transitory computer-readable storage medium of claim 10, wherein the instructions further cause the at least one processor to assign the task to a person.

12. The at least one non-transitory computer-readable storage medium of claim 11, wherein the instructions further cause the at least one processor to:

receive input data indicating that the person has cleaned the electronic gaming device; and in response to the input data, close the task in the task management system.

13. The at least one non-transitory computer-readable storage medium of claim 10, wherein the instructions further cause the at least one processor to, to in response to the data, cause at least one electronic gaming device nearby the electronic gaming device to operate in an out of service mode.

14. The at least one non-transitory computer-readable storage medium of claim 10, wherein the instructions further cause the at least one processor to:

determine that an outstanding previous task indicating that the electronic gaming device should be cleaned is stored in the task management system; and escalate the task based at least in part on the task and the outstanding previous task.

15. The at least one non-transitory computer-readable storage medium of claim 10, wherein the task management system comprises at least one of the at least one non-transitory computer-readable storage medium or the at least one processor.

16. The at least one non-transitory computer-readable storage medium of claim 10, wherein the instructions further cause the at least one processor to:

receive, from the electronic gaming device, second data indicating that the game session has ended;

in response to the second data indicating that the game session has ended, create a second task indicating that the electronic gaming device should be cleaned; and cause the second task to be stored in the task management system.

17. An electronic gaming device comprising:

at least one memory with instructions stored thereon; and at least one processor in communication with the at least one memory, wherein the instructions, when executed by the at least one processor, cause the at least one processor to:

determine that a game session at the electronic gaming device has started; and generate a message indicating that the game session has started; and transmit the message to a casino server, wherein the casino server, in response to receiving the message, causes a task to be stored in a task management system, wherein the task indicates that the electronic gaming device should be cleaned.

18. The electronic gaming device of claim 17, wherein the instructions further cause the at least one processor to:

receive an input indicated that a player at the electronic gaming device has opted in to social distancing; and cause at least one gaming device nearby the electronic gaming device to enter an out of service mode.

19. The electronic gaming device of claim 18, wherein the instructions further cause the at least one gaming device to enter the out of service mode by transmitting a second message to the casino server, wherein the casino server, based on receiving the second message, controls the at least one gaming device to enter the out of service mode.

20. The electronic gaming device of claim 17, wherein the instructions further cause the at least one processor to:

determine that the game session at the electronic gaming device has ended; and generate a second message indicating that the game session has ended; and transmit the second message to the casino server, wherein the casino server, in response to receiving the second message, causes a second task to be stored in the task management system, wherein the second task indicates that the electronic gaming device should be cleaned.

* * * * *